US012159780B2

(12) United States Patent
Jarrold et al.

(10) Patent No.: US 12,159,780 B2
(45) Date of Patent: Dec. 3, 2024

(54) ION TRAP ARRAY FOR HIGH THROUGHPUT CHARGE DETECTION MASS SPECTROMETRY

(71) Applicant: THE TRUSTEES OF INDIANA UNIVERSITY, Bloomington, IN (US)

(72) Inventors: Martin F. Jarrold, Bloomington, IN (US); Daniel Botamanenko, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 521 days.

(21) Appl. No.: 17/563,457

(22) Filed: Dec. 28, 2021

(65) Prior Publication Data

US 2022/0122831 A1 Apr. 21, 2022

Related U.S. Application Data

(63) Continuation of application No. 17/058,561, filed as application No. PCT/US2019/013283 on Jan. 11, 2019, now Pat. No. 11,227,759.

(Continued)

(51) Int. Cl.
*H01J 49/42* (2006.01)
*H01J 49/00* (2006.01)

(Continued)

(52) U.S. Cl.
CPC ...... *H01J 49/4245* (2013.01); *H01J 49/0031* (2013.01); *H01J 49/0036* (2013.01);

(Continued)

(58) Field of Classification Search
CPC .. H01J 49/4245; H01J 49/0031; H01J 49/022; H01J 49/025; H01J 49/0036; H01J 49/406; H01J 49/426

(Continued)

(56) References Cited

U.S. PATENT DOCUMENTS 3,019,168 A 1/1962 Taylor
5,285,063 A 2/1994 Schwartz et al.

(Continued)

FOREIGN PATENT DOCUMENTS

JP 11144675 5/1999
JP 2008186730 A 8/2008

(Continued)

OTHER PUBLICATIONS

Japanese Office Action dispatched Jan. 31, 2023 for co-pending application 2020-568364—9 pages.

(Continued)

*Primary Examiner* — Kiet T Nguyen
(74) *Attorney, Agent, or Firm* — Barnes & Thornburg LLP

(57) ABSTRACT

An electrostatic linear ion trap (ELIT) array includes a plurality of ion mirrors and a plurality of elongated charge detection cylinders each defining an axial passageway centrally therethrough, the ion mirrors and the charge detection cylinders arranged relative to one another such that each charge detection cylinder is positioned between a different respective pair of the ion mirrors with the respective axial passageways of each coaxial with one another, wherein the axial passageways of the ELITs are not coaxial with one another, means for selectively directing at least one ion into each of the plurality of ELITs, and means for controlling each of the ion mirrors in a manner which causes the at least one ion in at least two of the ELITs to become trapped therein and to simultaneously oscillate back and forth between the respective ion mirrors each time passing through the respective charge detection cylinder.

19 Claims, 15 Drawing Sheets

Related U.S. Application Data

(60) Provisional application No. 62/680,315, filed on Jun. 4, 2018.

(51) Int. Cl.
*H01J 49/02* (2006.01)
*H01J 49/40* (2006.01)

(52) U.S. Cl.
CPC .......... *H01J 49/022* (2013.01); *H01J 49/025* (2013.01); *H01J 49/406* (2013.01); *H01J 49/426* (2013.01)

(58) Field of Classification Search
USPC ........................................................ 250/287
See application file for complete search history.

(56) References Cited

U.S. PATENT DOCUMENTS

| | | | |
|---|---|---|---|
| 5,478,745 | A | 12/1995 | Samulski |
| 5,572,025 | A | 11/1996 | Cotter |
| 5,770,857 | A | 6/1998 | Fuerstenau et al. |
| 5,863,541 | A | 1/1999 | Samulski et al. |
| 5,869,248 | A | 2/1999 | Yuan et al. |
| 5,877,022 | A | 3/1999 | Stinchcomb et al. |
| 5,880,466 | A | 3/1999 | Benner |
| 5,882,652 | A | 3/1999 | Valdes et al. |
| 5,886,346 | A | 3/1999 | Makarov |
| 5,905,040 | A | 5/1999 | Mazzara et al. |
| 5,916,563 | A | 6/1999 | Young et al. |
| 5,965,358 | A | 10/1999 | Carrion et al. |
| 6,013,487 | A | 1/2000 | Mitchell |
| 6,083,702 | A | 7/2000 | Mitchell et al. |
| 6,156,303 | A | 12/2000 | Russell et al. |
| 6,183,950 | B1 | 2/2001 | Madonna |
| 6,583,408 | B2 | 6/2003 | Smith et al. |
| 6,744,042 | B2 | 6/2004 | Zajfman et al. |
| 6,753,523 | B1 | 6/2004 | Whitehouse |
| 6,888,130 | B1 | 5/2005 | Gonin |
| 7,314,912 | B1 | 1/2008 | Hallek et al. |
| 7,829,842 | B2 | 11/2010 | Makarov |
| 8,294,085 | B2 | 10/2012 | Ding |
| 8,395,112 | B1 | 3/2013 | Bier |
| 8,409,870 | B2 | 4/2013 | Van Wuijckhuijse |
| 8,766,170 | B2 | 7/2014 | Guna et al. |
| 9,095,793 | B2 | 8/2015 | Flagan |
| 10,056,244 | B1 | 8/2018 | Quarmby et al. |
| 2002/0185606 | A1 | 12/2002 | Smith et al. |
| 2003/0155502 | A1 | 8/2003 | Grosshans et al. |
| 2004/0169137 | A1 | 9/2004 | Westphall et al. |
| 2005/0236375 | A1 | 10/2005 | Gefter et al. |
| 2007/0102634 | A1 | 5/2007 | Frey et al. |
| 2007/0254352 | A1 | 11/2007 | Schaffer et al. |
| 2009/0020694 | A1 | 1/2009 | Florey |
| 2009/0078866 | A1 | 3/2009 | Li et al. |
| 2009/0108194 | A1 | 4/2009 | Page et al. |
| 2009/0294641 | A1 | 12/2009 | Konicek et al. |
| 2009/0294655 | A1 | 12/2009 | Ding et al. |
| 2010/0084549 | A1 | 4/2010 | Ermakov et al. |
| 2010/0084552 | A1 | 4/2010 | Kawana |
| 2010/0090102 | A1 | 4/2010 | Rather et al. |
| 2010/0227310 | A1 | 9/2010 | Manalis et al. |
| 2010/0234837 | A1 | 9/2010 | Alfano |
| 2010/0314538 | A1 | 12/2010 | Makarov et al. |
| 2010/0320377 | A1 | 12/2010 | Cotter |
| 2011/0095175 | A1 | 4/2011 | Bateman |
| 2011/0240845 | A1 | 10/2011 | Ding |
| 2012/0112056 | A1 | 5/2012 | Brucker et al. |
| 2012/0282641 | A1 | 11/2012 | Reilly et al. |
| 2013/0068942 | A1 | 3/2013 | Verenchikov |
| 2013/0124099 | A1 | 5/2013 | Ecker et al. |
| 2013/0175440 | A1 | 7/2013 | Perelman et al. |
| 2013/0200261 | A1 | 8/2013 | Mizutani et al. |
| 2013/0234017 | A1 | 9/2013 | Kaltashov et al. |
| 2013/0327934 | A1 | 12/2013 | Makarov et al. |
| 2014/0197333 | A1 | 7/2014 | Jolliffe et al. |
| 2014/0299766 | A1 | 10/2014 | Anderson et al. |
| 2014/0346344 | A1 | 11/2014 | Chen |
| 2015/0008316 | A1 | 1/2015 | Guna |
| 2015/0021472 | A1 | 1/2015 | Makarov |
| 2015/0325425 | A1 | 11/2015 | Makarov |
| 2015/0331000 | A1 | 11/2015 | Collier et al. |
| 2016/0005580 | A1 | 1/2016 | Grinfeld |
| 2016/0035556 | A1 | 2/2016 | Berkout et al. |
| 2016/0181084 | A1 | 6/2016 | Smith |
| 2016/0336165 | A1 | 11/2016 | Guna |
| 2017/0040152 | A1 | 2/2017 | Makarov |
| 2017/0307565 | A1 | 10/2017 | Clemmer et al. |
| 2017/0372883 | A1 | 12/2017 | Verenchikov |
| 2020/0243317 | A1 | 7/2020 | Lopez-Hilfiker et al. |
| 2020/0357626 | A1 | 11/2020 | Jarrold et al. |

FOREIGN PATENT DOCUMENTS

| | | | |
|---|---|---|---|
| JP | 2011523172 | A | 8/2011 |
| JP | 2014501429 | A | 1/2014 |
| NO | 2019118242 | A1 | 6/2019 |
| NO | 2019140233 | A1 | 7/2019 |
| WO | 1998011244 | A1 | 3/1998 |
| WO | 1999061601 | A1 | 12/1999 |
| WO | 2000028004 | A1 | 5/2000 |
| WO | 2000028061 | A1 | 5/2000 |
| WO | 2001092551 | A2 | 5/2001 |
| WO | 2003042704 | A1 | 5/2003 |
| WO | 2006130474 | A2 | 12/2006 |
| WO | 2010135830 | A1 | 12/2010 |
| WO | 2012080352 | A1 | 6/2012 |
| WO | 2012083031 | A1 | 6/2012 |
| WO | 2012145037 | A1 | 10/2012 |
| WO | 2016073850 | A1 | 5/2016 |
| WO | 2017162779 | A1 | 9/2017 |
| WO | 2017190031 | A1 | 11/2017 |
| WO | 2019162687 | A1 | 8/2019 |
| WO | 2019231854 | A1 | 12/2019 |

OTHER PUBLICATIONS

Office Action, issued Jun. 23, 2023 for counterpart Japan Patent Application No. 2020-568469 (English Translation).

Office Action, issued Jan. 18, 2023 for counterpart Japan Patent Application No. 2020-568469 (English Translation).

Japanese Office Action dispatched Jan. 18, 2023 for 2020-568469—16 pages (References 1, 2, 3 and 5 , and prior art document JP 2010-515210 English equivalent US 2013/327934A1, cited in this document have been previously submitted).

Japanese Office Action dispatched Jan. 18, 2023 for application 2020-568379—11 pages (Prior art documents David Keifer, U.S. Pat. No. 5880466, U.S. Pat. No. 6888130 and U.S. Publication 2011/0240845 have been previously submitted).

Japanese Office Action dispatched Feb. 17, 2023 for application 2020-568389—11 pages.

European Office Action issued Mar. 3, 2023 for application 19732193. 8—14 pages.

European Office Action dated Sep. 9, 2022 for application 19 702 775.8—5 pages.

PCT International Search Report and Written Opinion completed by the ISA/US on Oct. 11, 2021 and issued in connection with PCT/US2021/034480.

Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.

Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.

Kiss et al. "Size, weight and position: ion mobility spectrometry and imaging MS combined", Anal Bioanal Chem. 2011. 399: pp. 2623-2634, especially: p. 2626, col. 1, para 1.

(56) References Cited

OTHER PUBLICATIONS

Japanese Office Action dispatched Jan. 6, 2023 for application 2020-568366—9 pages (References 1 and 2 and the Doussineau article cited in this document have been previously submitted).
Analysis of a Common Cold Virus and Its Subviral Particles by Gas-Phase Electrophoretic Mobility Molecular Analysis and Native Mass Spectrometry, Weiss Vu et al, Anal Chem. 2015.
Bantel-Schall, U., et al., "Human Adena-Associated Virus Type 5 is Only Distantly Related to Other Known Primate Helper-Dependent Parvoviruses", Journal of Virology, vol. 73, pp. 939-947 {Feb. 1999).
Beuhler, et al., A study of the formation of high molecular weight water cluster ions {m/e < 59000) in expansion of ionized gas mixtures, J. Chem. Phys. 77, 2549-2557 (1982).
Beuhler, et al., Threshold studies of secondary electron emission induced by macro ion impact on solid surfaces. Nucl. Instrum. Methods. 170, 309-315 (1980).
Botamanenko, Daniel, et al., "Ion-Ion Interactions in Charge Detection Mass Spectrometry", J Am Soc Mass Spectrom. Dec. 2019; 30(12): 2741-2749. doi:10.1007/s13361-019-02343-y.
Brown, C., et al. "Chimeric Parvovirus B19 Capsids for the Presentation of Foreign Epitope",; Virology 198, pp. J77-J488 (1994).
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengjun, et al. "Several Log Increase in Therapeutic Transgene Delivery by Distinct Adena-Associated Viral Serotype Vectors" Molecular Therapy vol. 2, No. 6, pp. 619-623 {Dec. 2000).
Chiorini, John A., et al. "Cloning of Adeno-Associated Virus Type 4 (MV4) and Generation of Recombinant MV4 Particles", Journal of Virology, vol. 71, pp. 6823-6833 (Sep. 1997).
Contino, Nathan Colby, "Ion trap charge detection mass spectrometry: Lowering limits of detection and improving signal to noise", ISBN: 9781303535048, Jul. 30, 2013 (Jul. 30, 2013).
Defining the Stoichiometry and Cargo Load of Viral and Bacterial Nanoparticles by Orbitrap Mass Spectrometry, Snijder, J. et al, J. Am. Chem. Soc. 2014, 136, 7295-7299.
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., "The FUNPET—a New Hybrid Ion Funnel-Ion Carpet Atmospheric Pressure Interface for the Simultaneous Transmission of a Broad Mass Range", Journal of the American Society of Mass Spectrometry 29, 2160-2172, Aug. 15, 2018.
El-Baba, Tarick J., et al., "Melting Proteins Confined in Nanodroplets With 10.6 um Light Provided Clues About Early Steps of Denaturation", Chemical Communications, vol. 54, No. 26, 3270-3273, 2018.
Elliott, Andrew G., et al. "Effects of Individual Ion Energies on Charge Measurements in Fourier Transform Charge Detection Mass Spectrometry (FT-CDMS)", Journal of the American Society for Mass Spectrometry., Nov. 14, 2018 (Nov. 14, 2018).
Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Gao, Guangping, et al. "Clades of Adeno-Associated Viruses are Widely Disseminated in Human Tissues", vol. 78, pp. 6381-6388 (Jun. 2004).
Grifman, M., et al. "Incorporation of Tumor-Targeting Peptides into Recombinant Adeno-associated Virus Capsids",.; Molecular Therapy, vol. 3, No. 6, pp. 964-975 (Jun. 2001).
Grinfeld, Dmitry, et al. "Space-Charge Effects in an Electrostatic Multireflection Ion Trap", European Journal of Mass Spectrometry, vol. 20, No. 2, Apr. 1, 2014 (Apr. 1, 2014), p. 131-142.
Heller, Manfred, et al. "Mass Spectrometry-Based Analytical Tools for the Molecular Protein Characterization of Human Plasma Lipoproteins", Proteomics 2005, 5, 2619-2630.
Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Keifer, David Z., et al. "Charge detection mass spectrometry: weighing heavier things" The Analyst, vol. 142, No. 10, Jan. 1, 2017, pp. 1654-1671.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using tmospheric pressure ion sources. Anal. Chem. 73, 4162-4170 (2001).
Koizumi et al., A novel phase-coherent programmable clock for high-precision arbitrary waveform generation applied to digital ion trap mass spectrometry_ Int. J_ Mass Spectrom_ 292, 23-31 (2010).
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Padron, Eric, et al. "Structure of Adeno-Associated Virus Type 4", Journal of Virology, vol. 79, No. 8, pp. 5047-5058 Apr. 2005).
Product-Related Impurities in Clinical-Grade Recombinant AAV Vectors: Characterization and Risk Assessment, J Fraser Wright, Biomedicines 2014, 2, 80-97.
Puttaraju, M., et al. "Spliceosome-mediated RNA trans-splicing as a tool for gene therapy", Nature Biotechnology, vol. 17, pp. 246-252 (Mar. 1999).
Richards et al., Waveform parameter tolerances for the quadrupole mass filler with rectangular excitation. Int. J. Miass Spectrom Ion Phys_ 15, 417-428 (1974).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 {Jun. 1986).
Shinholt, Review of Scientific Instruments. 85, 113109 (2014); doi: 10.1063/1.4900627.
Sonalikar, Hrishikesh S., et al. "Numerical analysis of segmented-electrode Orbitraps", International Journal of Mass Spectrometry, Elsevier Science Publishers, Amsterdam, NL, vol. 395, Dec. 17, 2015 (Dec. 17, 2015), p. 36-48.
Srivastava, Arun, et al., "Nucleotide Sequence and Organization of the Adena-Associated Virus 2 Genome", Journal of Virology, vol. 45, No. 2, pp. 555-564 {Feb. 1983).
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Tsao, Jun, et al., "The Three-Dimensional Structure of Canine Parvovirus and Its Functional Implications", American Association for the Advancement of Science, Science, New Series, vol. 251, No. 5000, pp. 1456-1464 {Mar. 22, 991).
Walters, Robert W., "Structure of Adeno-Associated Virus Serotype 5", Journal of Virology, vol. 78, No. 7, pp. B361-B3371 {Apr. 2004).
Winger, et al., Observation and implications of high mass-lo-charge ratio ions from electrospray ionization mass spectrometry, J_ Am_ Soc_ Mass Spectrom. 4, 536-545 (1993).

(56) References Cited

OTHER PUBLICATIONS

Xie, Qing, et al., "The atomic structure of adeno-associated virus (MV-2), a vector for human gene therapy", PNAS, vol. 99, No. 16, pp. 10405-10410 (Aug. 6, 2002).
Xiong, et al., The development of charge detection-quadrupole ion trap mass spectrometry driven by rectangular and triangularwaves, Analyst 137, 1199-1204 (2012).
PCT International Search Report and Written Opinion completed by the ISA/US on Jan. 12, 2016 and issued in connection with PCT/US2015/059463.
PCT International Search Report and Written Opinion completed by the ISA/US on Jun. 19, 2017 and issued in connection with PCT/US2017/030163.
PCT International Search Report and Written Opinion completed by the ISA/EP on Feb. 14, 2019 and issued in connection with PCT/US2018/051944.
PCT International Search Report and Written Opinion completed by the ISA/EP on Apr. 18, 2019 and issued in connection with PCT/US2019/013251.
PCT International Search Report and Written Opinion completed by the ISA/EP on Apr. 16, 2019 and issued in connection with PCT/US2019/013274.
PCT International Search Report and Written Opinion completed by the ISA/EP on Mar. 27, 2019 and issued in connection with PCT/US2019/013277.
PCT International Search Report and Written Opinion completed by the ISA/EP on Jul. 24, 2019 and issued in connection with PCT/US2019/013278.
PCT International Search Report and Written Opinion completed by the ISA/EP on Sep. 9, 2019 and issued in connection with PCT/US2019/013279.
PCT International Search Report and Written Opinion completed by the ISA/EP on Mar. 28, 2019 and issued in connection with PCT/US2019/013280.
PCT International Search Report and Written Opinion completed by the ISA/EP on Aug. 27, 2019 and issued in connection with PCT/US2019/013281.
PCT International Search Report and Written Opinion completed by the ISA/EP on Mar. 27, 2019 and issued in connection with PCT/US2019/013283.
PCT International Search Report and Written Opinion completed by the ISA/EP on Mar. 29, 2019 and issued in connection with PCT/US2019/013284.
PCT International Search Report and Written Opinion completed by the ISA/EP on Jul. 26, 2019 and issued in connection with PCT/US2019/013285.
PCT International Search Report and Written Opinion completed by the ISA/EP on Aug. 27, 2019 and issued in connection with PCT/US2019/035381.
PCT International Search Report and Written Opinion completed by the ISA/EP on Sep. 9, 2019 and issued in connection with PCT/US2019/035379.
PCT International Search Report and Written Opinion completed by the ISA/US on Jan. 24, 2021 and issued in connection with PCT/US2020/054975.
PCT International Search Report and Written Opinion completed by the ISA/EP on Mar. 8, 2021 and issued in connection with PCT/US2020/065300.
PCT International Search Report and Written Opinion completed by the ISA/EP on Mar. 8, 2021 and issued in connection with PCT/US2020/065301.
PCT International Search Report and Written Opinion completed by the ISA/US on Mar. 18, 2021 and issued in connection with PCT/US2021/016325.
PCT International Search Report and Written Opinion completed by the ISA/US on Apr. 5, 2021 and issued in connection with PCT/US2021/016435.
PCT International Search Report and Written Opinion completed by the ISA/US on Nov. 23, 2020 and issued in connection with PCT/US2020/052009.
PCT International Search Report and Written Opinion completed by the ISA/EP on Jul. 14, 2020 and issued in connection with PCT/US2020/029287.
Supplemental European Search Report for European Patent Application No. 17790559.3 dated Nov. 12, 2019 (11 pages).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schaal, U., et al., "Human Adena-Associated Virus Type 5 Is Only Distantly Related to Other Known Primate Helper-Dependent Parvoviruses", Journal of Virology, vol. 73, pp. 939-947 (Feb. 1999).
Beuhler, et al., A study of the formation of high molecular weight water cluster ions (m/e < 59000) in expansion of onized gas mixtures, J. Chem. Phys. 77, 2549-2557 (1982).
Brancia, et al., Digital asymmetric waveform isolation (DAWI) in a digital linear ion trap. J_ Am. Soc_ Mass Spectrom. 1. 1530-1533 (2010).
Brown, C., et al. "Chimeric Parvovirus B19 Capsids for the Presentation of Foreign Epitope",; Virology 198, pp. 177-488 (1994).
Chao, Hengiun, et al. "Several Log Increase in Therapeutic Transgene Delivery by Distinct Adena-Associated Viral Serotype Vectors" Molecular Therapy vol. 2, No. 6, pp. 619-623 (Dec. 2000).
Examination report No. 1 issued Oct. 21, 2022 in Australian Application No. 2019281255—4 pages.
Office Action and Search Report for counterpart CN patent application No. 201980051696.1, dated Sep. 25, 2023. (translation appended).
Japanese Office Action dispatched Jan. 24, 2023 for co-pending application 2021-527871—4 pages (Prior art reference Alexander Makarov has been previously submitted).
Paul et al., Das elektrische massenfilter als massenspektromeler und isotopenlrenner. Z. Phys. 152, 143-182 (1958).
Paul, et al., Das elektrische massenfiller, Z. Phys. 140, 262-273 (1955).
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.
Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168, May 2015.
Richards et al., A new operating mode for the quadrupole mass filler. Int. J. Mass Spectrom. Ion Phys. 12, 317-339 1973).
Richards et al., Waveform parameter tolerances for the quadrupole mass filler with rectangular excitation. Int. J. Mass Spectrom. Ion Phys_ 15, 417-428 (1974).
Schlunegger et al., Frequency scan for the analysis of high mass ions generated by matrix-assisted laser esorption/ionization in a Paul trap_ Rapid Commun. Mass Spectrom. 13, 1792-1796 (1999).
Shinholt, Deven L., et al., "A Frequency and Amplitude Scanned Quadrupole Mass Filter for the Analysis of High m/z Ions", Review of Scientific Instruments 85, 113109 (2014) (Received Sep. 11, 2014; accepted Oct. 17, 2014; published online Nov. 21, 2014).
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Sobott et al., A tandem mass spectrometer for improved transmission and analysis of large macromolecular Assemblies. Anal. Chem. 74, 1402-1407 (2002).

(56) References Cited

OTHER PUBLICATIONS

Syed, et al., Quadrupole mass filler: Design and performance for operation in stability zone 3. J. Am. Soc. Mass Spectrom. 24, 1493-1500 (2013).
Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).
Winger, Brian E., et al., "Observation and Implications of High Mass-to-Charge Ratio Ions from Electrospray Ionization Mass Spectrometry," 1993 American Society for Mass Spectrometry 4, 536-545.
Wang, Lei, et al., "Expanding the Genetic Code", Annual Review of Biophysics and Biomolecular Structure, vol. 35, pp. 25-249 (2006).
Weiss, Victor U., et al., "Analysis of a Common Cold Virus and Its Subviral Particles by Gas-Phase Electrophoretic Mobility Molecular Analysis and Native Mass Spectrometry", Anal Chem. 2015.
Wright, J. Fraser, "Product-Related Impurities in Clinical-Grade Recombinant AAV Vectors: Characterization and Risk Assessment", Biomedicines 2014, 2, 80-97.
Xie, Qing, et al., "Canine Parvovirus Capsid Structure, Analyzed at 2.9 A Resolution", Journal of Molecular Biology, vol. 64, pp. 497-520 (1996).
Xiao, Weidong, et al., "Gene Therapy Vectors Based on Adena-Associated Virus Type 1", Journal of Virology, vol. 73, No. 5, pp. 3994-4003 (May 1999).
Uetrecht et al., "Stability and Shape of Hepatitis B Virus Capsids In Vacuo", Angew. Chem. Int. Ed. 2008, 47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Xiong, et al., The development of charge detection-quadrupole ion trap mass spectrometry driven by rectangular and riangularwaves, Analyst 137, 1199-1204 (2012).
Yang, et al., Development of a palm portable mass spectrometer. J. Amer. Soc. Mass Spec. 19, 1442-1448 (2008).
Yost, et al., Selected ion fragmentation with a tandem quadrupole mass spectrometer. J. Am. Chem. Soc. 100, 274-2275 (1978).
Bioconjugate Techniques; Hermanson;Academic Press, 1st Edition (1996), (book reference, chapter guide attached; book/specific chapter(s) to be made available upon request).
European Office Action dated Sep. 2, 2021 for application 19 707 901.5—5 pages.
Chiorini, John A., "Cloning and Characterization of Adeno-Associated Virus Type 5", Journal of Virology, vol. 73, DP-1309-1319 (Feb. 1999).
Chernushevich, et al., Collisional cooling of large ions in electrospray mass spectrometry. Anal. Chem 76. H54-1760 (2004).
Cleves, Ann E., "Protein transport: The nonclassical ins and outs", Current Biology, vol. 7, No. 5, pp. 318-320 (1997).
Ding, et al., A simulation study of the digital ion trap mass spectrometer. Int. J. Mass Spectrom. 221, 117-138 (2002).
Ding, et al, A digital ion trap mass spectrometer coupled with atmospheric pressure ion sources. J_ Mass Spectrom. 69, 471-484 (2004).
Douglas J_ Linear quadrupoles in mass spectrometry. Mass Spectrom. Rev. 28, 937-960 (2009).
Draper, Benjamin E., et al. "The FUNPET—a New Hybrid Ion Funnel-Ion Carpet Atmospheric Pressure Interface for the Simultaneous Transmission of a Broad Mass Range", Journal of the American Society for Mass Spectrometry, Elsevier Science Inc, US, vol. 29, No. 11, Aug. 15, 2018, pp. 2160-2172.
Draper, Benjamin E., et al., "Real-Time Analysis and Signal Optimization for Charge Detection Mass Spectrometry", J. Am. Soc. Mass Spectrom. (2019) 30:898Y904.
El-Baba, Tarick J. et al., "Melting proteins confined in nanodroplets with 10.6 [mu]m light provides clues about early steps of denaturation", Chemical Communications, vol. 54, No. 26, Mar. 8, 2018 (Mar. 8, 2018), p. 3270-3273.
Fuerstenau, et al., "Mass Spectrometry of an Intact Virus", Agnew. Chem. 2001, 559-562.
Gao, Guangping, et al. "Novel Adeno-Associated Viruses from Rhesus Monkeys as Vectors for Human GeneTherap",.; National Academy of Sciences, vol. 99, No. 18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).
Hauck, B., et al. "Characterization of Tissue Tropism Determinants of Adeno-Associated Virus Type 1", Journal of Virology, vol. 77, No. 4, pp. 2768-2774 (Feb. 2003).
Heller, Manfred, et al. "Mass spectrometry-based analytical tools for the molecular protein characterization of human plasma lipoproteins", Proteomics, vol. 5, No. 19, Jul. 1 (205-97-91) , pp. 2619-2639, 2005.
Hutchins, Patrick M., et al. "Quantification of HDL Particle Concentration by Calibrated Ion Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Keifer, David et al., "Charge Detection Mass Spectrometry of Bacteriophage P22 Procapsid Distributions Above 20MDa", Rapid Communications in Mass Spectrometry, vol. 28, No. 5, Mar. 2014.
Kim et al., A multicapillary inlet jet disruption electrodynamic ion funnel interface for improved sensitivity using atmospheric pressure ion sources. Anal. Chem. 73, 4162-4170 (2001).
Koizumi et al., A novel phase-coherent programmable clock for high-precision arbitrary waveform generation applied b digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).
Landais et al., Varying the radio frequency: A new scanning mode for quadrupole analyzers. Rapid Commun. Mass Spectrom. 12, 302-306 (1998).
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Mori, Seiichiro, Mori, et al. "Two novel adeno-associated viruses from cynomolgus monkey: pseudotyping characterization of capsid protein", Virology 330, pp. 375-383 (2004).
Miyamura, K., et al. "Parvovirus Particles as Platforms for Protein Presentation", National Academy of Sciences, vol. 1, No. 18,pp. 8507-8511 (Aug. 30, 1994).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992).
Nie et al., Frequency scan of a quadrupole mass analyzer in the third stability region for protein analysis. J. Chin. Chem_ Soc., 53, 47-52 (2006).
Extended EP Search Report completed Aug. 29, 2024 and issued in connection with EP Appln. No. 24174366., 12 pages.
English translation of an Office Action for Japanese Patent Appln. No. 2022-547047, dated Aug. 1, 2024.

ION TRAP ARRAY FOR HIGH THROUGHPUT CHARGE DETECTION MASS SPECTROMETRY

CROSS-REFERENCE TO RELATED APPLICATION

This application is a continuation of U.S. patent application Ser. No. 17/058,561, filed Nov. 24, 2020, which is a U.S. national stage entry of PCT Application No. PCT/US2019/013283, filed Jan. 11, 2019, which claims the benefit of and priority to U.S. Provisional Patent Application Ser. No. 62/680,315, filed Jun. 4, 2018, the disclosure of which is incorporated herein by reference in its entirety.

GOVERNMENT RIGHTS

This invention was made with government support under CHE1531823 awarded by the National Science Foundation. The United States Government has certain rights in the invention.

FIELD OF THE DISCLOSURE

The present disclosure relates generally to charge detection mass spectrometry instruments, and more specifically to performing mass and charge measurements with such instruments.

BACKGROUND

Mass Spectrometry provides for the identification of chemical components of a substance by separating gaseous ions of the substance according to ion mass and charge. Various instruments and techniques have been developed for determining the masses of such separated ions, and one such technique is known as charge detection mass spectrometry (CDMS). In CDMS, ion mass is determined as a function of measured ion mass-to-charge ratio, typically referred to as "m/z," and measured ion charge.

High levels of uncertainty in m/z and charge measurements with early CDMS detectors has led to the development of an electrostatic linear ion trap (ELIT) detector in which ions are made to oscillate back and forth through a charge detection cylinder. Multiple passes of ions through such a charge detection cylinder provides for multiple measurements for each ion, and it has been shown that the uncertainty in charge measurements decreases with $n^{1/2}$, where n is the number of charge measurements. However, such multiple charge measurements necessarily limit the speed at which ion m/z and charge measurements can be obtained using current ELIT designs. Accordingly, it is desirable to seek improvements in ELIT design and/or operation which increase the rate of ion m/z and charge measurements over those obtainable using current ELIT designs.

SUMMARY

The present disclosure may comprise one or more of the features recited in the attached claims, and/or one or more of the following features and combinations thereof. In a first aspect, an electrostatic linear ion trap (ELIT) array may comprise a plurality of elongated charge detection cylinders arranged end-to-end and each defining an axial passageway extending centrally therethrough, a plurality of ion mirror structures each defining a pair of axially aligned cavities and each defining an axial passageway therethrough extending centrally through both cavities, wherein a different one of the plurality of ion mirror structures is disposed between opposing ends of each arranged pair of the elongated detection cylinders, and front and rear ion mirrors each defining at least one cavity and an axial passageway extending centrally therethrough, the front ion mirror positioned at one end of the plurality of charge detection cylinders and the rear ion mirror positioned at an opposite end of the plurality of charge detection cylinders, wherein the axial passageways of the plurality of charge detection cylinders, the plurality of ion mirror structures, the front ion mirror and the rear ion mirror are axially aligned with one another to define a longitudinal axis passing centrally through the ELIT array.

In second aspect, a system for separating ions may comprise an ion source configured to generate ions from a sample, at least one ion separation instrument configured to separate the generated ions as a function of at least one molecular characteristic, and the ELIT described above in the first aspect, wherein ions exiting the at least one ion separation instrument pass into the ELIT array via the front ion mirror.

In a third aspect, a system for separating ions may comprise an ion source configured to generate ions from a sample, a first mass spectrometer configured to separate the generated ions as a function of mass-to-charge ratio, an ion dissociation stage positioned to receive ions exiting the first mass spectrometer and configured to dissociate ions exiting the first mass spectrometer, a second mass spectrometer configured to separate dissociated ions exiting the ion dissociation stage as a function of mass-to-charge ratio, and a charge detection mass spectrometer (CDMS), including the ELIT array described above in the first aspect, coupled in parallel with and to the ion dissociation stage such that the CDMS can receive ions exiting either of the first mass spectrometer and the ion dissociation stage, wherein masses of precursor ions exiting the first mass spectrometer are measured using CDMS, mass-to-charge ratios of dissociated ions of precursor ions having mass values below a threshold mass are measured using the second mass spectrometer, and mass-to-charge ratios and charge values of dissociated ions of precursor ions having mass values at or above the threshold mass are measured using the CDMS.

In a fourth aspect, a charge detection mass spectrometer (CDMS) may comprise a source of ions configured to generate and supply ions, an electrostatic linear ion trap (ELIT) array including a plurality of ion mirrors each defining a respective axial passageway therethrough, and a plurality of charge detection cylinders each defining a respective axial passageway therethrough, the plurality of ion mirrors and charge detection cylinders arranged to define a plurality of ELIT regions each including a different one of the plurality of charge detection cylinders positioned between a different respective pair of the plurality of ion mirrors with the axial passageway of each of the plurality of charge detection cylinders aligned with the axial passageways of the respective pair of the plurality of ion mirrors, the ELIT array configured to receive at least some of the ions supplied by the source of ions, and means for controlling each of the plurality of ion mirrors to trap a different one of the ions supplied by the source of ions in each of the plurality of ELIT regions and to cause the ion trapped in each of the plurality of ELIT regions to oscillate back and forth between the respective pair of the plurality of ion mirrors each time passing through a respective one of the plurality of charge detection cylinders.

In a fifth aspect, a method is provided for measuring ions supplied to an ion inlet of an electrostatic linear ion trap (ELIT) array having a plurality of ion mirrors and a plurality of elongated charge detection cylinders each defining a respective axial passageway therethrough, wherein the plurality of charge detection cylinders are arranged end-to-end in cascaded relationship with a different one of the plurality of ion mirrors positioned between each and with first and last ones of the plurality of ion mirrors positioned at respective opposite ends of the cascaded arrangement, wherein the first and last ion mirrors define the ion inlet and an ion exit of the ELIT array respectively, and wherein the axial passageways of each of the plurality of ion mirrors and charge detection cylinders are collinear with one another and define a longitudinal axis centrally therethrough to form a sequence of axially aligned ELIT array regions each defined by a combination of one of the plurality of charge detection cylinders and a respective pair of the plurality of ion mirrors at each end thereof. The method may comprise controlling at least one voltage source to apply voltages to each of the plurality of ion mirrors to establish an ion transmission electric field therein to pass the ions entering the ion inlet of the ELIT through each of the plurality of ion mirrors and charge detection cylinders and the ion exit of the ELIT array, wherein each ion transmission field is configured to focus ions passing therethrough toward the longitudinal axis, and controlling the at least one voltage source to sequentially modify the voltages applied to each the plurality of ion mirrors while maintaining previously applied voltages to remaining ones of the plurality of ion mirrors, beginning with the last ion mirror and ending with the first ion mirror, to sequentially establish an ion reflection electric field in each of the plurality of ion mirrors in a manner that sequentially traps a different ion in each of the ELIT regions, wherein each ion reflection electric field is configured to cause an ion entering a respective ion mirror from an adjacent one of the plurality of charge detection cylinders to stop and accelerate in an opposite direction back through the respective one of the plurality of charge detection cylinders, wherein the ion trapped in each of ELIT region oscillates back and forth between the respective ones of the plurality of ion mirrors, under the influence of the ion reflection electric fields established therein, each time passing through a respective one of the plurality of charge detection cylinders and inducing a corresponding charge thereon.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to an electrostatic linear ion trap (ELIT) array including two or more ELITs or ELIT regions and means for controlling them such that at least two of the ELITs or ELIT regions simultaneously operate to measure a mass-to-charge ratio and a charge of an ion trapped therein. In this manner, the rate of ion measurement is increased by at a factor of two or more as compared with conventional single ELIT systems, and a corresponding reduction in total ion measurement time is realized. In some embodiments, an example of which will be described in detail below with respect to FIGS. 1-4E, an ELIT array may be implemented in the form of two or more ELIT regions arranged in series, i.e., cascaded and axially aligned, and ion mirrors at opposite ends of each of the two or more cascaded ELITs or ELIT regions are controlled in a manner which sequentially traps an ion in each ELIT or ELIT region and which causes each of the trapped ions to oscillate back and forth through a respective charge detector positioned within the respective ELIT or ELIT region to measure the mass-to-charge ratios and charges of the trapped ions. In other embodiments, as will be described in detail below with respect to FIGS. 6-10, an ELIT array may be implemented in the form of two or more ELITs arranged in parallel relative to one another. An ion steering array may be controlled to direct ions sequentially or simultaneously into each of the parallel-arranged ELITs, after which the two or more ELITs are controlled in a manner which causes the ions trapped therein to oscillate back and forth through a charge detector thereof to measure the mass-to-charge ratios and charges of the trapped ions.

Figure 1:
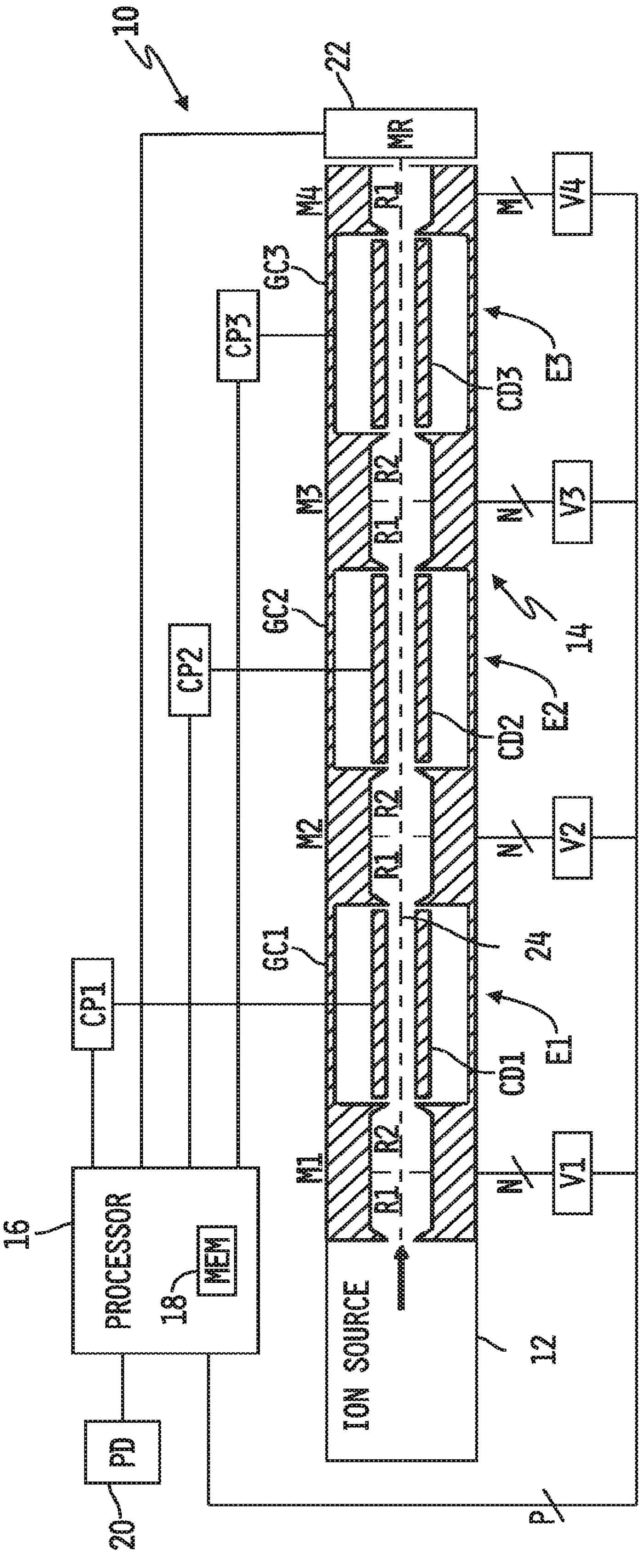
FIG. 1 is a simplified diagram of an ion mass detection system including an embodiment of an electrostatic linear ion trap (ELIT) array with control and measurement components coupled thereto.

Referring to FIG. 1, charge detection mass spectrometer (CDMS) 10 is shown including an embodiment of an electrostatic linear ion trap (ELIT) array 14 with control and measurement components coupled thereto. In the illustrated embodiment, the CDMS 10 includes an ion source 12 operatively coupled to an inlet of the ELIT array 14. As will be described with respect to FIG. 5, the ion source 12 illustratively includes any conventional device or apparatus for generating ions from a sample and may further include one or more devices and/or instruments for separating, collecting, filtering, fragmenting and/or normalizing ions according to one or more molecular characteristics. As one illustrative example, which should not be considered to be limiting in any way, the ion source 12 may include a conventional electrospray ionization source, a matrix-assisted laser desorption ionization (MALDI) source or the like, coupled to an inlet of a conventional mass spectrometer. The mass spectrometer may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, or the like. In any case, the ion outlet of the mass spectrometer is operatively coupled to an ion inlet of the ELIT array 14. The sample from which the ions are generated may be any biological or other material.

In the embodiment illustrated in FIG. 1, the ELIT array 14 is illustratively provided in the form of a cascaded, i.e., series or end-to-end, arrangement of three ELITs or ELIT regions. Three separate charge detectors CD1, CD2, CD3, are each surrounded by a respective ground cylinder GC1-GC3 and are operatively coupled together by opposing ion mirrors. A first or front ion mirror M1 is operatively positioned between the ion source 12 and one end of the charge detector CD1, a second ion mirror M2 is operatively positioned between the opposite end of the charge detector CD1 and one end of the charge detector CD2, a third ion mirror M3 is operatively positioned between the opposite end of the charge detector CD2 and one end of the charge detector CD3, and a fourth or rear ion mirror is operatively positioned at the opposite end of the charge detector CD3. In the illustrated embodiment, each of the ion mirrors M1-M3 define axially aligned and adjacent but oppositely-facing ion mirror regions or cavities R1, R2 separated from one another by a plate, ring or grid defining an aperture therethrough, and the ion mirror M4 illustratively defines a single ion mirror region or cavity R1. In some alternate embodiments, the ion mirror M4 may be identical to the ion mirrors M1-M3, i.e., the ion mirror M4 may define axially aligned and adjacent but oppositely-facing ion mirror regions R1, R. Alternatively or additionally, the ion mirror M1 may be provided in the form of a single region ion mirror, e.g., the region R2.

In the illustrated embodiment, the region or cavity R2 of the first ion mirror M1, the charge detector CD1, the region or cavity R1 of the second ion mirror M2 and the spaces between CD1 and the ion mirrors M1, M2 together define a first ELIT or ELIT region E1 of the ELIT array 14, the region or cavity R2 of the second ion mirror M2, the charge detector CD2, the region or cavity R1 of the third ion mirror M3 and the spaces between CD2 and the ion mirrors M2, M3 together define a second ELIT or ELIT region E2 of the ELIT array 14, and the region or cavity R2 of the third ion mirror M3, the charge detector CD3, the region or cavity R1 of the ion mirror M4 and the spaces between CD3 and the mirror electrodes M3, M4 together define a third ELIT or ELIT region E3 of the ELIT array 14. It will be understood that in some alternate embodiments, the ELIT array 14 may include fewer cascaded ELITs or ELIT regions, e.g., two cascaded ELITs or ELIT regions, and that in other alternate embodiments the ELIT array 14 may include more cascaded ELITs or ELIT regions, e.g., four or more cascaded ELITs or ELIT regions. The construction and operation of any such alternate ELIT array 14 will generally follow that of the embodiment illustrated in FIGS. 1-4E and described below.

In the illustrated embodiment, four corresponding voltage sources V1-V4 are electrically connected to the ion mirrors M1-M4 respectively. Each voltage source V1-V4 illustratively includes one or more switchable DC voltage sources which may be controlled or programmed to selectively produce a number, N, of programmable or controllable voltages, wherein N may be any positive integer. Illustrative examples of such voltages will be described below with respect to FIGS. 2A and 2B to separately and/or together establish one of two different operating modes of each ion mirror M1-M4 as will be described in detail below. In any case, a longitudinal axis 24 extends centrally through each of the charge detectors CD1-CD3 and the regions or cavities R1, R2 of each of the ion mirrors M1-M4 (and passing centrally through each of the apertures defined in and through each of the ion mirrors M1-M4), and the central axis 24 defines an ideal travel path along which ions move within the ELIT array 14 and portions thereof under the influence of electric fields selectively established by the voltage sources V1-V4.

The voltage sources V1-V4 are illustratively shown electrically connected by a number, P, of signal paths to a conventional processor 16 including a memory 18 having instructions stored therein which, when executed by the processor 16, cause the processor 16 to control the voltage sources V1-V4 to produce desired DC output voltages for selectively establishing electric fields within the ion mirror regions or cavities R1, R2 of the respective ion mirrors M1-M4. P may be any positive integer. In some alternative embodiments, one or more of the voltage sources V1-V4 may be programmable to selectively produce one or more constant output voltages. In other alternative embodiments, one or more of the voltage sources V1-V4 may be configured to produce one or more time-varying output voltages of any desired shape. It will be understood that more or fewer voltage sources may be electrically connected to the mirror electrodes M1-M4 in alternate embodiments.

Each charge detector CD1-CD3 is electrically connected to a signal input of a corresponding one of three charge sensitive preamplifiers CP1-CP3, and the signal outputs of each charge preamplifier CP1-CP3 is electrically connected to the processor 16. The charge preamplifiers CP1-CP3 are each illustratively operable in a conventional manner to receive detection signals detected by a respective one of the charge detectors CD1-CD3, to produce charge detection signals corresponding thereto and to supply the charge detection signals to the processor 16. The processor 16 is, in turn, illustratively operable to receive and digitize the charge detection signals produced by each of the charge preamplifiers CP1-CP3, and to store the digitized charge detection signals in the memory 18. The processor 16 is further illustratively coupled to one or more peripheral devices 20 (PD) for providing signal input(s) to the processor 16 and/or to which the processor 16 provides signal output(s). In some embodiments, the peripheral devices 20 include at least one of a conventional display monitor, a printer and/or other output device, and in such embodiments the memory 18 has instructions stored therein which, when executed by the processor 16, cause the processor 16 to control one or more such output peripheral devices 20 to display and/or record analyses of the stored, digitized charge detection signals. In some embodiments, a conventional microchannel plate (MP) detector 22 may be disposed at the ion outlet of the ELIT array 14, i.e., at the ion outlet of the ion mirror M4, and electrically connected to the processor 16. In such embodiments, the microchannel plate detector 22 is operable to supply detection signals to the processor 16 corresponding to detected ions and/or neutrals.

As will be described in greater detail below, the voltage sources V1-V4 are illustratively controlled in a manner which selectively and successively guides ions entering the ELIT array 14 from the ion source 12 into each of the three separate ELITs or ELIT regions E1-E3 such that a different ion is trapped in each of the three regions E1-E3 and oscillates therein between respective ones of the ion mirrors M1-M4 each time passing through a respective one of the charge detectors CD1-CD3. A plurality of charge and oscillation period values are measured at each charge detector CD1-CD3, and the recorded results are processed to determine charge, mass-to-charge ratio and mass values of the ions in each of the three ELITs or ELIT regions E1-E3. Depending upon a number of factors including, but not limited to, the dimensions of the three ELITs or ELIT regions E1-E3, the ion oscillation frequency and the resident times of the ions within each of the three ELITs or ELIT regions E1-E3, the trapped ions oscillate simultaneously within at least two of the three ELITs or ELIT regions E1-E3, and in typical implementations within each of the three of the ELITs or ELIT regions E1-E3, such that ion charge and mass-to-charge ratio measurements can be collected simultaneously from at least two of the three ELITs or ELIT regions E1-E3.

Figure 2B:
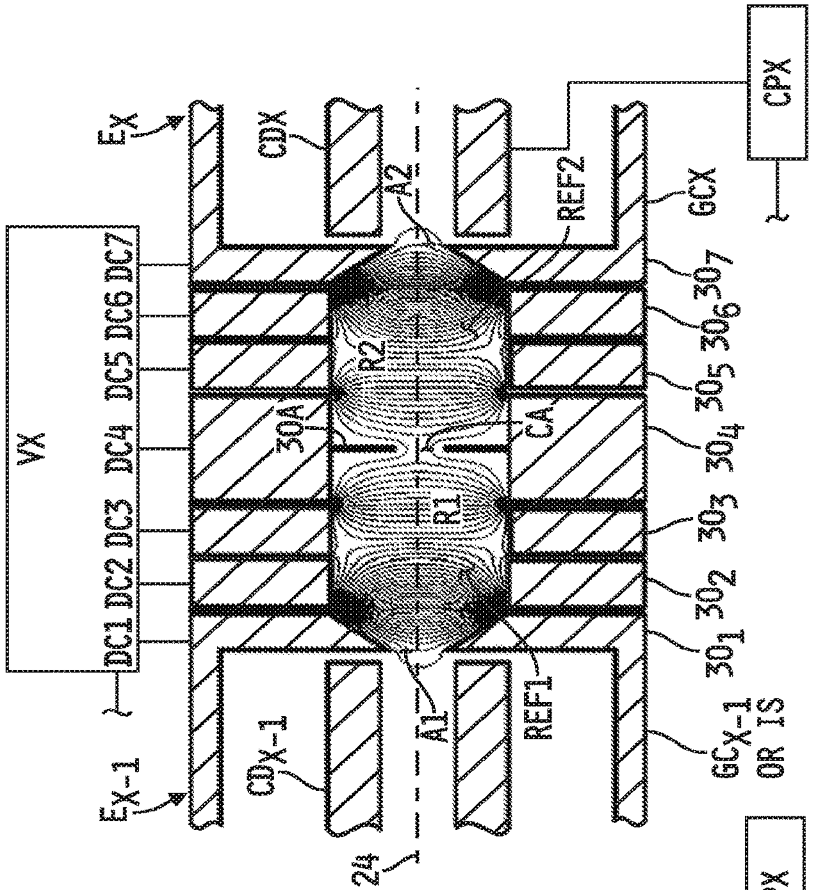
FIG. 2B is a magnified view of another example one of the ion mirrors of the ELIT array illustrated in FIG. 1 in which the mirror electrodes are controlled to produce an ion reflection electric field within the example ion mirror.
Figure 2A:
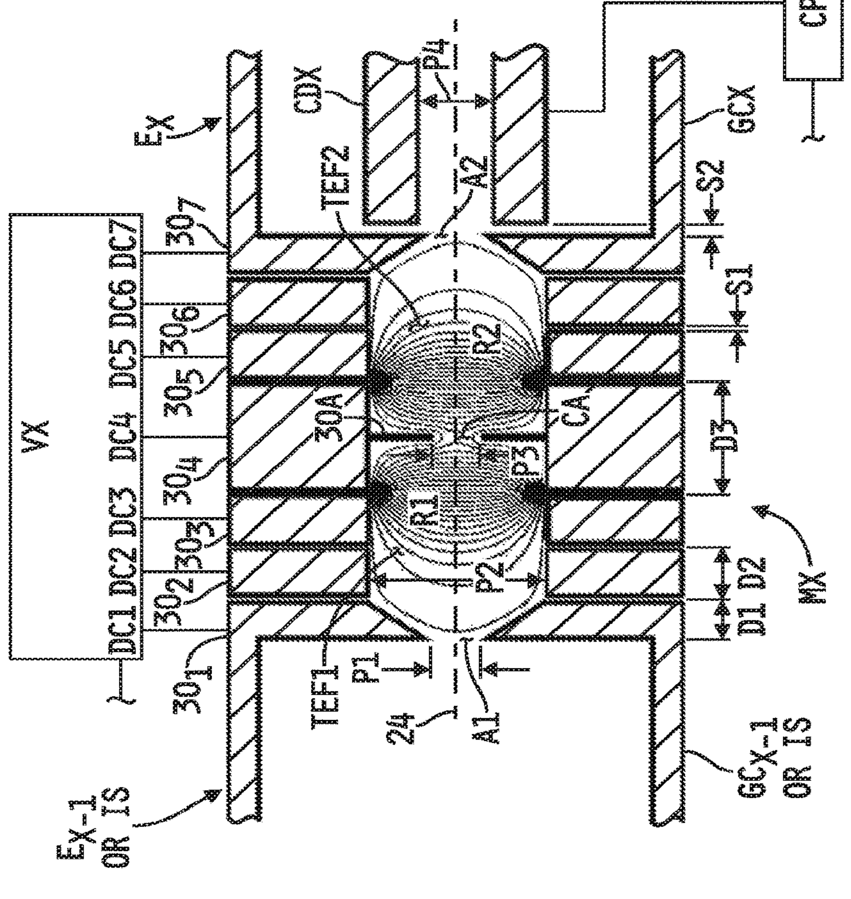
FIG. 2A is a magnified view of an example one of the ion mirrors of the ELIT array illustrated in FIG. 1 in which the mirror electrodes are controlled to produce an ion transmission electric field within the example ion mirror.

Referring now to FIGS. 2A and 2B, an embodiment is shown of one of the ion mirrors MX of the ELIT array 14 of FIG. 1, where X=1-4, illustrating example construction and operation thereof. In each of FIGS. 2A and 2B, the illustrated ion mirror MX includes a cascaded arrangement of 7 axially spaced-apart, electrically conductive mirror electrodes. For each of the ion mirrors M2-M4, a first electrode $\mathbf{30}_1$ is formed by the ground cylinder, $GC_{X-1}$, disposed about a respective one of the charge detectors $CD_{X-1}$. The first electrode $\mathbf{30}_1$ of the ion mirror M1, on the other hand, is formed by an ion outlet of the ion source 12 (IS) or as part of an ion focusing or transition stage between the ion source 12 and the ELIT array 14. FIG. 2B illustrates the former and FIG. 2A illustrates the latter. In either case, the first mirror electrode $\mathbf{30}_1$ defines an aperture A1 centrally therethrough which serves as an ion entrance and/or exit to and/or from the corresponding ion mirror MX. The aperture A1 of the first electrode $\mathbf{30}_1$ of the ion mirror M1 illustratively serves as the ion inlet to the ELIT array 14. The aperture A1 is illustratively conical in shape which increases linearly between the internal and external faces of $GC_{X-1}$ or IS from a first diameter P1 defined at the internal face of $GC_{X-1}$ or IS to an expanded diameter P2 at the external face of $GC_{X-1}$ or IS. The first mirror electrode $\mathbf{30}_1$ illustratively has a thickness of D1.

A second mirror electrode $\mathbf{30}_2$ of the ion mirror MX is spaced apart from the first mirror electrode $\mathbf{30}_1$ and defines a passageway therethrough of diameter P2. A third mirror electrode $\mathbf{30}_3$ is spaced apart from the second mirror electrode $\mathbf{30}_2$ and likewise defines a passageway therethrough of diameter P2. The second and third mirror electrodes $\mathbf{30}_2$, $\mathbf{30}_3$ illustratively have equal thickness of D2≥D1. A fourth mirror electrode $\mathbf{30}_4$ is spaced apart from the third mirror electrode $\mathbf{30}_3$. The fourth mirror electrode $\mathbf{30}_4$ defines a passageway therethrough of diameter P2 and illustratively has a thickness D3 of between approximately 2D2 and 3D2. A plate, ring or grid 30A is illustratively positioned centrally within the passageway of the fourth mirror electrode $\mathbf{30}_4$ and defines a central aperture CA therethrough having a diameter P3. In the illustrated embodiment, P3<P1 although in other embodiments P3 may be greater than or equal to P1. A fifth mirror electrode $\mathbf{30}_5$ is spaced apart from the fourth mirror electrode $\mathbf{30}_4$, and a sixth mirror electrode $\mathbf{30}_6$ is spaced apart from the fifth mirror electrode $\mathbf{30}_5$. Illustratively, the fifth and sixth mirror electrodes $\mathbf{30}_5$, $\mathbf{30}_6$ are identical to the third and second mirror electrodes $\mathbf{30}_3$, $\mathbf{30}_2$ respectively.

For each of the ion mirrors M1-M3, a seventh mirror electrode $\mathbf{30}_7$ is formed by the ground cylinder, $GC_X$, disposed about a respective one of the charge detectors $CD_X$. The seventh electrode $\mathbf{30}_7$ of the ion mirror M4, on the other hand, may be a stand-alone electrode since the ion mirror M4 is the last in the sequence. In either case, the seventh mirror electrode $\mathbf{30}_7$ defines an aperture A2 centrally therethrough which serves as an ion entrance and/or exit to and/or from the ion mirror MX. The aperture A2 is illustratively the mirror image of the aperture A1, and is of a conical shape which decreases linearly between the external and internal faces of $GC_X$ from expanded diameter P2 defined at the external face of $GC_X$ to the reduced diameter P1 at the internal face of $GC_X$. The seventh mirror electrode $\mathbf{30}_7$ illustratively has a thickness of D1. In some embodiments, as illustrated by example in FIG. 1, the last ion mirror in the sequence, i.e., M4 in FIG. 1, may terminate at the plate or grid 30A such that M4 includes only the mirror electrodes $\mathbf{30}_1$-$\mathbf{30}_3$ and only part of the mirror electrode $\mathbf{30}_4$ including the plate or grid 30A so that M4 includes only the ion mirror region R1 depicted in FIGS. 2A and 2B. In such embodiments, the central aperture CA of M4 defines an ion exit passageway from the ELIT array 14. Similarly, the first ion mirror in the sequence, i.e., M1 in FIG. 1, may, in some embodiments, terminate at the plate or grid 30A such that M1 includes only the mirror electrodes the mirror electrodes $\mathbf{30}_5$-$\mathbf{30}_7$ and only part of the mirror electrode $\mathbf{30}_4$ including the plate or grid 30A so that M4 includes only the ion mirror region R2 depicted in FIGS. 2A and 2B. In such embodiments, the central aperture CA of M1 defines the ion inlet to the ELIT array 14.

The mirror electrodes $\mathbf{30}_1$-$\mathbf{30}_7$ are illustratively equally spaced apart from one another by a space S1. Such spaces S1 between the mirror electrodes $\mathbf{30}_1$-$\mathbf{30}_7$ may be voids in some embodiments, i.e., vacuum gaps, and in other embodiments such spaces S1 may be filled with one or more electrically non-conductive, e.g., dielectric, materials. The mirror electrodes $\mathbf{30}_1$-$\mathbf{30}_7$ are axially aligned, i.e., collinear, such that a longitudinal axis 24 passes centrally through each aligned passageway and also centrally through the apertures A1, A2 and CA. In embodiments in which the spaces S1 include one or more electrically non-conductive materials, such materials will likewise define respective passageways therethrough which are axially aligned, i.e., collinear, with the passageways defined through the mirror electrodes $\mathbf{30}_1$-$\mathbf{30}_7$ and which have diameters of P2 or greater.

In each of the ion mirrors M1-M4, the region R1 is defined between the aperture A1 of the mirror electrode $\mathbf{30}_1$ and the central aperture CA defined through the plate or grid 30A. In each of the ion mirrors M1-M3, the adjacent region R2 is defined between the central aperture CA defined through the plate or grid 30A and the aperture A2 of the mirror electrode $30_7$. In the illustrated embodiment, the ion mirrors M1-M3 are each shown in the form of a single mirror structure defining two adjacent and opposed, i.e., back-to-back, and axially aligned ion mirror regions R1, R2 separated by a plate 30A defining an aperture CA centrally therethrough. In some alternate embodiments, one or more of the ion mirrors M1-M3 (and/or M4 in embodiments in which M4 is configured identically to M1-M3), may instead be implemented as separate, axially aligned ion mirror structures arranged back-to-back relative to one another and spaced apart from one another by a conventional, electrically non-conductive spacer, e.g., an electrically insulating plate or ring. In some such embodiments, the separate, back-to-back ion mirror structures may be coupled together, i.e., affixed or mounted to one another, and in other embodiments such structures may be spaced apart from one another but not physically coupled together. In one illustrative example of this alternate embodiment using selected parts of the ion mirror structures illustrated in FIGS. 2A and 2B as example components, the ion mirror defining R1 may include the mirror electrodes $30_1$-$30_3$, one transverse half of the mirror electrode $30_4$ adjacent to the mirror electrode $30_3$ and the plate, ring or grid 30A modified to be secured to the exposed end of the mirror electrode $30_4$ such that the longitudinal axis 24 passes through the aperture CA. The oppositely-facing ion mirror defining R2 may similarly include the mirror electrodes $30_5$-$30_7$, one transverse half of the mirror electrode $30_4$ adjacent to the mirror electrode $30_5$ and the plate, ring or grid 30A modified to be secured to the exposed end of the mirror electrode $30_5$ such that the longitudinal axis 24 passes through the aperture CA. Those skilled in the art will recognize other ion mirror designs which may be used and which define R1 and R2 in a single structure or in separate structures, and it will be understood that any such alternate ion mirror designs are intended to fall within the scope of this disclosure.

Within each ELIT or ELIT region E1-E3, a respective charge detector CD1-CD3, each in the form of an elongated, electrically conductive cylinder, is positioned and spaced apart between corresponding ones of the ion mirrors M1-M4 by a space S2. Illustratively, S2>S1, although in alternate embodiments S2 may be less than or equal to S2. In any case, each charge detection cylinder CD1-CD3 illustratively defines a passageway axially therethrough of diameter P4, and each charge detection cylinder CD1-CD3 is oriented relative to the ion mirrors M1-M4 such that the longitudinal axis 24 extends centrally through the passageway thereof. In the illustrated embodiment, P1<P4<P2, although in other embodiments the diameter of P4 may be less than or equal to P1, or greater than or equal to P2. Each charge detection cylinder CD1-CD3 is illustratively disposed within a field-free region of a respective one of the ground cylinders GC1-GC3, and each ground cylinder GC1-GC3 is positioned between and forms part of respective ones of the ion mirrors M1-M4 as described above. In operation, the ground cylinders GC1-G3 are illustratively controlled to ground potential such that the first and seventh electrodes $30_1$, $30_7$ are at ground potential at all times. In some alternate embodiments, either or both of first and seventh electrodes $30_1$, $30_7$ in one or more of the ion mirrors M1-M4 may be set to any desired DC reference potential, and in other alternate embodiments either or both of first and seventh electrodes $30_1$, $30_7$ in one or more of the ion mirrors M1-M4 may be electrically connected to a switchable DC or other time-varying voltage source.

As briefly described above, the voltage sources V1-V4 are illustratively controlled in a manner which causes ions entering into the ELIT array 14 from the ion source 12 to be selectively trapped within each of the ELITs or ELIT regions E1-E3. More specifically, the voltage sources V1-V4 are controlled in a manner which sequentially traps an ion in each ELIT or ELIT region illustratively beginning with E3 and ending with E1, and which causes each trapped ion to oscillate within a respective one of the ELITs or ELIT regions E1-E3 between respective ones of the ion mirrors M1-M4. Each such trapped, oscillating ion thus repeatedly passes through a respective one of the charge detectors CD1-CD3 in a respective one of the three ELITs or ELIT regions E1-E3, and charge and oscillation period values are measured and recorded at each charge detector CD1-CD3 each time a respective oscillating ion passes therethrough. The measurements are recorded and the recorded results are processed to determine charge, mass-to-charge ratio and mass values of each of the three ions.

Within each ELIT or ELIT region E1-E3 of the ELIT array 14, an ion is captured and made to oscillate between opposed regions of the respective ion mirrors M1-M4 by controlling the voltage sources V1-V4 to selectively establish ion transmission and ion reflection electric fields within the regions R1, R2 of the ion mirrors M1-M4. In this regard, each voltage source VX is illustratively configured in one embodiment to produce seven DC voltages DC1-DC7, and to supply each of the voltages DC1-DC7 to a respective one of the mirror electrodes $30_1$-$30_7$ of the respective ion mirror MX. In some embodiments in which one or more of the mirror electrodes $30_1$-$30_7$ is to be held at ground potential at all times, the one or more such mirror electrodes $30_1$-$30_7$ may alternatively be electrically connected to the ground reference of the voltage supply VX and the corresponding one or more voltage outputs DC1-DC7 may be omitted. Alternatively or additionally, in embodiments in which any two or more of the mirror electrodes $30_1$-$30_7$ are to be controlled to the same non-zero DC values, any such two or more mirror electrodes $30_1$-$30_7$ may be electrically connected to a single one of the voltage outputs DC1-DC7 and superfluous ones of the output voltages DC1-DC7 may be omitted.

As illustrated by example in FIGS. 2A and 2B, each ion mirror MX is controllable, by selective application of the voltages DC1-DC7, between an ion transmission mode (FIG. 2A) in which the voltages DC1-DC7 produced by the voltage source VX establish ion transmission electric fields in each of the regions R1, R2 of the ion mirror MX, and an ion reflection mode (FIG. 2B) in which the voltages DC1-DC7 produced by the voltage source VX establish ion trapping or reflection electric fields in each of the regions R1, R2 of the ion mirror MX. In the ion transmission mode, the voltages DC1-DC7 are selected to establish an ion transmission electric field TEF1 within the region R1 of the ion mirror MX and to establish another ion transmission electric field TEF2 within the region R2 of the ion mirror MX. Example ion transmission electric field lines are depicted in each of the ion mirror regions R1 and R2 of the ion mirror illustrated in FIG. 2A. The ion transmission electric fields TEF1 and TEF2 are illustratively established so as to focus ions toward the central, longitudinal axis 24 within the ion mirror MX so as to maintain a narrow ion trajectory about the axis 24 as ions pass through both regions R1, R2 the ion mirror MX into an adjacent charge detection cylinder CDX.

In the ion reflection mode, the voltages DC1-DC7 are selected to establish an ion reflection electric field REF1 within the region R1 of the ion mirror MX and to establish another ion reflection electric field REF2 within the region R2 of the ion mirror MX. Example ion reflection electric field lines are depicted in each of the ion mirror regions R1 and R2 of the ion mirror illustrated in FIG. 2B. The ion reflection electric fields REF2 and REF2 are illustratively established so as to cause an ion traveling axially into the respective region R1, R2 toward the central aperture CA of MX to reverse direction and be accelerated by the reflection electric field REF1, REF2 in an opposite direction axially away from the central aperture CA. Each ion reflection electric field REF1, REF2 does so by first decelerating and stopping the ion traveling into the respective region R1, R2 of the ion mirror MX, and then accelerating the ion in the opposite direction back through the respective region R1, R2 while focusing the ion toward the longitudinal axis 24 such that the ion travels away from the respective region R1, R2 along a narrow trajectory in an opposite direction from which the ion entered the respective region R1, R2. Thus, an ion traveling from the charge detection cylinder $CD_{X-1}$ into the region R1 of the ion mirror MX along or close to the central, longitudinal axis 24 is reflected by reflective electric field REF1 back toward and into the charge detection cylinder $CD_{X-1}$ along or close to the central, longitudinal axis 24, and another ion traveling from the charge detection cylinder CDX into the region R2 of the ion mirror MX along or close to the central, longitudinal axis 24 is reflected by the reflective electric field REF2 back toward and into the charge detection cylinder CDX along or close to the central, longitudinal axis 24. An ion that traverses the length of the ELIT or ELIT region E1-E3 and is reflected by the ion reflection electric field REF in the ion regions R1, R2 of the respective ion mirrors M1-M4 in a manner that enables the ion to continue traveling back and forth through the charge detection cylinder CD between such the ion mirrors as just described is considered to be trapped within that ELIT or ELIT region E1-E3.

Example sets of output voltages DC1-DC7 produced by the voltage sources V1-V4 respectively to control a corresponding one of the ion mirrors M1-M4 to the ion transmission and reflection modes described above are shown in TABLE I below. It will be understood that the following values of DC1-DC7 are provided only by way of example, and that other values of one or more of DC1-DC7 may alternatively be used.

TABLE I

| Ion Mirror Operating Mode | Output Voltages (volts DC) |
|---|---|
| Transmission (single ion mirror) | DC1 = DC2 = DC3 = DC5 = DC6 = DC7 = 0<br>DC4 = 880 |
| Transmission (all ion mirrors - all-pass) | V1: DC1 = DC2 = DC3 = DC5 = DC6 = DC7 = 0<br>DC4 = 830<br>V2-V4: DC1 = DC2 = DC3 = DC5 = DC6 = DC7 = 0<br>DC4 = 880 |
| Reflection (single ion mirror) | DC1 = DC7 = 0<br>DC2 = DC6 = 1350<br>DC3 = DC5 = 1250<br>DC4 = 1900 |

In the examples illustrated in FIGS. 2A and 2B and described above, the voltage sources V1-V4 are controlled to establish or maintain at any point in time identical electric fields, e.g., ion transmission electric fields TEF or ion reflection electric fields REF, in each of the ion mirror regions R1, R2 of each of the ion mirrors. Such control may also be carried out in embodiments in which one or more of the ion mirror structures is provided in the form of separate, back-to-back ion mirrors as described above. It will be understood, however, that such control represents only one example ion mirror control arrangement, and that in alternate embodiments the voltage sources V1-V4 (and perhaps one or more additional voltage sources) may be controlled to establish, at any particular time or times, different electric fields within the oppositely-facing regions R1, R2 of one or more of the ion mirrors whether provided as a single ion mirror structure or as separate ion mirror structures. Using the arrangement illustrated in FIG. 2B in which an ion reflection electric field REF is established in R1 and R2, for example, the voltage sources V1-V4 (and any additional voltage source(s)) may alternatively be selectively controlled to maintain the ion reflection electric field REF in R1 while at the same time establishing an ion transmission electric field TEF within R2 or vice versa.

Figure 3:
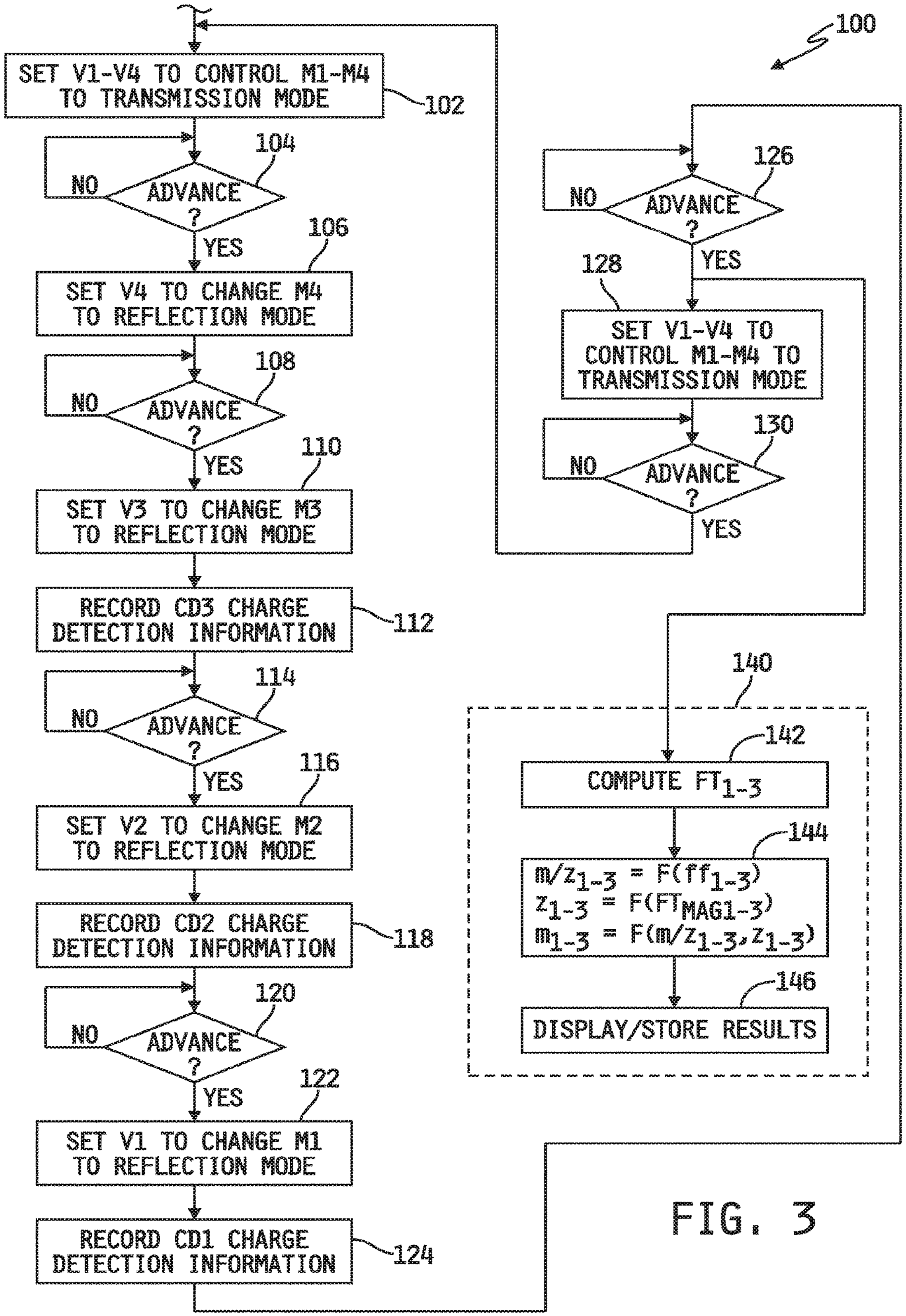
FIG. 3 is a simplified flowchart illustrating an embodiment of a process for controlling operation of the ELIT array of FIG. 1 to determine ion mass and charge information.

Referring now to FIG. 3, a simplified flowchart is shown of a process 100 for controlling the voltage sources V1-V4 to selectively and sequentially control the ion mirrors M1-M4 between their transmission and reflection modes described above to cause an ion entering into the ELIT array 14 from the ion source 12 to be trapped in each of three separate ELITs or ELIT regions E1-E3 such that each trapped ion repeatedly passes through a respective one of the charge detectors CD1-CD3 in a respective one of the three ELITs or ELIT regions E1-E3. The charge and oscillation period values are measured and recorded at each charge detector CD1-CD3 each time a respective oscillating ion passes therethrough, and ion charge, mass-to-charge and mass values are then determined based on the recorded data. In the illustrated embodiment, the process 100 is illustratively stored in the memory 18 in the form of instructions which, when executed by the processor 16, cause the processor 16 to perform the stated functions. In alternate embodiments in which one or more of the voltage sources V1-V4 is/are programmable independently of the processor 16, one or more aspects of the process 100 may be executed in whole or in part by the one or more such programmable voltage sources V1-V4. For purposes of this disclosure, however, the process 100 will be described as being executed solely by the processor 16. With the aid of FIGS. 4A-4E, the process 100 will be described as operating on positively charged ions, although it will be understood that the process 100 may alternatively operate on one or more negatively charges particles.

Figures 4A, 4B, 4C, 4D, 4E:
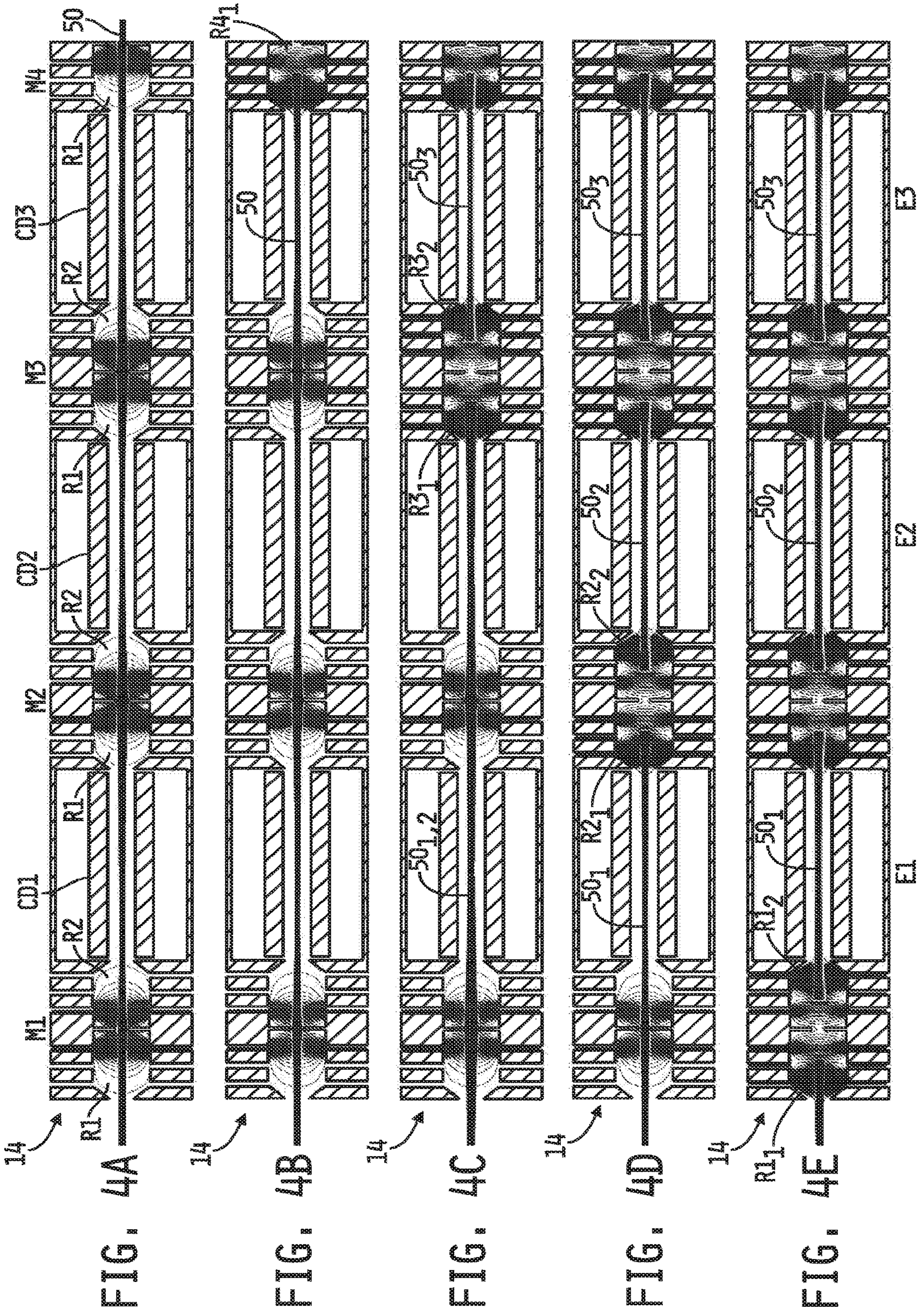
FIGS. 4A-4E are simplified diagrams of the ELIT array of FIG. 1 demonstrating sequential control and operation of the multiple ion mirrors according to the process illustrated in FIG. 3.

With reference to FIG. 4A, the process 100 begins at step 102 where the processor 16 is operable to control the voltage sources V1-V4 to set the voltages DC1-DC7 of each in a manner which causes all of the ion mirrors M1-M4 to operate in the ion transmission mode such that the transmission electric fields TEF1, TEF2 established in the respective regions R1, R2 of each operates to pass ions therethrough while focusing the ions toward the longitudinal axis 24 so as to follow a narrow trajectory through the ELIT array 14. In one example embodiment, the voltage sources V1-V4 are illustratively controlled at step 102 of the process 100 to produce the voltages DC1-DC7 according to the all-pass transmission mode as illustrated in Table I above. In any case, with each of the voltage sources V1-V4 set at step 102 to control the ion mirrors M1-M4 to operate in the ion transmission mode, ions entering M1 from the ion source 12 pass through all of the ion mirrors M1-M4 and all of the charge detectors CD1-CD3 and exit M4 as illustrated by the example ion trajectory 50 depicted in FIG. 4A. Such control of the ion mirrors M1-M4 to their respective transmission modes thus passes one or more ions entering the ELIT array 14 from the ion source 12 into and through the entire ELIT array 14 as shown in FIG. 4A. The ion trajectory 50 depicted in FIG. 4A may illustratively represent a single ion or a collection of ions.

Following step 102, the process 100 advances to step 104 where the processor 16 is operable to pause and determine when to advance to step 106. In one embodiment of step 102, the ELIT array 14 is illustratively controlled in a "random trapping mode" in which the ion mirrors M1-M4 are held in their transmission modes for a selected time period during which one or more ions generated by the ion source 12 will be expected to enter and travel through the ELIT array 14. As one non-limiting example, the selected time period which the processor 16 spends at step 104 before moving on to step 106 when operating in the random trapping mode is on the order of 1-3 millisecond (ms) depending upon the axial length of the ELIT array 14 and of the velocity of ions entering the ELIT array 14, although it will be understood that such selected time period may, in other embodiments, be greater than 3 ms or less than 1 ms. Until the selected time period has elapsed, the process 100 follows the NO branch of step 104 and loops back to the beginning of step 104. After passage of the selected time period, the process 100 follows the YES branch of step 104 and advances to step 106. In some alternate embodiments of step 104, such as in embodiments which include the micro-channel plate detector 22, the processor 16 may be configured to advance to step 106 only after one or more ions has been detected by the detector 22, with or without a further additional delay period, so as to ensure that ions are being moved through the ELIT array 14 before advancing to step 106. In other alternate embodiments, the ELIT array 14 may illustratively be controlled by the processor 16 in a "trigger trapping mode" in which the ion mirrors M1-M4 are held in their ion transmission modes until an ion is detected at the charge detector CD3. Until such detection, the process 100 follows the NO branch of step 104 and loops back to the beginning of step 104. Detection by the processor 16 of an ion at the charge detector CD3 is indicative of the ion passing through the charge detector CD3 toward the ion mirror M4 and serves as a trigger event which causes the processor 16 to follow the YES branch of step 104 and advance to step 106 of the process 100.

Following the YES branch of step 104 and with reference to FIG. 4B, the processor 16 is operable at step 106 to control the voltage source V4 to set the output voltages DC1-DC7 thereof in a manner which changes or switches the operation of the ion mirror M4 from the ion transmission mode of operation to the ion reflection mode of operation in which an ion reflection electric field $R4_1$ is established within the region R1 of M4. The ion reflection electric field $R4_1$ operates, as described above, to reflect the one or more ions entering the region R1 of M4 back toward the ion mirror M3 (and through the charge detector CD3) as described above with respect to FIG. 2B. The output voltages DC1-DC7 produced by the voltage sources V1-V3 respectively are unchanged at step 106 so that the ion mirrors M1-M3 each remain in the ion transmission mode. As a result, an ion traveling in the ELIT array 14 toward the ion mirror M4 is reflected back toward the ion mirror M3 and will be focused toward the axis 24 as the ion moves toward the ion inlet of M3, as illustrated by the ion trajectory 50 illustrated in FIG. 4B.

Following step 106, the process 100 advances to step 108 where the processor 16 is operable to pause and determine when to advance to step 110. In embodiments of step 108 in which the ELIT array 14 is controlled by the processor 16 in random trapping mode, the ion mirrors M1-M3 are held at step 108 in their transmission modes for a selected time period during which an ion may enter the ELIT or ELIT region E3. As one non-limiting example, the selected time period which the processor 16 spends at step 108 before moving on to step 110 when operating in the random trapping mode is on the order of 0.1 millisecond (ms), although it will be understood that such selected time period may, in other embodiments, be greater than 0.1 ms or less than 0.1 ms. Until the selected time period has elapsed, the process 100 follows the NO branch of step 108 and loops back to the beginning of step 108. After passage of the selected time period, the process 100 follows the YES branch of step 108 and advances to step 110. In alternate embodiments of step 108 in which the ELIT array 14 is controlled by the processor 16 in trigger trapping mode, the ion mirrors M1-M3 are held in their ion transmission modes until an ion is detected at the charge detector CD3. Until such detection, the process 100 follows the NO branch of step 108 and loops back to the beginning of step 108. Detection by the processor 16 of an ion at the charge detector CD3 ensures that the ion is moving through the charge detector CD3 and serves as a trigger event which causes the processor 16 to follow the YES branch of step 108 and advance to step 110 of the process 100.

Following the YES branch of step 108 and with reference to FIG. 4C, the processor 16 is operable at step 110 to control the voltage source V3 to set the output voltages DC1-DC7 thereof in a manner which changes or switches the operation of the ion mirror M3 from the ion transmission mode of operation to the ion reflection mode of operation in which an ion reflection electric field $R3_1$ is established within the region R1 of M3 and an ion reflection electric field $R3_2$ is established within the region R2 of M3. As a result, an ion is trapped within the ELIT or ELIT region E3, and due to the reflection electric fields $R3_2$ and $R4_1$ established within region R2 of the ion mirror M3 and the region R1 of the ion mirror M4 respectively, the trapped ion oscillates between M3 and M4, each time passing through the charge detection cylinder CD3 as illustrated by the ion trajectory $\mathbf{50}_3$ depicted in FIG. 4C. Each time the ion passes through the charge detection cylinder CD3 it induces a charge on the cylinder CD3 which is detected by the charge preamplifier CP3 (see FIG. 1). At step 112, the processor 16 is operable, as the ion oscillates back and forth between the ion mirrors M3, M4 and through the charge detection cylinder CD3, to record an amplitude and timing of each such CD3 charge detection event and to store it in the memory 18.

The ion reflection electric field $R3_1$ operates, as described above, to reflect an ion entering the region R1 of M3 back toward the ion mirror M2 (and through the charge detector CD2) as described above with respect to FIG. 2B. The output voltages DC1-DC7 produced by the voltage sources V1-V2 respectively are unchanged at steps 110 and 112 so that the ion mirrors M1-M2 each remain in the ion transmission mode. As a result, an ion traveling in the ELIT array 14 toward the ion mirror M3 is reflected back toward the ion mirror M2 and will be focused toward the axis 24 as it moves toward the ion inlet of M1, as illustrated by the ion trajectory $\mathbf{50}_{1,2}$ illustrated in FIG. 4C.

Following steps 110 and 112, the process 100 advances to step 114 where the processor 16 is operable to pause and determine when to advance to step 116. In embodiments of step 114 in which the ELIT array 14 is controlled by the processor 16 in random trapping mode, the ion mirrors M1-M2 are held at step 114 in their transmission modes for a selected time period during which one or more ions may enter the ELIT or ELIT region E2. As one non-limiting example, the selected time period which the processor 16 spends at step 114 before moving on to step 116 when operating in the random trapping mode is on the order of 0.1 millisecond (ms), although it will be understood that such selected time period may, in other embodiments, be greater than 0.1 ms or less than 0.1 ms. Until the selected time period has elapsed, the process 100 follows the NO branch of step 114 and loops back to the beginning of step 108. After passage of the selected time period, the process 100 follows the YES branch of step 114 and advances to step 116. In alternate embodiments of step 114 in which the ELIT array 14 is controlled by the processor 16 in trigger trapping mode, the ion mirrors M1-M2 are held in their ion transmission modes until an ion is detected at the charge detector CD2. Until such detection, the process 100 follows the NO branch of step 114 and loops back to the beginning of step 114. Detection by the processor 16 of an ion at the charge detector CD2 ensures that the ion is moving through the charge detector CD2 and serves as a trigger event which causes the processor 16 to follow the YES branch of step 114 and advance to step 116 of the process 100.

The ion reflection electric field $R2_1$ operates, as described above, to reflect an ion entering the region R1 of M2 back toward the ion mirror M1 (and through the charge detector CD1) as described above with respect to FIG. 2B. The output voltages DC1-DC7 produced by the voltage source V1 are unchanged at steps 116 and 118 so that the ion mirror M1 remains in the ion transmission mode. As a result, an ion traveling in the ELIT array 14 toward the ion mirror M2 is reflected back toward the ion mirror M1 and will be focused toward the axis 24 as the ion moves toward the ion inlet of M1, as illustrated by the ion trajectory $\mathbf{50}_1$ illustrated in FIG. 4D.

Following the YES branch of step 114 and as the ion in the ELIT or ELIT region E3 continues to oscillate back and forth through the charge detection cylinder CD3 between the ion mirrors M3 and M4, the process 100 advances to step 116. With reference to FIG. 4D, the processor 16 is operable at step 116 to control the voltage source V2 to set the output voltages DC1-DC7 thereof in a manner which changes or switches the operation of the ion mirror M2 from the ion transmission mode of operation to the ion reflection mode of operation in which an ion reflection electric field $R2_1$ is established within the region R1 of M2 and an ion reflection electric field $R2_2$ is established within the region R2 of M2. As a result, an ion is trapped within the ELIT or ELIT region E2, and due to the reflection electric fields $R2_2$ and $R3_1$ established within region R2 of the ion mirror M2 and the region R1 of the ion mirror M3 respectively, the trapped ion oscillates between M2 and M3, each time passing through the charge detection cylinder CD2 as illustrated by the ion trajectory $\mathbf{50}_2$ depicted in FIG. 4D. Each time the ion passes through the charge detection cylinder CD2 it induces a charge on the cylinder CD2 which is detected by the charge preamplifier CP2 (see FIG. 1). At step 118, the processor 16 is operable, as the ion oscillates back and forth between the ion mirrors M2, M3 and through the charge detection cylinder CD2, to record an amplitude and timing of each such CD2 charge detection event and to store it in the memory 18. Thus, following step 116, an ion is oscillating back and forth through the charge detection cylinder CD3 of the ELIT or ELIT region E3 between the ion mirrors M3 and M4 and, simultaneously, another ion is oscillating back and forth through the charge detection cylinder CD2 of the ELIT or ELIT region E2 between the ion mirrors M2 and M3.

Following steps 116 and 118, the process 100 advances to step 120 where the processor 16 is operable to pause and determine when to advance to step 122. In embodiments of step 120 in which the ELIT array 14 is controlled by the processor 16 in random trapping mode, the ion mirror M1 is held at step 120 in its transmission mode of operation for a selected time period during which one or more ions may enter the ELIT or ELIT region E1. As one non-limiting example, the selected time period which the processor 16 spends at step 120 before moving on to step 122 when operating in the random trapping mode is on the order of 0.1 millisecond (ms), although it will be understood that such selected time period may, in other embodiments, be greater than 0.1 ms or less than 0.1 ms. Until the selected time period has elapsed, the process 100 follows the NO branch of step 120 and loops back to the beginning of step 120. After passage of the selected time period, the process 100 follows the YES branch of step 120 and advances to step 122. In alternate embodiments of step 120 in which the ELIT array 14 is controlled by the processor 16 in trigger trapping mode, the ion mirror M1 is held in its ion transmission mode of operation until an ion is detected at the charge detector CD1. Until such detection, the process 100 follows the NO branch of step 120 and loops back to the beginning of step 120. Detection by the processor 16 of an ion at the charge detector CD1 ensures that an ion is moving through the charge detector CD1 and serves as a trigger event which causes the processor 16 to follow the YES branch of step 120 and advance to step 122 of the process 100.

Following the YES branch of step 120, and an ion in the ELIT or ELIT region E3 continues to oscillate back and forth through the charge detection cylinder CD3 between the ion mirrors M3 and M4 and also as another ion in the ELIT or ELIT region E2 simultaneously continues to oscillate back and forth through the charge detection cylinder CD2 between the ion mirrors M2 and M3 the process 100 advances to step 122. With reference to FIG. 4E, the processor 16 is operable at step 122 to control the voltage source V1 to set the output voltages DC1-DC7 thereof in a manner which changes or switches the operation of the ion mirror M1 from the ion transmission mode of operation to the ion reflection mode of operation in which an ion reflection electric field $R1_1$ is established within the region R1 of M1 and an ion reflection electric field Rh is established within the region R1 of M1. As a result, an ion is trapped within the ELIT or ELIT region E1, and due to the reflection electric fields $R1_2$ and $R2_1$ established within region R2 of the ion mirror M1 and the region R2 of the ion mirror M2 respectively, the trapped ion oscillates between M1 and M2, each time passing through the charge detection cylinder CD1 as illustrated by the ion trajectory $\mathbf{50}_1$ depicted in FIG. 4E. Each time the ion passes through the charge detection cylinder CD1 it induces a charge on the cylinder CD1 which is detected by the charge preamplifier CP1 (see FIG. 1). At step 124, the processor 16 is operable, as the ion oscillates back and forth between the ion mirrors M1, M2 and through the charge detection cylinder CD1, to record an amplitude and timing of each such CD1 charge detection event and to store it in the memory 18. Thus, following step 122, an ion is oscillating back and forth through the charge detection cylinder CD3 of the ELIT or ELIT region E3 between the ion mirrors M3 and M4 and, simultaneously, another ion is oscillating back and forth through the charge detection cylinder CD2 of the ELIT or ELIT region E2 between the ion mirrors M2 and M3, and also simultaneously yet another ion is oscillating back and forth through the charge detection cylinder CD1 of the ELIT or ELIT region E1 between the ion mirrors M1 and M2.

Following steps 122 and 124, the process 100 advances to step 126 where the processor 16 is operable to pause and determine when to advance to step 128. In one embodiment, the processor 16 is configured, i.e. programmed, to allow the ions to oscillate back and forth simultaneously through each of the ELITs or ELIT regions E1-E3 for a selected time period, i.e., a total ion cycle measurement time, during which ion detection events, i.e., by each of the charge detectors CD1-CD3, are recorded by the processor 16. As one non-limiting example, the selected time period which the processor 16 spends at step 126 before moving on to step 128 is on the order of 100-300 millisecond (ms), although it will be understood that such selected time period may, in other embodiments, be greater than 300 ms or less than 100 ms. Until the selected time period has elapsed, the process 100 follows the NO branch of step 126 and loops back to the beginning of step 126. After passage of the selected time period, the process 100 follows the YES branch of step 126 and advances to steps 128 and 140. In some alternate embodiments of the process 100, the voltage sources V1-V4 may illustratively be controlled by the processor 16 at step 126 to allow the ions to oscillate back in forth through the charge detectors CD1-CD3 a selected number of times, i.e., a total number of measurement cycles, during which ion detection events, i.e., by each of the charge detectors CD1-CD3, are recorded by the processor 16. Until the processor counts the selected number ion detection events of one or more of the charge detectors CD1-CD3, the process 100 follows the NO branch of step 126 and loops back to the beginning of step 126. Detection by the processor 16 of the selected number of ion detection events serves as a trigger event which causes the processor 16 to follow the YES branch of step 126 and advance to steps 128 and 140 of the process 100.

Following the YES branch of step 126, the processor 16 is operable at step 128 to control the voltage sources V1-V4 to set the output voltages DC1-DC7 of each in a manner which changes or switches the operation of all of the ion mirrors M1-M4 from the ion reflection mode of operation to the ion transmission mode of operation in which the ion mirrors M1-M4 each operate to allow passage of ions therethrough. Illustratively, the voltage sources V1-V4 are illustratively controlled at step 128 of the process 100 to produce the voltages DC1-DC7 according to the all-pass transmission mode as illustrated in Table I above, which re-establishes the ion trajectory 50 illustrated in FIG. 4A in which (i) all ions within the ELIT array 14 are focused by the ion transmission electric fields TEF1, TEF2 established in each of the ion mirrors M1-M4 toward the axis 24 such that the ions move through and out of the ELIT array 14, and (ii) all ions entering M1 from the ion source 12 pass through all of the ion mirrors M1-M4 and all of the charge detectors CD1-CD3.

Following step 128, the processor 16 is operable at step 130 to pause for a selected time period to allow the ions contained within the ELIT array 14 to travel out of the ELIT array 14. As one non-limiting example, the selected time period which the processor 12 spends at step 130 before looping back to step 102 to restart the process 100 is on the order of 1-3 milliseconds (ms), although it will be understood that such selected time period may, in other embodiments, be greater than 3 ms or less than 1 ms. Until the selected time period has elapsed, the process 100 follows the NO branch of step 130 and loops back to the beginning of step 130. After passage of the selected time period, the process 100 follows the YES branch of step 130 and loops back to step 102 to restart the process 100.

Also following the YES branch of step 126, the process 100 additionally advances to step 140 to analyze the data collected during steps 112, 118 and 124 of the process 100 just described. In the illustrated embodiment, the data analysis step 140 illustratively includes step 142 in which the processor 16 is operable to compute Fourier transforms of the recorded sets of stored charge detection signals provided by each of the charge preamplifiers CP1-CP3. The processor 16 is illustratively operable to execute step 142 using any conventional digital Fourier transform (DFT) technique such as for example, but not limited to, a conventional Fast Fourier Transform (FFT) algorithm. In any case, the processor 16 is operable at step 142 to compute three Fourier Transforms, $FT_1$, $FT_2$ and $FT_3$, wherein $FT_1$ is the Fourier Transform of the recorded set of charge detection signals provided by the first charge preamplifier CP1, thus corresponding to the charge detection events detected by the charge detection cylinder CD1 of the ELIT or ELIT region E1, $FT_2$ is the Fourier Transform of the recorded set of charge detection signals provided by the first charge preamplifier CP2, thus corresponding to the charge detection events detected by the charge detection cylinder CD2 of the ELIT or ELIT region E2 and $FT_3$ is the Fourier Transform of the recorded set of charge detection signals provided by the first charge preamplifier CP3, thus corresponding to the charge detection events detected by the charge detection cylinder CD3 of the ELIT or ELIT region E3.

Following step 142, the process 100 advances to step 144 where the processor 16 is operable to compute three sets of ion mass-to-charge ratio values ($m/z_1$, $m/z_2$ and $m/z_3$), ion charge values ($z_1$, $z_2$ and $z_3$) and ion mass values ($m_1$, $m_2$ and $m_3$), each as a function of a respective one of the computed Fourier Transform values $FT_1$, $FT_2$, $FT_3$). Thereafter at step 146 the processor 16 is operable to store the computed results in the memory 18 and/or to control one or more of the peripheral devices 20 to display the results for observation and/or further analysis.

It is generally understood that the mass-to-charge ratio (m/z) of ion(s) oscillating back and forth between opposing ion mirrors in any of the ELITs or ELIT regions E1-E3 is inversely proportional to the square of the fundamental frequency ff of the oscillating ion(s) according to the equation:

$$m/z=C/ff^2,$$

where C is a constant that is a function of the ion energy and also a function of the dimensions of the respective ELIT or ELIT region, and the fundamental frequency ff is determined directly from the respective computed Fourier Transform. Thus, $ff_1$ is the fundamental frequency of $FT_1$, $ff_2$ is the fundamental frequency of $FT_2$ and $ff_3$ is the fundamental frequency of $FT_3$. Typically, C is determined using conventional ion trajectory simulations. In any case, the value of the ion charge, z, is proportional to the magnitude $FT_{MAG}$ of the fundamental frequency of the respective Fourier Transform FT, taking into account the number of ion oscillation cycles. In some cases, the magnitude(s) of one or more of the harmonic frequencies of the FFT may be added to the magnitude of the fundamental frequency for purposes of determining the ion charge values. In any case, ion mass, m, is then calculated as a product of m/z and z. Thus, with respect to the recorded set of charge detection signals provided by the first charge preamplifier CP1, the processor 16 is operable at step 144 to compute $m/z_1=C/ff_1^2$, $z_1=F(FT_{MAG1})$ and $m_1=(m/z_1)(z_1)$. With respect to the recorded set of charge detection signals provided by the second charge preamplifier CP2, the processor 16 is similarly operable at step 144 to compute $m/z_2=C/ff_2^2$, $z_2=F(FT_{MAG2})$ and $m_2=(m/z_2)(z_2)$, and with respect to the recorded set of charge detection signals provided by the third charge preamplifier CP3, the processor 16 is likewise operable at step 144 to compute $m/z_3=C/ff_3^2$, $z_3=F(FT_{MAG3})$ and $m_3=(m/z_3)(z_3)$.

Figure 5A:
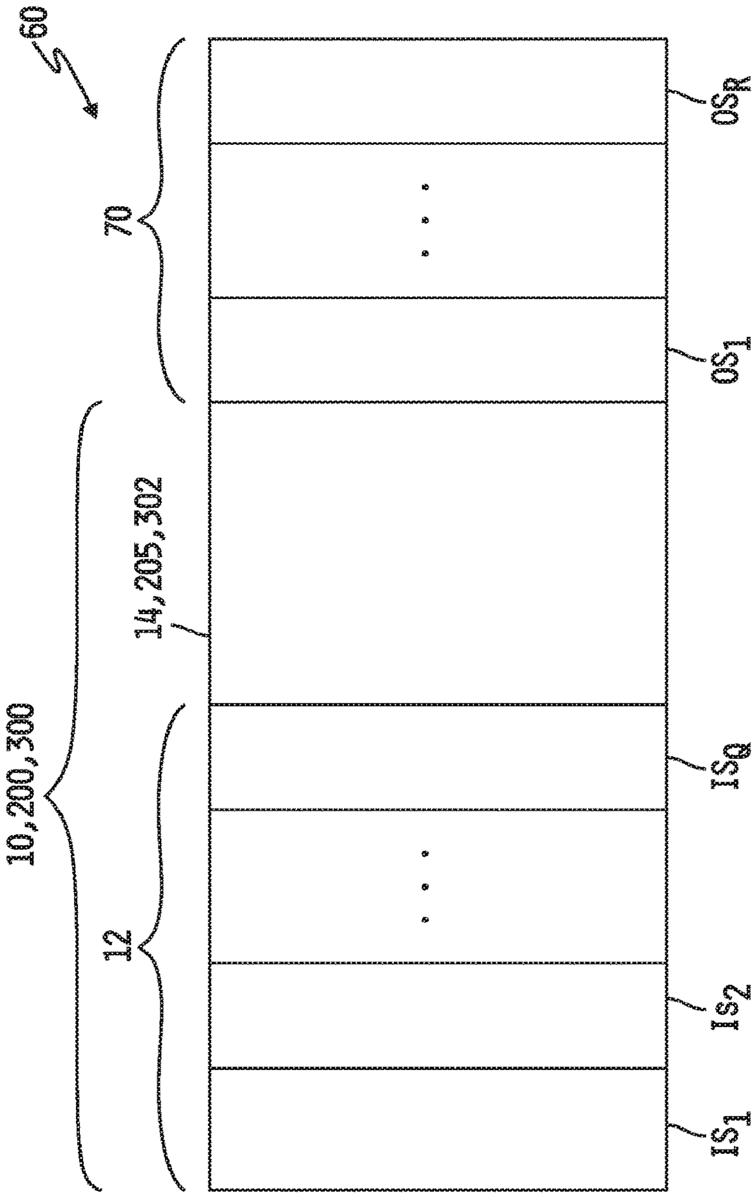
FIG. 5A is a simplified block diagram of an embodiment of an ion separation instrument including any of the ELIT arrays illustrated and described herein and showing example ion processing instruments which may form part of the ion source upstream of the ELIT array(s) and/or which may be disposed downstream of the ELIT array(s) to further process ion(s) exiting the ELIT array(s).

Referring now to FIG. 5A, a simplified block diagram is shown of an embodiment of an ion separation instrument 60 which may include any of the ELIT arrays 14, 205, 302 illustrated and described herein and which may include any of the charge detection mass spectrometers (CDMS) 10, 200, 300 illustrated and described herein, and which may include any number of ion processing instruments which may form part of the ion source 12 upstream of the ELIT array(s) and/or which may include any number of ion processing instruments which may be disposed downstream of the ELIT array(s) to further process ion(s) exiting the ELIT array(s). In this regard, the ion source 12 is illustrated in FIG. 5A as including a number, Q, of ion source stages $IS_1$-$IS_Q$ which may be or form part of the ion source 12. Alternatively or additionally, an ion processing instrument 70 is illustrated in FIG. 5A as being coupled to the ion outlet of the ELIT array 14, 205, 302, wherein the ion processing instrument 70 may include any number of ion processing stages $OS_1$-$OS_R$, where R may be any positive integer.

Focusing on the ion source 12, it will be understood that the source 12 of ions entering the ELIT 10 may be or include, in the form of one or more of the ion source stages $IS_1$-$IS_Q$, any conventional source of ions as described above, and may further include one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps), for filtering ions (e.g., according to one or more molecular characteristics such as ion mass, ion mass-to-charge, ion mobility, ion retention time and the like), for fragmenting or otherwise dissociating ions, for normalizing ion charge states, and the like. It will be understood that the ion source 12 may include one or any combination, in any order, of any such conventional ion sources, ion separation instruments and/or ion processing instruments, and that some embodiments may include multiple adjacent or spaced-apart ones of any such conventional ion sources, ion separation instruments and/or ion processing instruments.

Turning now to the ion processing instrument 70, it will be understood that the instrument 70 may be or include, in the form of one or more of the ion processing stages $OS_1$-$OS_R$, one or more conventional instruments for separating ions according to one or more molecular characteristics (e.g., according to ion mass, ion mass-to-charge, ion mobility, ion retention time, or the like) and/or one or more conventional ion processing instruments for collecting and/or storing ions (e.g., one or more quadrupole, hexapole and/or other ion traps), for filtering ions (e.g., according to one or more molecular characteristics such as ion mass, ion mass-to-charge, ion mobility, ion retention time and the like), for fragmenting or otherwise dissociating ions, for normalizing ion charge states, and the like. It will be understood that the ion processing instrument 70 may include one or any combination, in any order, of any such conventional ion separation instruments and/or ion processing instruments, and that some embodiments may include multiple adjacent or spaced-apart ones of any such conventional ion separation instruments and/or ion processing instruments. In any implementation which includes one or more mass spectrometers, any one or more such mass spectrometers may be implemented in any of the forms described above with respect to FIG. 1.

As one specific implementation of the ion separation instrument 60 illustrated in FIG. 5A, which should not be considered to be limiting in any way, the ion source 12 illustratively includes 3 stages, and the ion processing instrument 70 is omitted. In this example implementation, the ion source stage $IS_1$ is a conventional source of ions, e.g., electrospray, MALDI or the like, the ion source stage $IS_2$ is a conventional mass filter, e.g., a quadrupole or hexapole ion guide operated as a high-pass or band-pass filter, and the ion source stage $IS_3$ is a mass spectrometer of any of the types described above. In this embodiment, the ion source stage $IS_2$ is controlled in a conventional manner to preselect ions having desired molecular characteristics for analysis by the downstream mass spectrometer, and to pass only such preselected ions to the mass spectrometer, wherein the ions analyzed by the ELIT array 14, 205, 302 will be the preselected ions separated by the mass spectrometer according to mass-to-charge ratio. The preselected ions exiting the ion filter may, for example, be ions having a specified ion mass or mass-to-charge ratio, ions having ion masses or ion mass-to-charge ratios above and/or below a specified ion mass or ion mass-to-charge ratio, ions having ion masses or ion mass-to-charge ratios within a specified range of ion mass or ion mass-to-charge ratio, or the like. In some alternate implementations of this example, the ion source stage $IS_2$ may be the mass spectrometer and the ion source stage $IS_3$ may be the ion filter, and the ion filter may be otherwise operable as just described to preselect ions exiting the mass spectrometer which have desired molecular characteristics for analysis by the downstream ELIT array 14, 205, 302. In other alternate implementations of this example, the ion source stage $IS_2$ may be the ion filter, and the ion source stage $IS_3$ may include a mass spectrometer followed by another ion filter, wherein the ion filters each operate as just described.

As another specific implementation of the ion separation instrument 60 illustrated in FIG. 5A, which should not be considered to be limiting in any way, the ion source 12 illustratively includes 2 stages, and the ion processing instrument 70 is omitted. In this example implementation, the ion source stage $IS_1$ is a conventional source of ions, e.g., electrospray, MALDI or the like, the ion source stage $IS_2$ is a conventional mass spectrometer of any of the types described above. This is the CDMS implementation described above with respect to FIG. 1 in which the ELIT array 14, 205, 302 is operable to analyze ions exiting the mass spectrometer.

As yet another specific implementation of the ion separation instrument 60 illustrated in FIG. 5A, which should not be considered to be limiting in any way, the ion source 12 illustratively includes 2 stages, and the ion processing instrument 70 is omitted. In this example implementation, the ion source stage $IS_1$ is a conventional source of ions, e.g., electrospray, MALDI or the like, and the ion processing stage $OS_2$ is a conventional single or multiple-stage ion mobility spectrometer. In this implementation, the ion mobility spectrometer is operable to separate ions, generated by the ion source stage $IS_1$, over time according to one or more functions of ion mobility, and the ELIT array 14, 205, 302 is operable to analyze ions exiting the ion mobility spectrometer. In an alternate implementation of this example, the ion source 12 may include only a single stage $IS_1$ in the form of a conventional source of ions, and the ion processing instrument 70 may include a conventional single or multiple-stage ion mobility spectrometer as a sole stage $OS_1$ (or as stage $OS_1$ of a multiple-stage instrument 70). In this alternate implementation, the ELIT array 14, 205, 302 is operable to analyze ions generated by the ion source stage $IS_1$, and the ion mobility spectrometer $OS_1$ is operable to separate ions exiting the ELIT array 14, 205, 302 over time according to one or more functions of ion mobility. As another alternate implementation of this example, single or multiple-stage ion mobility spectrometers may follow both the ion source stage $IS_1$ and the ELIT array 14, 205, 302. In this alternate implementation, the ion mobility spectrometer following the ion source stage $IS_1$ is operable to separate ions, generated by the ion source stage $IS_1$, over time according to one or more functions of ion mobility, the ELIT array 14, 205, 302 is operable to analyze ions exiting the ion source stage ion mobility spectrometer, and the ion mobility spectrometer of the ion processing stage $OS_1$ following the ELIT array 14, 205, 302 is operable to separate ions exiting the ELIT array 14, 205, 302 over time according to one or more functions of ion mobility. In any implementations of the embodiment described in this paragraph, additional variants may include a mass spectrometer operatively positioned upstream and/or downstream of the single or multiple-stage ion mobility spectrometer in the ion source 12 and/or in the ion processing instrument 210.

As still another specific implementation of the ion separation instrument 60 illustrated in FIG. 5A, which should not be considered to be limiting in any way, the ion source 12 illustratively includes 2 stages, and the ion processing instrument 70 is omitted. In this example implementation, the ion source stage $IS_1$ is a conventional liquid chromatograph, e.g., HPLC or the like configured to separate molecules in solution according to molecule retention time, and the ion source stage $IS_2$ is a conventional source of ions, e.g., electrospray or the like. In this implementation, the liquid chromatograph is operable to separate molecular components in solution, the ion source stage $IS_2$ is operable to generate ions from the solution flow exiting the liquid chromatograph, and the ELIT array 14, 205, 302 is operable to analyze ions generated by the ion source stage $IS_2$. In an alternate implementation of this example, the ion source stage $IS_1$ may instead be a conventional size-exclusion chromatograph (SEC) operable to separate molecules in solution by size. In another alternate implementation, the ion source stage $IS_1$ may include a conventional liquid chromatograph followed by a conventional SEC or vice versa. In this implementation, ions are generated by the ion source stage $IS_2$ from a twice separated solution; once according to molecule retention time followed by a second according to molecule size, or vice versa. In any implementations of the embodiment described in this paragraph, additional variants may include a mass spectrometer operatively positioned between the ion source stage $IS_2$ and the ELIT 14, 205, 302.

Figure 5B:
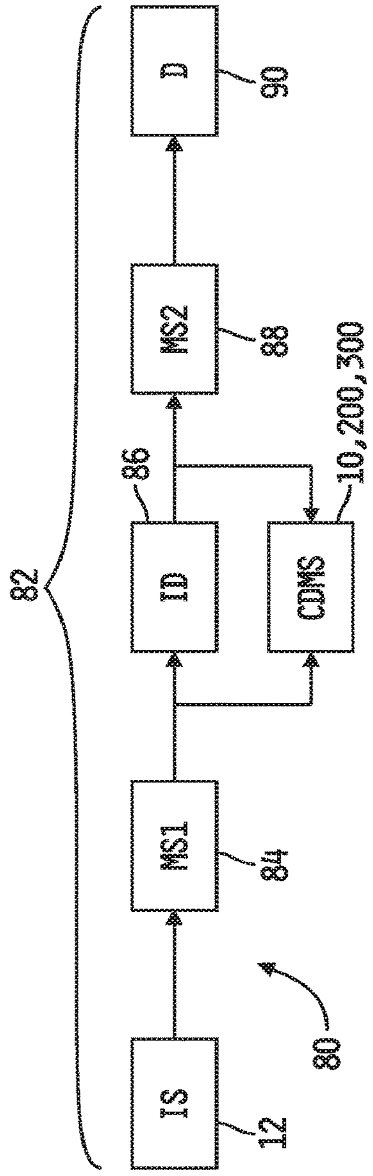
FIG. 5B is a simplified block diagram of another embodiment of an ion separation instrument including any of the ELIT arrays illustrated and described herein and showing example implementation which combines conventional ion processing instruments with any of the embodiments of the ion mass detection system illustrated and described herein.

Referring now to FIG. 5B, a simplified block diagram is shown of another embodiment of an ion separation instrument 80 which illustratively includes a multi-stage mass spectrometer instrument 82 and which also includes any of the CDMS instruments 10, 200, 300 illustrated and described herein implemented as a high ion mass analysis component. In the illustrated embodiment, the multi-stage mass spectrometer instrument 82 includes an ion source (IS) 12, as illustrated and described herein, followed by and coupled to a first conventional mass spectrometer (MS1) 84, followed by and coupled to a conventional ion dissociation stage (ID) 86 operable to dissociate ions exiting the mass spectrometer 84, e.g., by one or more of collision-induced dissociation (CID), surface-induced dissociation (SID), electron capture dissociation (ECD) and/or photo-induced dissociation (PID) or the like, followed by an coupled to a second conventional mass spectrometer (MS2) 88, followed by a conventional ion detector (D) 90, e.g., such as a microchannel plate detector or other conventional ion detector. The CDMS 10, 200, 300 is coupled in parallel with and to the ion dissociation stage 86 such that the CDMS 10, 200, 300 may selectively receive ions from the mass spectrometer 84 and/or from the ion dissociation stage 86.

MS/MS, e.g., using only the ion separation instrument 82, is a well-established approach where precursor ions of a particular molecular weight are selected by the first mass spectrometer 84 (MS1) based on their m/z value. The mass selected precursor ions are fragmented, e.g., by collision-induced dissociation, surface-induced dissociation, electron capture dissociation or photo-induced dissociation, in the ion dissociation stage 86. The fragment ions are then analyzed by the second mass spectrometer 86 (MS2). Only the m/z values of the precursor and fragment ions are measured in both MS1 and MS2. For high mass ions, the charge states are not resolved and so it is not possible to select precursor ions with a specific molecular weight based on the m/z value alone. However, by coupling the instrument 82 to the CDMS 10, 200, 300 illustrated and described herein, it is possible to select a narrow range of m/z values and then use the CDMS 10, 200, 300 to determine the masses of the m/z selected precursor ions. The mass spectrometers 84, 88 may be, for example, one or any combination of a magnetic sector mass spectrometer, time-of-flight mass spectrometer or quadrupole mass spectrometer, although in alternate embodiments other mass spectrometer types may be used. In any case, the m/z selected precursor ions with known masses exiting MS1 can be fragmented in the ion dissociation stage 86, and the resulting fragment ions can then be analyzed by MS2 (where only the m/z ratio is measured) and/or by the CDMS instrument 10, 200, 300 (where the m/z ratio and charge are measured simultaneously). Low mass fragments, i.e., dissociated ions of precursor ions having mass values below a threshold mass value, e.g., 10,000 Da (or other mass value), can thus be analyzed by conventional MS, using MS2, while high mass fragments (where the charge states are not resolved), i.e., dissociated ions of precursor ions having mass values at or above the threshold mass value, can be analyzed by the CDMS 10, 200, 300.

Figure 6:
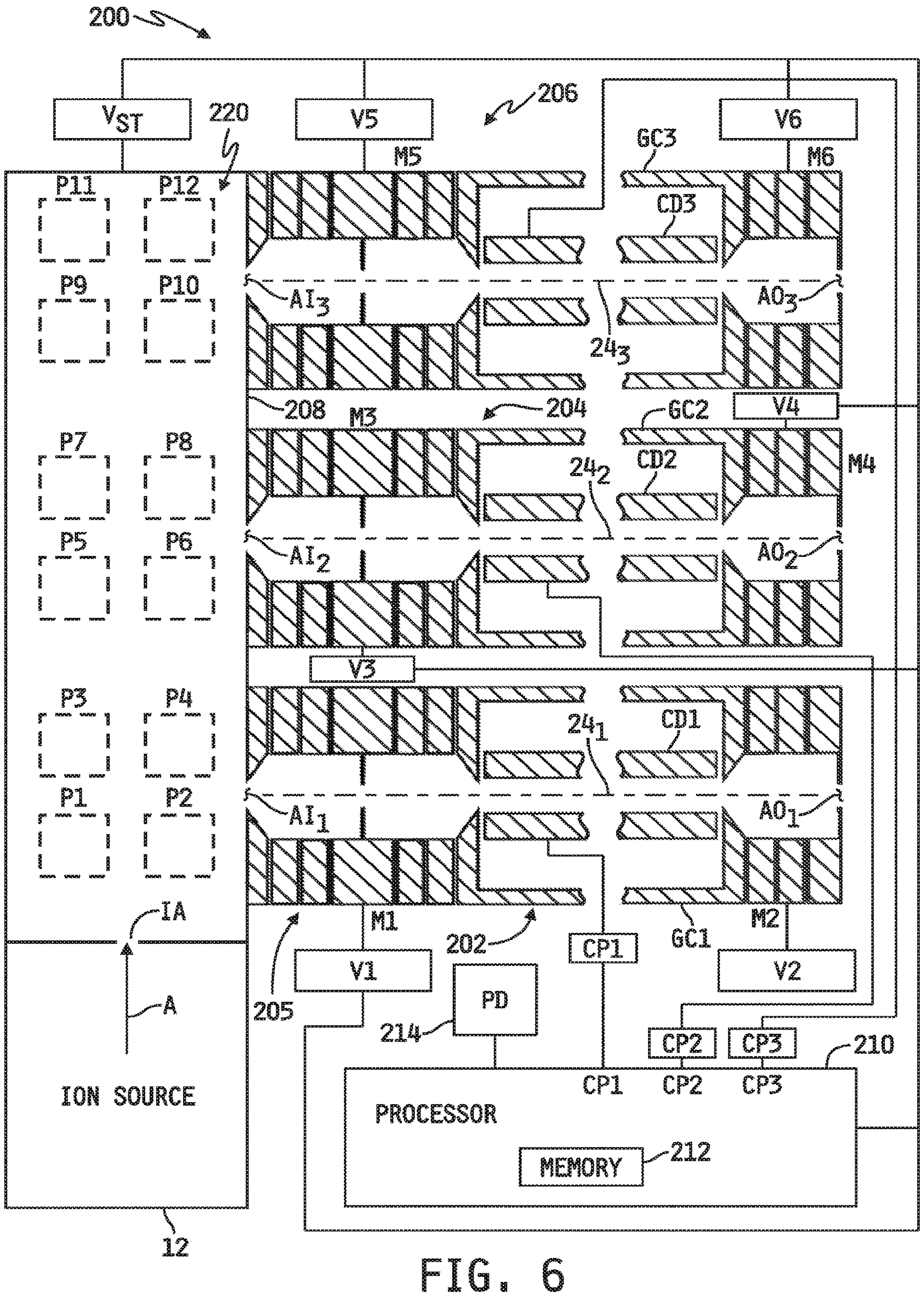
FIG. 6 is a simplified diagram of an ion mass detection system including another embodiment of an electrostatic linear ion trap (ELIT) array with control and measurement components coupled thereto.

Referring now to FIG. 6, another CDMS 200 is shown including another embodiment of an electrostatic linear ion trap (ELIT) array 205 with control and measurement components coupled thereto. In the illustrated embodiment, the ELIT array 205 includes three separate ELITs 202, 204, 206 each configured identically to the ELIT or ELIT region E3 of the ELIT array 14 illustrated in FIG. 1. For example, the ELIT 202 includes a charge detection cylinder CD1 surrounded by a ground chamber GC1, wherein one end of the ground chamber GC1 defines one of the mirror electrodes of one ion mirror M1 and an opposite end of the ground chamber GC1 defines one of the mirror electrodes of another ion mirror M2, and wherein the ion mirrors M1, M2 are disposed at opposite ends of the charge detection cylinder 202. The ion mirror M1 is illustratively identical in structure and function to each of the ion mirrors M1-M3 illustrated in FIGS. 1-2B, and the ion mirror M2 is illustratively identical in structure and function to the ion mirror M4 illustrated in FIGS. 1-2B. A voltage source V1, illustratively identical in structure and function to the voltage source V1 illustrated in FIGS. 1-2B, is operatively coupled to the ion mirror M1, and another voltage source V2, illustratively identical in structure and function to the voltage source V4 illustrated in FIGS. 1-2B, is operatively coupled to the ion mirror M2. The ion mirror M1 defines an ion inlet aperture $AI_1$, illustratively identical in structure and function to the aperture A1 of the ion Mirror MX illustrated in FIG. 2A, and the ion mirror M2 defines an outlet aperture $AO_1$, illustratively identical in structure and operation to the aperture CA of the ion mirror M4 described above with respect to FIGS. 1 and 2B. A longitudinal axis $24_1$ extends centrally through the ELIT 202 and illustratively bisects the apertures $AI_1$ and $AO_1$. A charge preamplifier CP1 is electrically coupled to the charge detection cylinder CD1, and is illustratively identical in structure and function to the charge preamplifier CP1 illustrated in FIG. 1 and described above.

The ELIT 204 is illustratively identical to the ELIT 202 just described with ion mirrors M3, M4 corresponding to the ion mirrors M1, M2 of the ELIT 202, with the voltage sources V3, V4 corresponding to the voltage sources V1, V2 of the ELIT 202 and with inlet/outlet apertures $AI_2/AO_2$ defining a longitudinal axis $24_2$ extending through the ELIT 204 and illustratively bisecting the apertures $AI_2$, $AO_2$. A charge amplifier CP2 is electrically coupled to the charge detection cylinder CD2 of the ELIT 204, and is illustratively identical in structure and function to the charge preamplifier CP2 illustrated in FIG. 1 and described above.

The ELIT 206 is likewise illustratively identical to the ELIT 202 just described with ion mirrors M5, M6 corresponding to the ion mirrors M1, M2 of the ELIT 202, with the voltage sources V5, V6 corresponding to the voltage sources V1, V2 of the ELIT 202 and with inlet/outlet apertures $AI_3/AO_3$ defining a longitudinal axis $24_3$ extending through the ELIT 206 and illustratively bisecting the apertures $AI_3$, $AO_3$. A charge amplifier CP3 is electrically coupled to the charge detection cylinder CD3 of the ELIT 206, and is illustratively identical in structure and function to the charge preamplifier CP3 illustrated in FIG. 1 and described above.

The voltage sources V1-V6, as well as the charge preamplifier CP1-CP3, are operatively coupled to a processor 210 including a memory 212 as described with respect to FIG. 1, wherein the memory 212 illustratively has instructions stored therein which, when executed by the processor 210, cause the processor 210 to control operation of the voltage sources V1-V6 to control the ion mirrors M1-M6 between ion transmission and ion reflection operating modes as described above. Alternatively, one or more of the voltage sources V1-V6 may be programmable to operate as described. In any case, the instructions stored in the memory 212 further illustratively include instructions which, when executed by the processor 210, cause the processor to receive, process and record (store) the charge signals detected by the charge preamplifiers CP1-CP3, and to process the recorded charge signal information to compute the masses of ions captured within each of the ELITs 202, 204, 206 as described above. Illustratively, the processor 210 is coupled to one or more peripheral devices 214 which may be identical to the one or more peripheral devices 20 described above with respect to FIG. 1.

In the embodiment illustrated in FIG. 6, an embodiment of an ion steering array 208 is shown operatively coupled between an ion source 12 and the ion inlet apertures $AI_1$-$AI_3$ of each ELIT 202, 204, 206 in the ELIT array 205. The ion source 12 is illustratively as described with respect to FIGS. 1 and/or 5A, and is configured to generate and supply ions to the ion steering array 208 via an ion aperture IA. An ion steering voltage source $V_{ST}$ is operatively coupled to and between the processor 210 and the ion steering array 208. As will be described in detail below, the processor 210 is illustratively configured, i.e., programmed, to control the ion steering voltage source $V_{ST}$ to cause the ion steering array 208 to selectively steer and guide ions exiting the ion aperture IA of the ion source 12 into the ELITs 202, 204 and 206 via the respective inlet apertures $AI_1$-$AI_3$ thereof. The processor 210 is further configured, i.e., programmed, to control the voltage sources V1-V6 to cause the ion mirrors M1-M6 of the ELITs 202, 204, 206 to selectively switch between the ion transmission and ion reflection modes to thereby trap an ion in each of the ELITs 202, 204, 206, and to then cause such ions to oscillate back and forth between the respective ion mirrors M1/M2, M3/M4 and M5/M6 and through the respective charge detection cylinders CD1-CD3 of the ELITs 202, 204, 206 in order to measure and record ion charge detection events detected by the respective charge preamplifiers CP1-CP3 as described above.

While the ELITs 202, 204 and 206 are illustrated in FIG. 6 as being arranged such that their respective longitudinal axes $24_1$-$24_3$ are parallel with one another, it will be understood that this arrangement is provided only by way of example and that other arrangements are contemplated. In alternate embodiments, for example, the longitudinal axis of one or more of the ELITs may be non-parallel with the longitudinal axis of one or others of the ELITs, and/or the longitudinal axes of two or more, but not all, of the ELITs may be coaxial. It is sufficient for purposes of implementing the ion steering array 208 that the longitudinal axis of at least one of the ELITs is not coaxial with the longitudinal axis of one or more of the remaining ELITs.

In the illustrated embodiment, the ion steering array 208 illustratively includes 3 sets of four electrically conductive pads P1-P4, P5-P8 and P9-P12 arranged on each of two spaced-apart planar substrates such that each of the electrically conductive pads P1-P12 on one of the planar substrates is aligned with and faces a respective one of the electrically conductive pads on the other substrate. In the embodiment illustrated in FIG. 6, only one of the substrates 220 is shown.

Figure 7A:
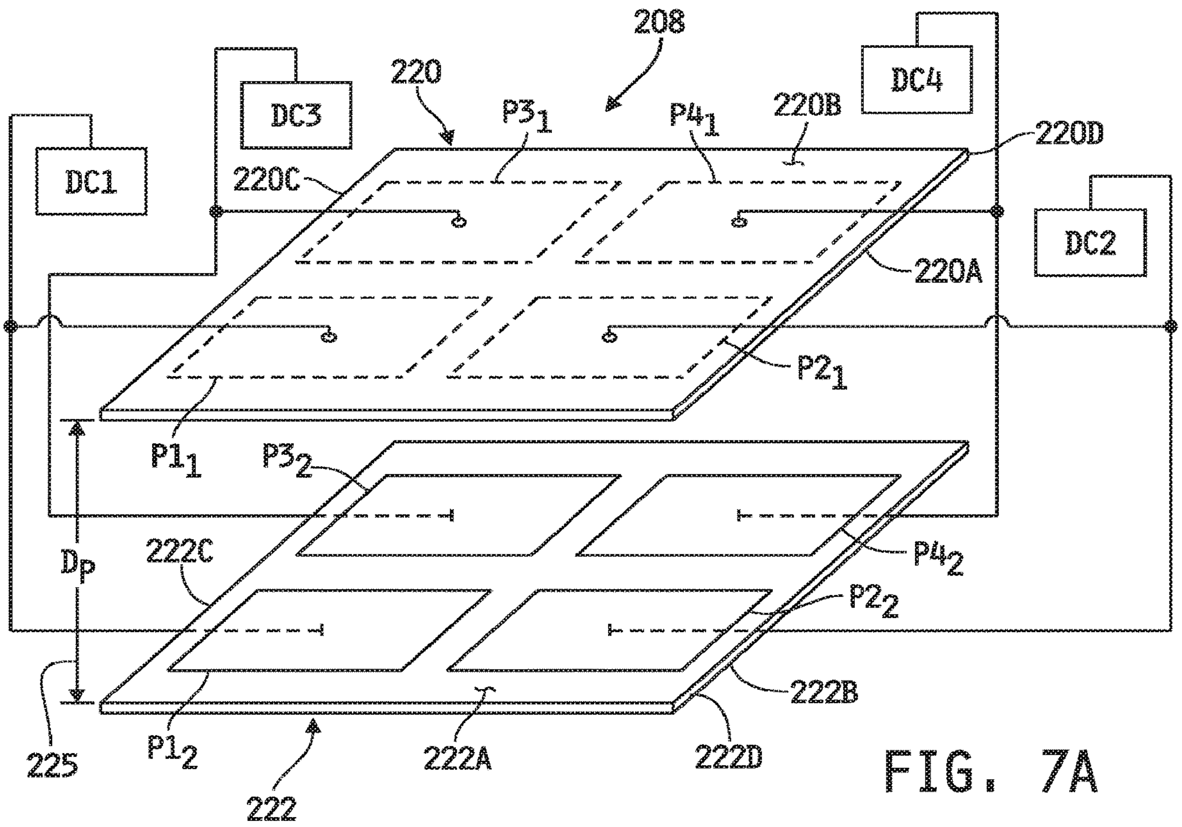
FIG. 7A is a simplified perspective view of an example embodiment of a single ion steering channel that may be implemented in the ion steering channel array illustrated in FIG. 6.
Figure 7B:
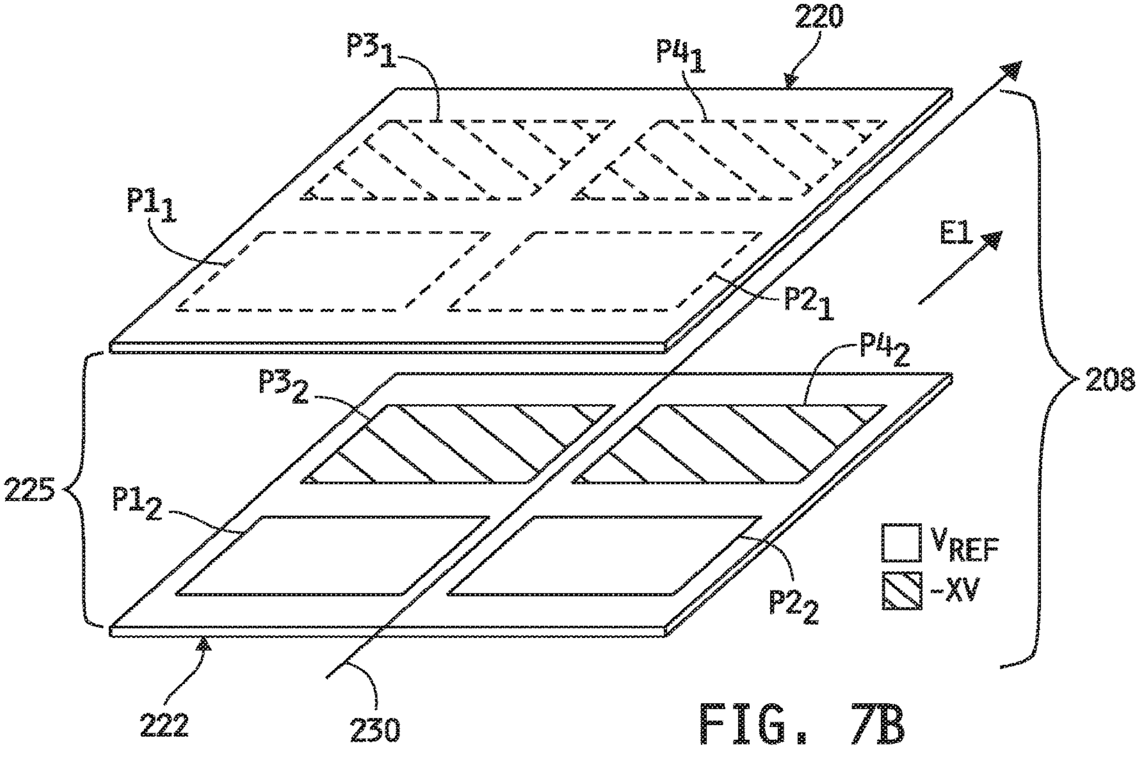
FIG. 7B is a simplified perspective diagram illustrating an example operating mode of the ion steering channel illustrated in FIG. 7A.
Figure 7C:
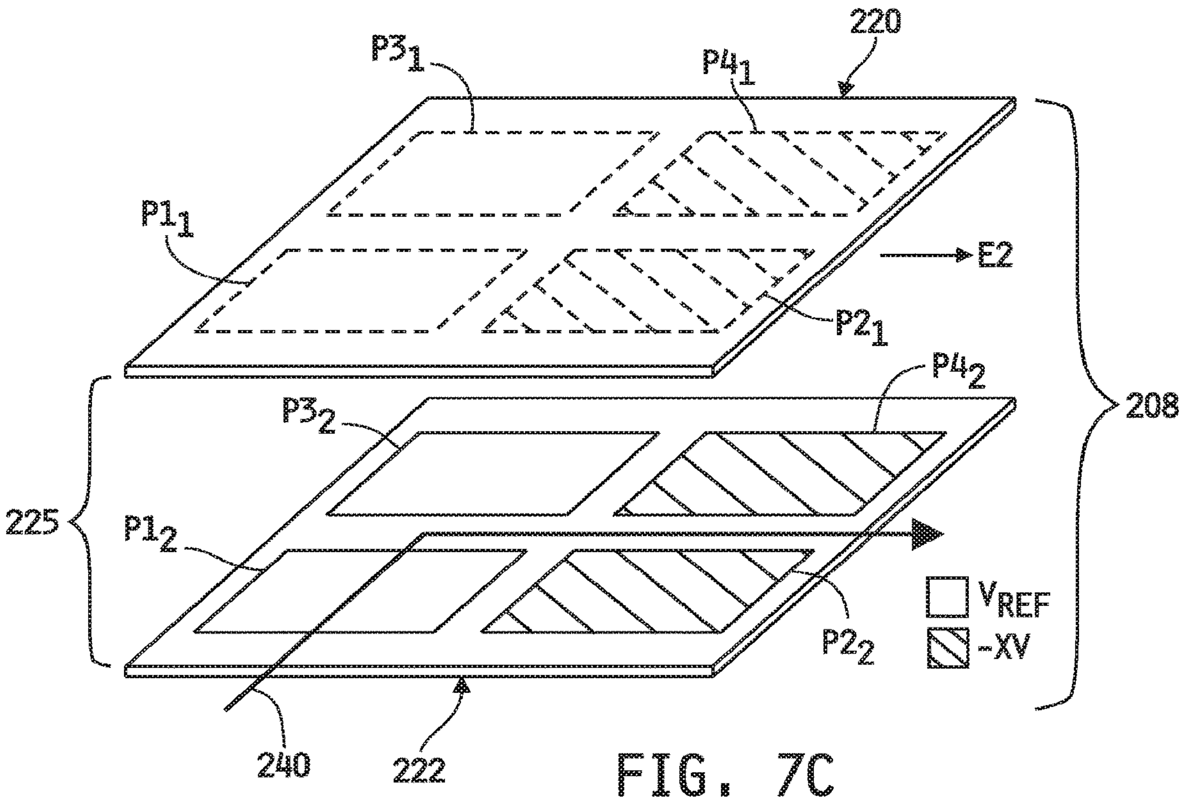
FIG. 7C is a simplified perspective diagram illustrating another example operating mode of the ion steering channel illustrated in FIG. 7A.

Referring now to FIGS. 7A-7C, a portion of the ion steering array 208 is shown which illustrates control and operation thereof to selectively steer ions to desired locations. As shown by example in FIGS. 7B and 7C, the voltage sources DC1-DC4 of the illustrated portion of the ion steering 208 are controlled to cause ions exiting the ion aperture IA of the ion source 12 along the direction indicated by the arrow A to change direction by approximately 90 degrees so as to be directed along a path which is aligned, i.e., collinear, with the ion inlet aperture $AI_1$ of the ELIT 202. Although not illustrated in the drawings, any number of conventional planar ion carpets and/or other conventional ion focusing structures may be used to focus the ion trajectories exiting the ion aperture IA of the ion source and/or to and align the ion trajectories selectively altered by the ion steering array 208 with the ion inlet apertures $AI_1$-$AI_3$ of the respective ELITs 202, 204, 206.

Referring specifically to FIG. 7A, a pattern of 4 substantially identical and spaced apart electrically conductive pads $P1_1$-$P4_1$ is formed on an inner major surface 220A of one substrate 220 having an opposite outer major surface 220B, and an identical pattern of 4 substantially identical and spaced apart electrically conductive pads $P1_2$-$P4_2$ is formed on an inner major surface 222A of another substrate 222 having an opposite outer surface 222B. The inner surfaces 220A, 222A of the substrates 220, 222 are spaced apart in a generally parallel relationship, and the electrically conductive pads $P1_1$-$P4_1$ are juxtaposed over respective ones of the electrically conductive pads $P1_2$-$P4_2$. The spaced-apart, inner major surfaces 220A and 222A of the substrates 220, 222 illustratively define a channel or space 225 therebetween of width a distance $D_P$. In one embodiment, the width, $D_P$, of the channel 225 is approximately 5 cm, although in other embodiments the distance Dp may be greater or lesser than 5 cm. In any case, the substrates 220, 222 together make up the illustrated portion of the ion steering array 208.

The opposed pad pairs $P3_1$, $P3_2$ and $P4_1$, $P4_2$ are upstream of the opposed pad pairs $P1_1$, $P1_2$ and $P2_1$, $P2_2$, and the opposed pad pairs $P1_1$, $P1_2$ and $P2_1$, $P2_2$ are conversely downstream of the opposed pad pairs $P4_1$, $P4_2$ and $P3_1$, $P3_2$. In this regard, the "unaltered direction of ion travel" through the channel 225, as this term is used herein, is "upstream," and generally parallel with the direction A of ions exiting the ion source 12. Transverse edges 220C, 222C of the substrates 220, 222 are aligned, as are opposite transverse edges 220D, 222D, and the "altered direction of ion travel" through the channel 225, as this term is used herein, is from the aligned edges 220C, 222C toward the aligned edges 220D, 222D, and generally perpendicular to both such aligned edges 220C, 222C and 220D, 222D.

In the embodiment illustrated in FIG. 6, the ion steering voltage source $V_{ST}$ is illustratively configured to produce at least 12 switchable DC voltages each operatively connected to respective opposed pairs of the electrically conductive pads P1-P12. Four of the 12 DC voltages DC1-D4 are illustrated in FIG. 7A. The first DC voltage DC1 is electrically connected to each of the juxtaposed electrically conductive pads $P1_1$, $P1_2$, the second DC voltage DC2 is electrically connected to each of the juxtaposed electrically conductive pads $P2_1$, $P2_2$, the third DC voltage DC3 is electrically connected to each of the juxtaposed electrically conductive pads $P3_1$, $P3_2$ and the fourth DC voltage DC4 is electrically connected to each of the juxtaposed electrically conductive pads $P4_1$, $P4_2$. In the illustrated embodiment, each of the DC voltages DC1-DC12 is independently controlled, e.g., via the processor 210 and/or via programming of the voltage source $V_{ST}$, although in alternate embodiments two or more of the DC voltages DC1-DC12 may be controlled together as a group. In any case, it will be understood that although the voltages DC1-DC12 are illustrated and disclosed as being DC voltages, this disclosure contemplates other embodiments in which the voltage source $V_{ST}$ is alternatively or additionally configured to produce any number of AC voltages such as, for example, one or more RF voltages, and to supply any one or more such AC voltages to corresponding ones or pairs of the electrically conductive pads and/or to one or more ion carpets or other ion focusing structures in embodiments which include them.

Referring now to FIGS. 7B and 7C, operation of the ion steering channel array 208 illustrated in FIG. 6 will be described using the four opposed pairs of electrically conductive pads $P1_1/P1_2$, $P2_1/P2_2$, $P3_1/P3_2$ and $P4_1/P4_2$ of FIGS. 7A and 7B as an illustrative example. It will be understood that the four electrically conductive pads P5-P8 and the four electrically conductive pads P9-P12 illustrated on the substrate 220 in FIG. 6 likewise each comprise opposed, aligned and juxtaposed electrically conductive pad pairs disposed on the inner surfaces 220A, 222A of the respective substrates 220, 222, and that each such set of four opposed pairs of electrically conductive pads are controllable by respective switchable DC (and/or AC) voltages DC5-DC12 produced by the voltage source $V_{ST}$. In any case, the DC voltages DC1-DC4 are omitted in FIGS. 7B and 7C for clarity of illustration, and instead the DC voltages DC1-DC4 produced by the voltage source $V_{ST}$ and applied to the connected pairs of electrically conductive pads $P1_1/P1_2$, $P2_1/P2_2$, $P3_1/P3_2$ and $P4_1/P4_2$ of are represented graphically. Referring specifically to FIG. 7B, the illustrated portion of the ion steering array 208 is shown in a state in which a reference potential, $V_{REF}$, is applied to each of the electrically conductive pad pairs $P1_1/P1_2$, $P2_1/P2_2$, and a potential −XV, less than $V_{REF}$, is applied to each of the electrically conductive pad pairs $P3_1/P3_2$ and $P4_1/P4_2$. Illustratively, $V_{REF}$ may be any positive or negative voltage, or may be zero volts, e.g., ground potential, and −XV may be any voltage, positive, negative or zero voltage that is less than $V_{REF}$ so as to establish an electric field E1 which is parallel with the sides 220C/222C and 220D/222D of the substrates 220, 222 and which extends in the unaltered direction of ion travel, i.e., from the downstream electrically conductive pad pairs $P1_1/P1_2$, $P2_1/P2_2$ toward the upstream electrically conductive pad pairs $P3_1/P3_2$ and $P4_1/P4_2$, as depicted in FIG. 7B. With the electric field, E1, established as illustrated in FIG. 7B, ions A exiting the ion source 12 via the ion aperture IA enter the channel 225 between the downstream electrically conductive pad pairs $P1_1/P1_2$, $P2_1/P2_2$ and are steered or guided (or directed) by the electric field, E1, along the unaltered direction of ion travel 230 which is in the same direction as the electric field E1 and which is aligned, i.e., collinear, with the ion aperture IA of the ion source 12. Such ions A are illustratively guided through the channel 225 along the unaltered direction of travel as illustrated in FIG. 7B.

Referring now specifically to FIG. 7C, when it is desired to change directions of the ions A from the unaltered direction of ion travel illustrated in FIG. 7B to the altered direction of ion travel, the DC voltages DC1, DC3 produced by the voltage source $V_{ST}$ are switched such that the reference potential, $V_{REF}$, is applied to each of the electrically conductive pad pairs $P2_1/P2_2$, $P3_1/P3_2$, and a potential −XV, less than $V_{REF}$, is applied to each of the electrically conductive pad pairs $P1_1/P1_2$, $P4_1/P4_2$, so as to establish an electric field E2 which is perpendicular to the sides 220C/222C and 220D/222D of the substrates 220, 222 and which extends in the unaltered direction of ion travel, i.e., from the sides 220C/222C of the substrates 220, 222 toward the sides 220D/222D of the substrates 220, 222, as depicted in FIG. 7C. With the electric field, E2, established as illustrated in FIG. 7C, ions A exiting the ion source 12 via the ion aperture IA and entering the channel 225 are steered or guided (or directed) by the electric field, E2, along the altered direction of ion travel 240, which is in the same direction as the electric field E2 and which is aligned, i.e., collinear, with the ion aperture IA of the ion source 12. Such ions A are illustratively guided through the channel 225 along the unaltered direction of travel between the electrically conductive pad pairs $P1_1/P1_2$, $P4_1/P4_2$, as illustrated in FIG. 7C. In some embodiments, one or more conventional ion carpets and/or other conventional ion focusing structures may be used to confine the ions along the ion trajectory 240 illustrated in FIG. 7C.

Referring again to FIG. 6, the instructions stored in the memory 212 illustratively include instructions which, when executed by the processor 210, cause the processor 210 to control the ion steering voltage source $V_{ST}$ to selectively produce and switch the voltages DC1-DC12 in a manner which guides ions along the ion steering array 208 and sequentially directs an ion into the ion inlet aperture $AI_1$-$AI_3$ of each respective ELIT 202, 204, 206, and to also control the voltage sources V1-V6 to selectively produce and switch the DC voltages produced thereby in a manner which controls the respective ion mirrors M1-M6 between their ion transmission and ion reflection modes to trap an ion guided into each ELIT 202, 204, 206 by the ion steering array 208 and to then cause each trapped ion to oscillate back and forth between the respective ion mirrors M1-M6 of each ELIT 202, 204, 206 as the processor 210 records the respective ion charge detection information in the memory 214 as described above with respect to FIGS. 1-4B. With the aid of FIGS. 8A-8F, one example of such a process will be described as operating on one or more positively charged ions, although it will be understood that the process 100 may alternatively operate on one or more negatively charges particles. In the following description, references to any specific one or ones of the electrically conductive pads P1-P12 will be understood as referring to opposed, juxtaposed, spaced-apart pairs of electrically conductive pads disposed on the inner surfaces 220A, 222A of the substrates 220, 222 respectively as illustrated by example with respect to FIG. 7A, and references to voltages applied to any specific one or ones of the electrically conductive pads P1-P12 will be understood as being applied to both such opposed, juxtaposed, spaced-apart pairs of electrically conductive pads as illustrated by example with respect to FIGS. 7B and 7C. It will be further understood that the DC voltage $V_{REF}$ illustrated in FIGS. 8A-8F may be any positive or negative voltage, or may be zero volts, e.g., ground potential, and that the DC voltage –XV also illustrated in FIGS. 8A-8F may be any voltage, positive, negative or zero voltage that is less than $V_{REF}$ so as to establish a corresponding electric field within the channel 225 which extends in a direction from electrically conductive pads controlled to $V_{REF}$ toward electrically conductive pads controlled to –XV as illustrated by example in FIGS. 7B and 7C.

Figure 8A:
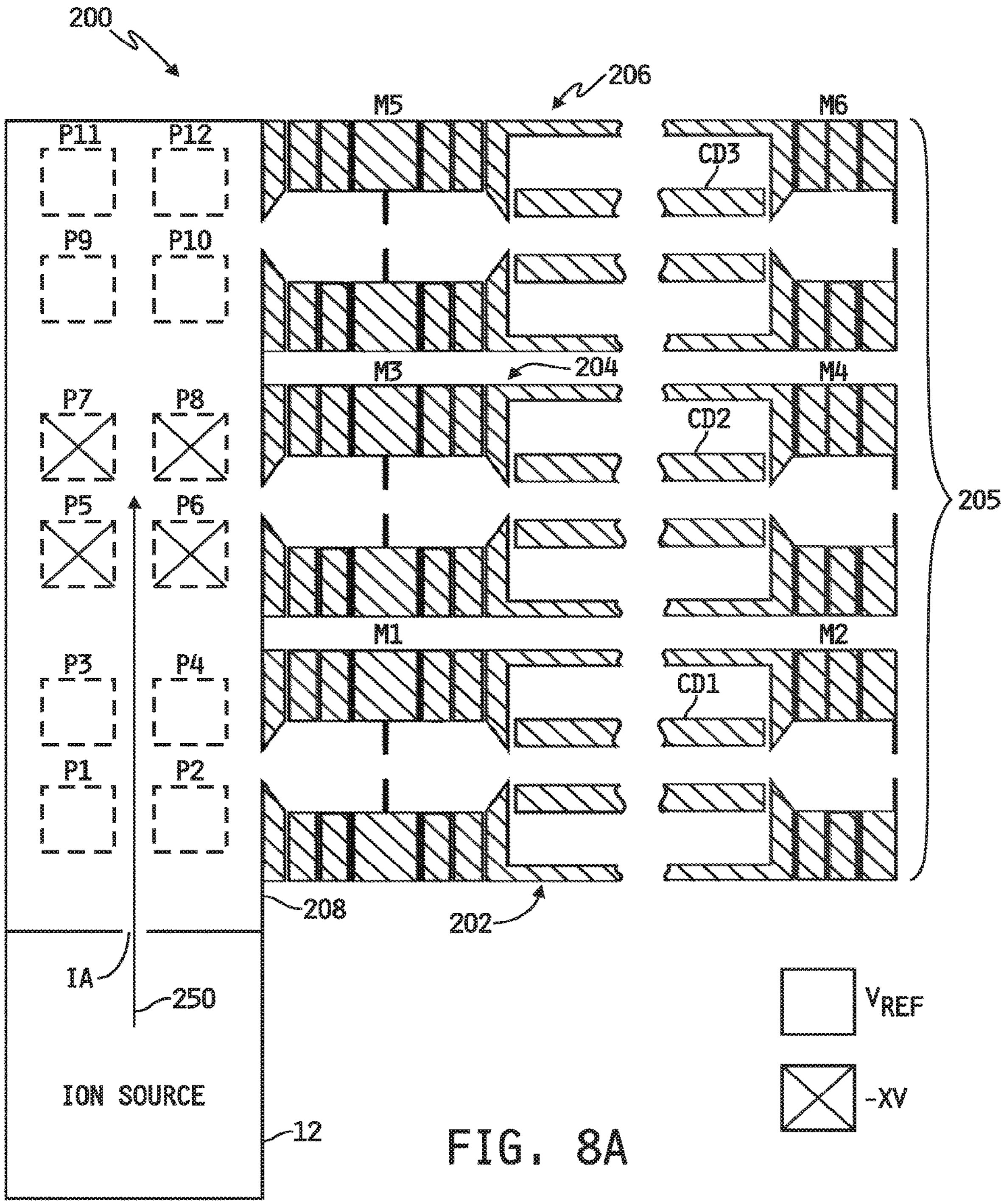
FIGS. 8A-8F are simplified diagrams of the ELIT array of FIG. 6 demonstrating example control and operation of the ion steering channel array and of the ELIT array.

With reference to FIG. 8A, the processor 210 is operable to control the voltage source $V_{ST}$ to apply –XV to each of the pads P5-P7, and the apply $V_{REF}$ to each of the pads P1-P4. In some implementation, $V_{ST}$ applies $V_{REF}$ to each of the pads P9-P12 as depicted in FIG. 8A, although in other implementations $V_{ST}$ may be controlled to apply –XV to each of the pads P9-P12. In any case, the electric field resulting within the channel 225 of the ion steering array 208 from such voltage applications guides ions exiting the ion aperture IA of the ion source 12 through the channel 225 in the unaltered direction of ion travel along the illustrated ion trajectory 250.

Figure 8B:
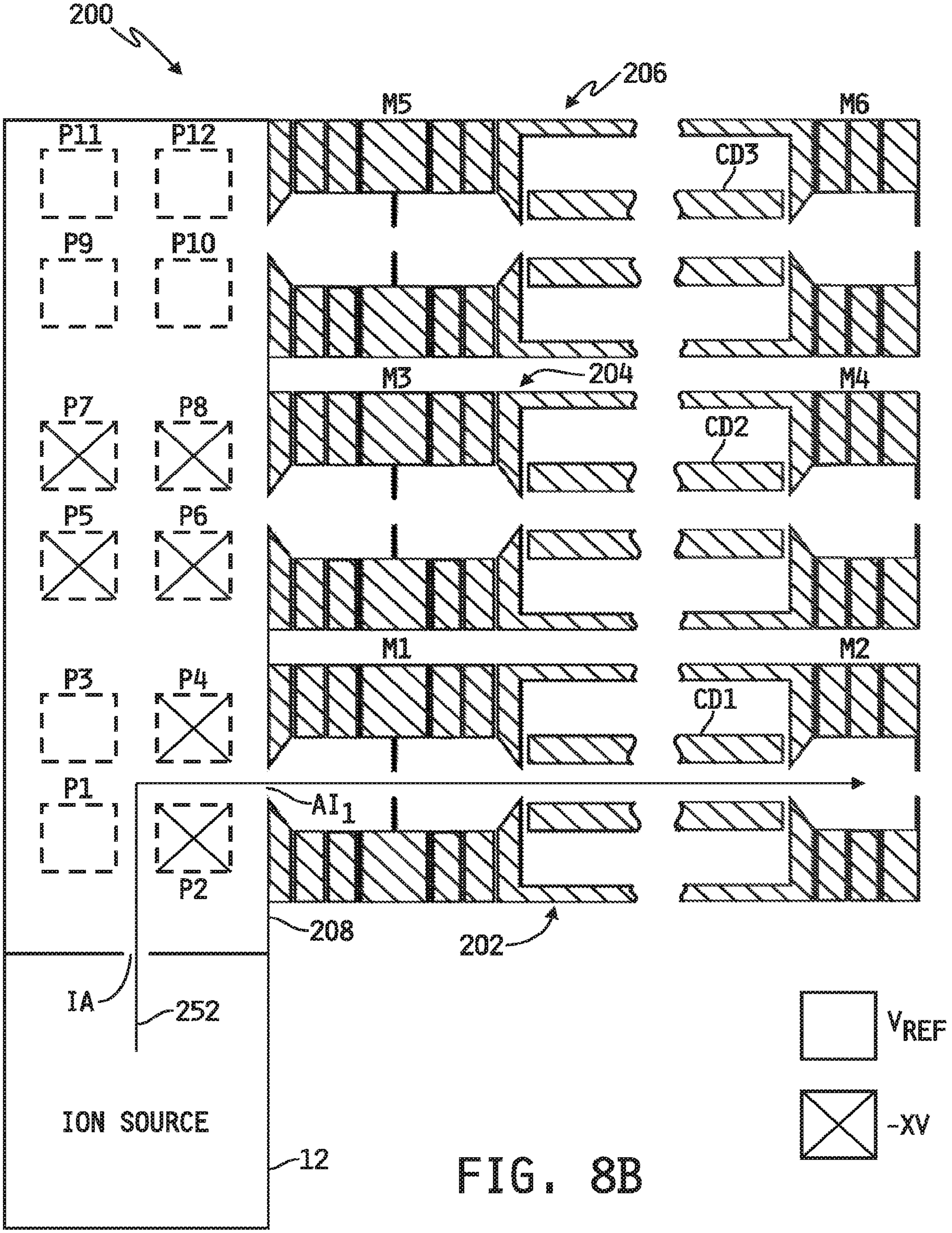

With reference to FIG. 8B, the processor 210 is subsequently operable to control the voltage source $V_{ST}$ to switch the voltages applied to pads P2 and P4 to –XV, and to otherwise maintain the previously applied voltages at P1, P3 and P5-P12. The electric field established in the channel 225 of the ion steering array 208 resulting from such switched voltage applications steers ions previously traveling from the ion source 12 in the unaltered direction of ion travel along the ion trajectory 250 illustrated in FIG. 8A along the altered direction of ion travel along the ion trajectory 252 toward the ion inlet aperture $AI_1$ of M1 of the ELIT 202. At the same time, prior to or after this switch, the processor 210 is operable to control the voltage sources V1 and V2 to produce voltages which cause both ion mirrors M1 and M2 to operate in their ion transmission modes, e.g., as described with respect to FIGS. 1-2B. As a result, ions traveling through the channel 225 of the ion steering array 208 along the ion trajectory 252 are directed into the inlet aperture $AI_1$ of the ELIT 202 through M1, and are guided by the ion transmission fields established in each of the ion mirrors M1 and M2 through M1, through the charge detection cylinder CD1 and through M2, as also illustrated by the ion trajectory 252 depicted in FIG. 8B. In some embodiments, one or more conventional ion carpets and/or other conventional ion focusing structures may be operatively positioned between the ion steering array 208 and the ion mirror M1 of the ELIT 202 to direct ions traveling along the ion trajectory 252 into the ion inlet aperture $AI_1$ of the ELIT 202. In any case, the processor 210 is operable at some point thereafter to control V2 to produce voltages which cause the ion mirror M2 to switch from the ion transmission mode of operation to the ion reflection mode of operation, e.g., as also described with respect to FIGS. 1-2B, so as to reflect ions back toward M1. The timing of this switch of M2 illustratively depends on whether the operation of the ELIT 202 is being controlled by the processor 210 in random trapping mode or in trigger trapping mode as described with respect to FIG. 3.

Figure 8C:
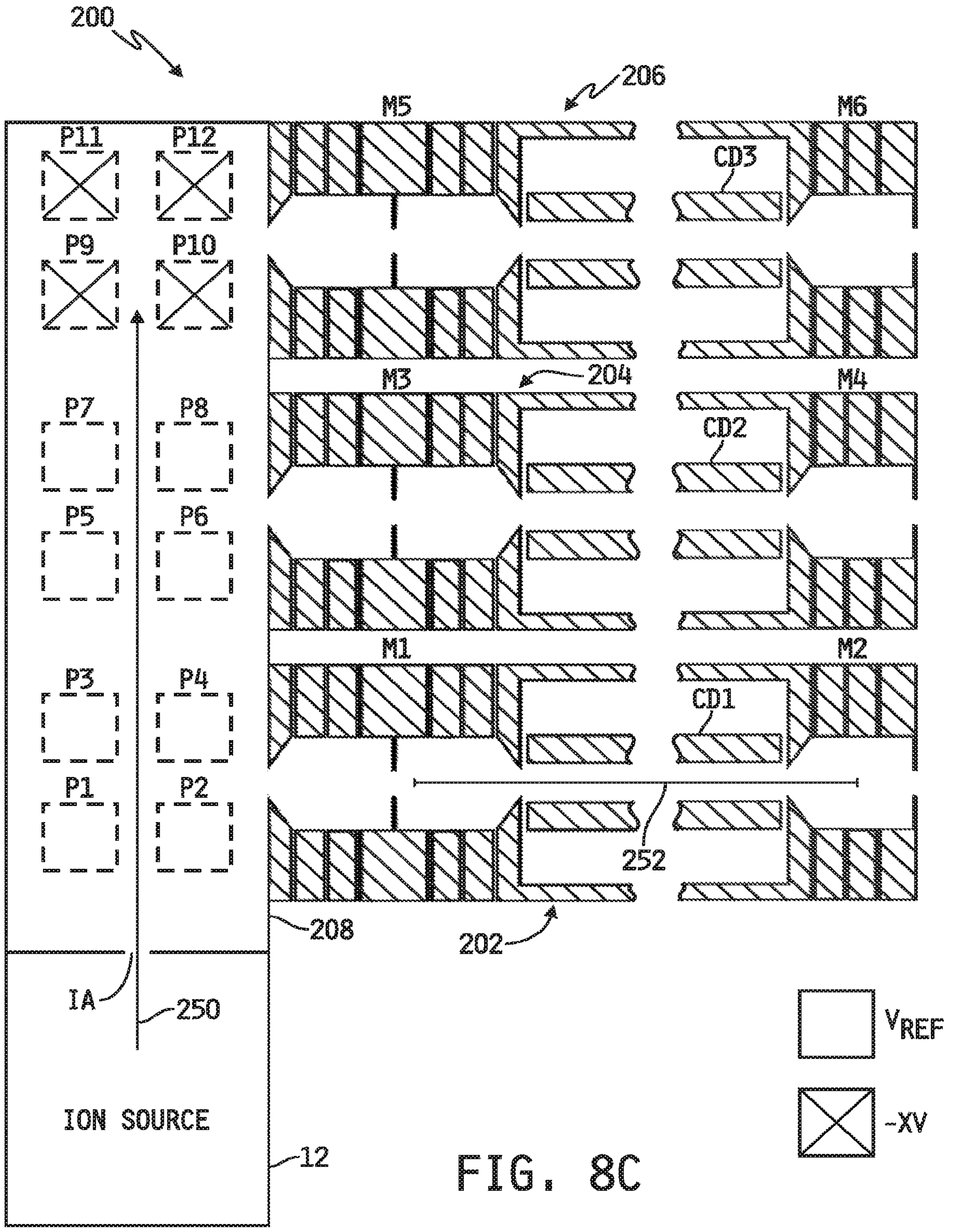

With reference to FIG. 8C, the processor 210 is subsequently operable to control the voltage source V1 to produce voltages which cause the ion mirror M1 to switch from ion transmission mode to ion reflection mode of operation. The timing of this switch of M1 illustratively depends on whether the operation of the ELIT 202 is being controlled by the processor 210 in random trapping mode or in trigger trapping mode as described with respect to FIG. 3, but in any case the switch of M1 to its ion reflection mode traps an ion within the ELIT 202 as illustrated by the ion trajectory 252 depicted in FIG. 8C. With an ion trapped within the ELIT 202 and with both M1 and M2 controlled by the voltage sources V1 and V2 respectively to operate in their ion reflection modes, the ion trapped within the ELIT 202 oscillates back and forth between the ion mirrors M1 and M2, each time passing through the charge detection cylinder CD1 and inducing a corresponding charge thereon which is detected by the charge preamplifier CP1 and recorded by the processor 210 in the memory 212 as described above with respect to FIG. 3.

At the same time or following control of the ELIT 202 as just described, and with the ion oscillating within the ELIT 202 back and forth between the ion mirrors M1, M2, the processor 210 is operable to control $V_{ST}$ to switch the voltages applied to pads P2 and P4 back to $V_{REF}$, to switch the voltages applied to pads P5-P8 from –XV to $V_{REF}$ and to switch the voltages applied to pads P9-P12 from $V_{REF}$ to –XV, as also illustrated in FIG. 8C. The electric field resulting in the channel 225 of the ion steering array 208 from such voltage applications again guides ions exiting the ion aperture IA of the ion source 12 through the channel 225 in the unaltered direction of ion travel along the illustrated ion trajectory 250.

Figure 8D:
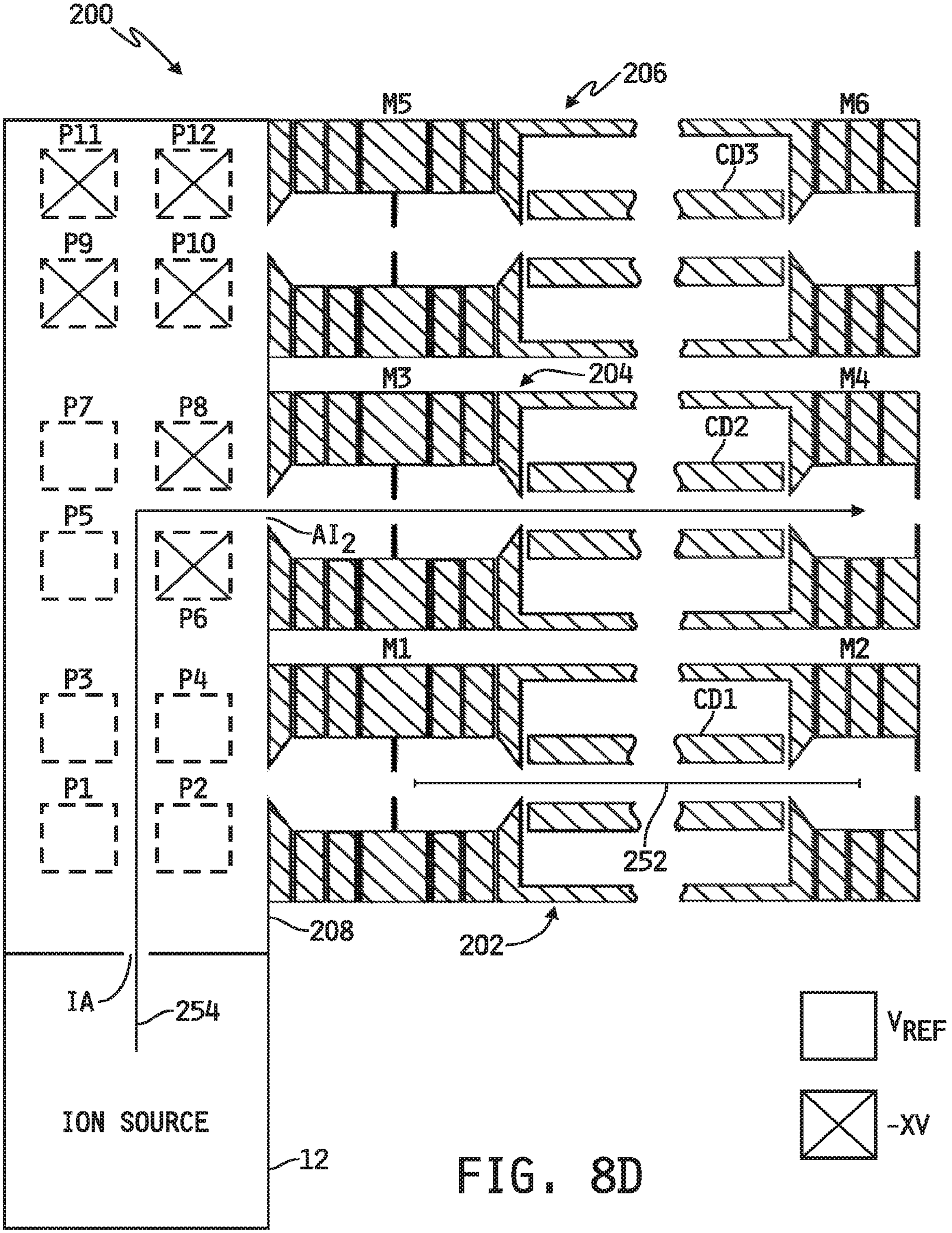

With reference now to FIG. 8D, the processor 210 is subsequently operable to control the voltage source $V_{ST}$ to switch the voltages applied to pads P6 and P8 to –XV, and to otherwise maintain the previously applied voltages at P1-P4, P5, P7 and P9-P12. The electric field established within the channel 225 of the ion steering array 208 resulting from such switched voltage applications steers ions previously traveling from the ion source 12 in the unaltered direction of ion travel along the ion trajectory 250 illustrated in FIG. 8C along the altered direction of ion travel along the ion trajectory 254 toward the ion inlet aperture $AI_2$ of M2 of the ELIT 204. At the same time, prior to or after this switch, the processor 210 is operable to control the voltage sources V3 and V4 to produce voltages which cause both ion mirrors M3 and M4 to operate in their ion transmission modes. As a result, ions traveling through the channel 225 of the ion steering array 208 along the ion trajectory 254 are directed into the inlet aperture $AI_2$ of the ELIT 204 through M3, and are guided by the ion transmission fields established in each of the ion mirrors M3 and M4 through M3, through the charge detection cylinder CD2 and through M4, as also illustrated by the ion trajectory 254 depicted in FIG. 8D. In some embodiments, one or more conventional ion carpets and/or other conventional ion focusing structures may be operatively positioned between the ion steering array 208 and the ion mirror M3 of the ELIT 204 to direct ions traveling along the ion trajectory 254 into the ion inlet aperture $AI_2$ of the ELIT 204. In any case, the processor 210 is operable at some point thereafter to control V4 to produce voltages which cause the ion mirror M4 to switch from the ion transmission mode of operation to the ion reflection mode of operation so as to reflect ions back toward M3. The timing of this switch of M4 illustratively depends on whether the operation of the ELIT 204 is being controlled by the processor 210 in random trapping mode or in trigger trapping mode as described with respect to FIG. 3.

Following the operating state illustrated in FIG. 8D, the processor 210 is operable, similarly as described with respect to FIG. 8C, to control the voltage source V3 to produce voltages which cause the ion mirror M3 to switch from ion transmission mode to ion reflection mode of operation. The timing of this switch of M3 illustratively depends on whether the operation of the ELIT 204 is being controlled by the processor 210 in random trapping mode or in trigger trapping mode as described with respect to FIG. 3, but in any case the switch of M3 to its ion reflection mode traps an ion within the ELIT 204 as illustrated by the ion trajectory 254 depicted in FIG. 8E. With an ion trapped within the ELIT 204 and with both M3 and M4 controlled by the voltage sources V3 and V4 respectively to operate in their ion reflection modes, the ion trapped within the ELIT 204 oscillates back and forth between the ion mirrors M3 and M4, each time passing through the charge detection cylinder CD2 and inducing a corresponding charge thereon which is detected by the charge preamplifier CP2 and recorded by the processor 210 in the memory 212 as described above with respect to FIG. 3. In the operating state illustrated in FIG. 8E, ions are simultaneously oscillating back and forth within each of the ELITs 202 and 204, and ion charge/timing measurements taken from each of the charge preamplifiers CP1 and CP2 are therefore simultaneously collected and stored by the processor 210.

Figure 8E:
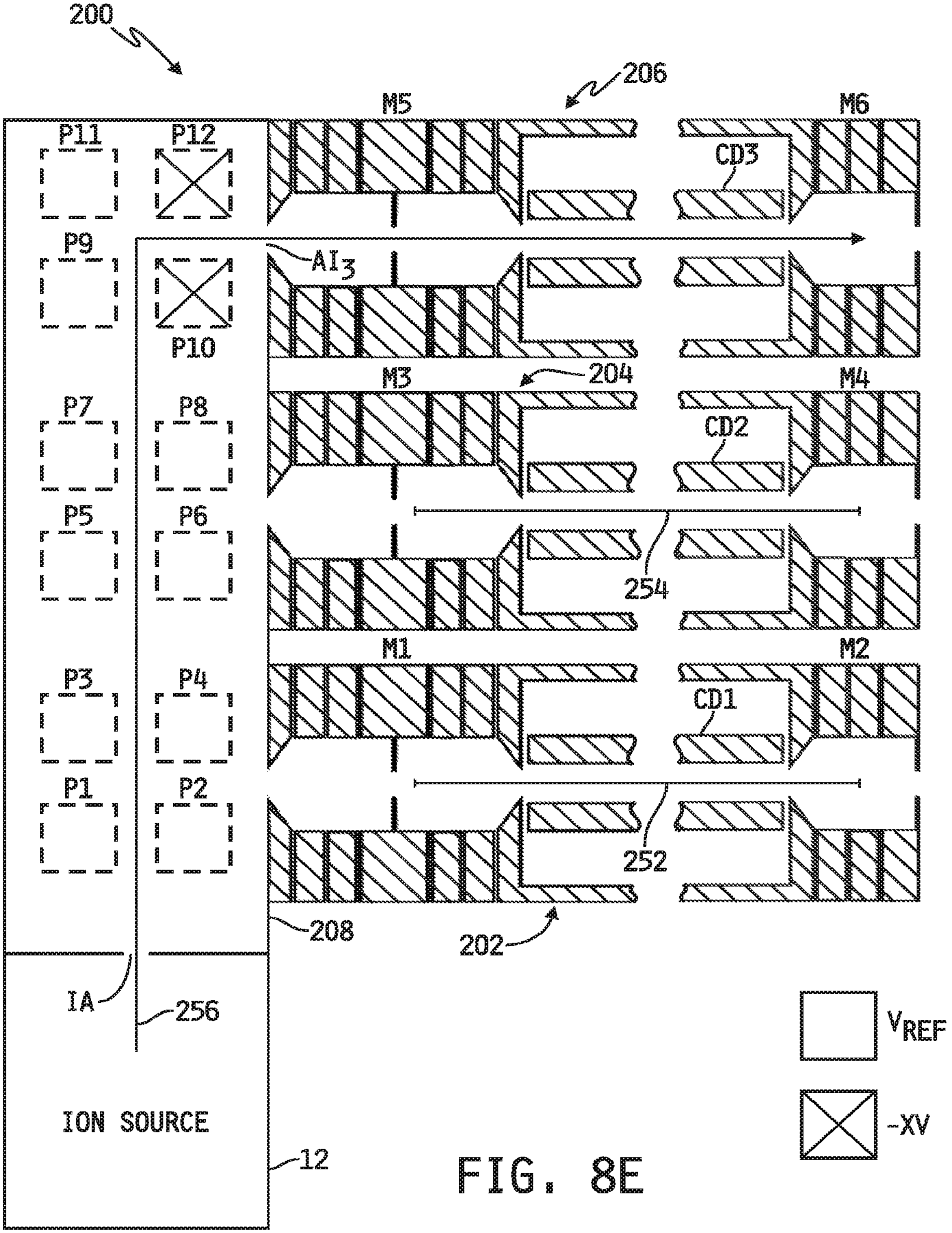

At the same time or following control of the ELIT 204 as just described with respect to FIG. 8E, and with an ion oscillating simultaneously within each of the ELITs 202 and 204, the processor 210 is operable to control $V_{ST}$ to switch the voltages applied to pads P6 and P8 back to $V_{REF}$, so that the pads P1-P12 are controlled to the voltages illustrated in FIG. 8C. The electric field resulting in the channel 225 of the ion steering array 208 from such voltage applications again guides ions exiting the ion aperture IA of the ion source 12 through the channel 225 in the unaltered direction of ion travel along the illustrated ion trajectory 250 as illustrated in FIG. 8C. Thereafter, the processor 210 is operable to control the voltage source $V_{ST}$ to switch the voltages applied to pads P9 and P11 to $V_{REF}$, and to otherwise maintain the previously applied voltages at P1-P8, P5 and P11-P12. The electric field established within the channel 225 of the ion steering array 208 resulting from such switched voltage applications steers ions previously traveling from the ion source 12 in the unaltered direction of ion travel along the ion trajectory 250 illustrated in FIG. 8C along the altered direction of ion travel along the ion trajectory 256 toward the ion inlet aperture $AI_3$ of the ion mirror M5 of the ELIT 206. At the same time, prior to or after this switch, the processor 210 is operable to control the voltage sources V5 and V6 to produce voltages which cause both ion mirrors M5 and M6 to operate in their ion transmission modes. As a result, ions traveling through the channel 225 of the ion steering array 208 along the ion trajectory 253 are directed into the inlet aperture $AI_3$ of the ELIT 206 through M5, and are guided by the ion transmission fields established in each of the ion mirrors M5 and M6 through M5, through the charge detection cylinder CD3 and through M6, as illustrated by the ion trajectory 256 depicted in FIG. 8E. In some embodiments, one or more conventional ion carpets and/or other conventional ion focusing structures may be operatively positioned between the ion steering array 208 and the ion mirror M5 of the ELIT 206 to direct ions traveling along the ion trajectory 256 into the ion inlet aperture $AI_3$ of the ELIT 206.

In any case, the processor 210 is operable at some point thereafter to control V6 to produce voltages which cause the ion mirror M6 to switch from the ion transmission mode of operation to the ion reflection mode of operation so as to reflect ions back toward M5. The timing of this switch of M6 illustratively depends on whether the operation of the ELIT 206 is being controlled by the processor 210 in random trapping mode or in trigger trapping mode as described with respect to FIG. 3. Thereafter, the processor 210 is operable, similarly as described with respect to FIG. 8C, to control the voltage source V5 to produce voltages which cause the ion mirror M5 to switch from ion transmission mode to ion reflection mode of operation. The timing of this switch of M5 illustratively depends on whether the operation of the ELIT 206 is being controlled by the processor 210 in random trapping mode or in trigger trapping mode as described with respect to FIG. 3, but in any case the switch of M5 to its ion reflection mode traps an ion within the ELIT 206 as illustrated by the ion trajectory 256 depicted in FIG. 8F. With an ion trapped within the ELIT 206 and with both M5 and M6 controlled by the voltage sources V5 and V6 respectively to operate in their ion reflection modes, the ion trapped within the ELIT 206 oscillates back and forth between the ion mirrors M5 and M6, each time passing through the charge detection cylinder CD3 and inducing a corresponding charge thereon which is detected by the charge preamplifier CP3 and recorded by the processor 210 in the memory 212 as described above with respect to FIG. 3. In the operating state illustrated in FIG. 8F, an ion is simultaneously oscillating back and forth within each of the ELITs 202, 204 and 206, and ion charge/timing measurements taken from each of the charge preamplifiers CP1, CP2 and CP3 are therefore simultaneously collected and stored by the processor 210.

Figure 8F:
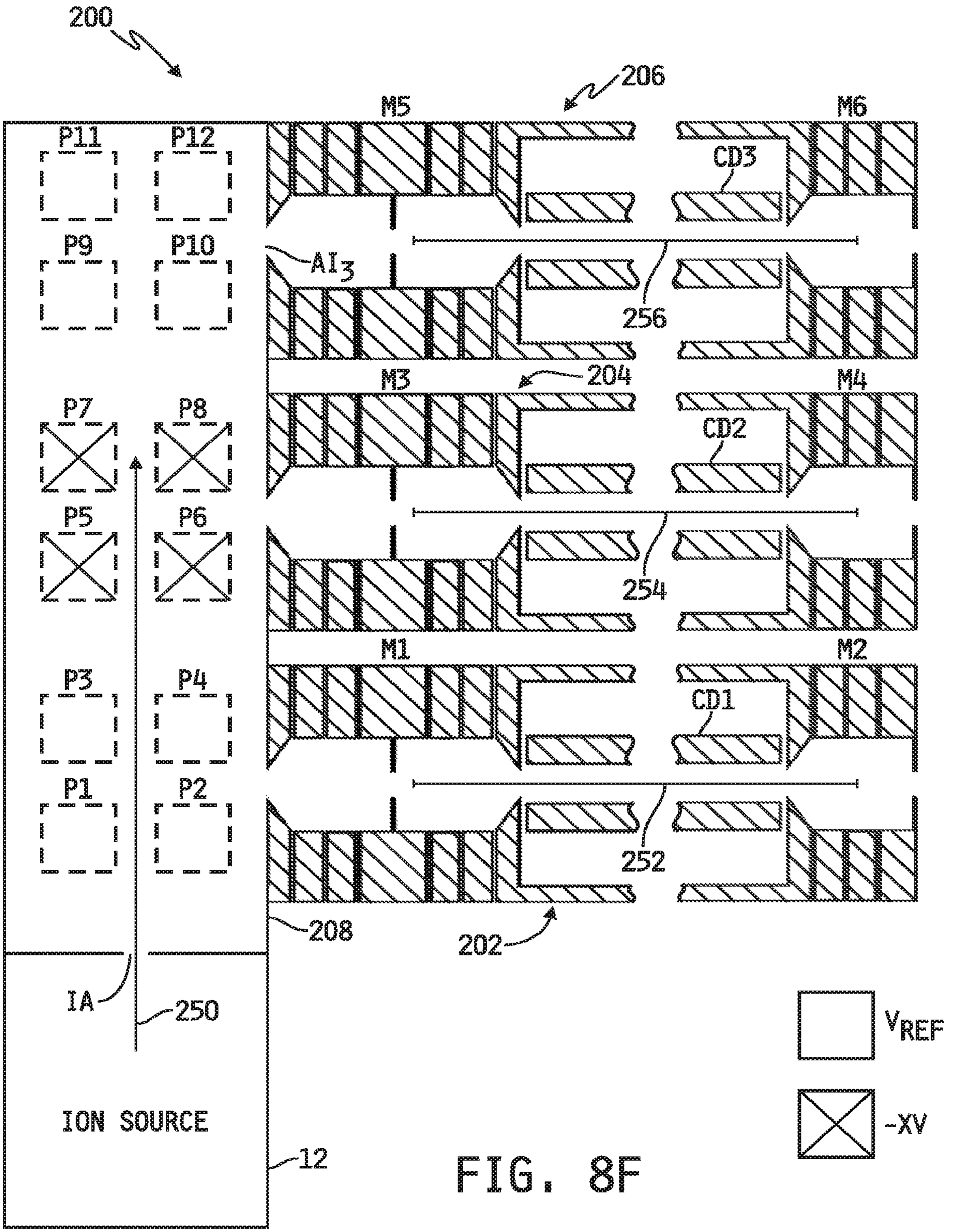

As also illustrated in FIG. 8F, at the same time or following control of the ELIT 206 as just described, and with the ions oscillating simultaneously within each of the ELITs 202, 204 and 206, the processor 210 is operable to control $V_{ST}$ to switch the voltages applied to pads P5-P8 to −XV and to switch the voltages applied to P10 and P12 to $V_{REF}$ (or to switch the voltages applied to P9 and P11 to −XV), so that the pads P1-P12 are controlled to the voltages illustrated in (or as described with respect to) FIG. 8A. The electric field resulting in the channel 225 of the ion steering array 208 from such voltage applications again guides ions exiting the ion aperture IA of the ion source 12 through the channel 225 in the unaltered direction of ion travel along the illustrated ion trajectory 250 as illustrated in FIG. 8A.

After the ions have oscillated back and forth within each of the ELITs 202, 204 and 206 for a total ion cycle measurement time or a total number of measurement cycles, e.g., as described above with respect to step 126 of the process 100 illustrated in FIG. 3, the processor 210 is operable to control the voltage sources V1-V6 to switch each of the ion mirrors M1-M6 to their ion transmission operating modes, thereby causing the ions trapped therein to exit the ELITs 202, 204, 206 via the ion outlet apertures $AO_1$-$AO_3$ respectively. Operation of the CDMS 200 then illustratively returns to that described above with respect to FIG. 8B. At the same time, or at another convenient time, the collections of recorded ion charge/timing measurements are processed by the processor 210, e.g., as described with respect step 140 of the process 100 illustrated in FIG. 3, to determine the charge, mass-to-charge ratio and mass value of each ion processed by a respective one of the ELITs 202, 204, 206.

Depending upon a number of factors including, but not limited to, the dimensions of the ELITS 202, 204, 206, the frequency or frequencies of oscillation of ions through each ELIT 202, 204, 206 and the total number of measurement cycles/total ion cycle measurement time in each ELIT 202, 204, 206, ions may simultaneously oscillate back and forth within at least two of the ELITs 202, 204 and 206, and ion charge/timing measurements taken from respective ones of the charge preamplifiers CP1, CP2 and CP3 may therefore be simultaneously collected and stored by the processor 210. In the embodiment illustrated in FIG. 8F, for example, ions simultaneously oscillate back and forth within at least two of the ELITs 202, 204 and 206, and ion charge/timing measurements taken from each of the charge preamplifiers CP1, CP2 and CP3 are thus simultaneously collected and stored by the processor 210. In other embodiments, the total number of measurement cycles or total ion cycle measurement time of ELIT 202 may expire before at least one ion is trapped within the ELIT 206 as described above. In such cases the processor 210 may control the voltage sources V1 and V2 to switch the ion mirrors M1 and M2 to their transmission operating modes, thereby causing the ion(s) oscillating therein to exit through the ion mirror M2 before an ion is made to oscillate within the ELIT 206. In such embodiments, ions may not simultaneously oscillate back and forth within all of the ELITs 202, 204 and 206, but may rather simultaneously oscillation back and for within at least two of the ELITs 202, 204 and 206 at any one time.

Figure 9:
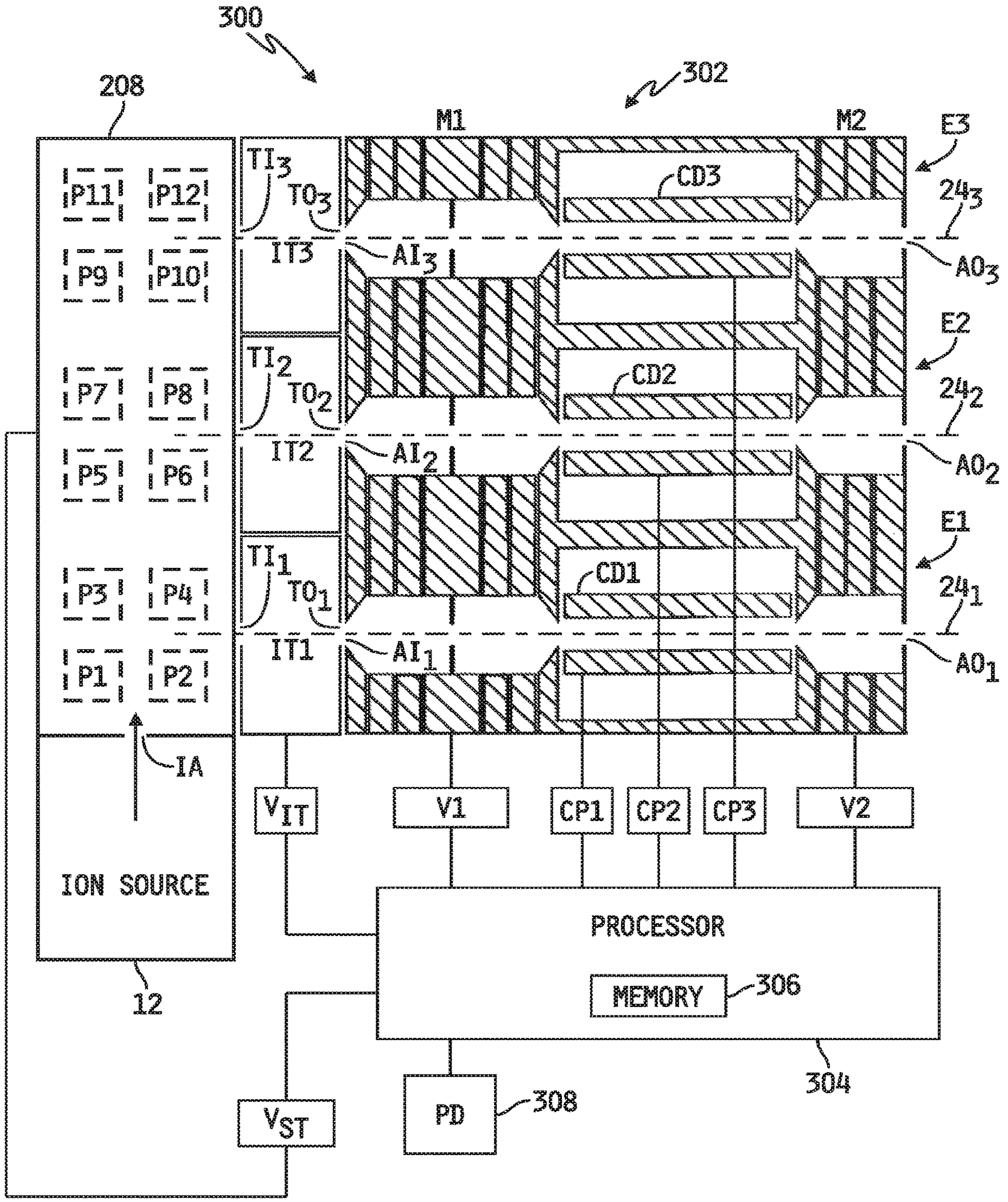
FIG. 9 is a simplified diagram of an ion mass detection system including yet another embodiment of an electrostatic linear ion trap (ELIT) array with control and measurement components coupled thereto.

Referring now to FIG. 9, another CDMS 300 is shown including yet another embodiment of an electrostatic linear ion trap (ELIT) array 302 with control and measurement components coupled thereto. In the illustrated embodiment, the ELIT array 302 includes three separate ELITs E1-E3 each configured identically to the ELITs 202, 204, 206 illustrated in FIG. 6. In the embodiment illustrated in FIG. 9, a voltage source V1, illustratively identical in structure and function to the voltage source V1 illustrated in FIGS. 1-2B, is operatively coupled to the ion mirror M1 of each ELIT E1-E3 and another voltage source V2, illustratively identical in structure and function to the voltage source V4 illustrated in FIGS. 1-2B, is operatively coupled to the ion mirror M2 of each ELIT E1-E3. In alternate embodiments, the ion mirrors M1 of two or more of the ELITs E1-E3 may be merged into a single ion mirror and/or the ion mirrors M2 of two or more of the ELITs E1-E3 may be merged into a single ion mirror. In any case, the voltage sources V1, V2 are electrically coupled to a processor 304, and the three charge preamplifiers CP1-CP3 are electrically coupled between the processor 304 and a respective charge detection cylinder CD1-CD3 of a respective one of the ELITs E1-E3. A memory 306 illustratively includes instructions which, when executed by the processor 304, cause the processor 304 to control the voltage sources V1 and V2 to control operation of the ELITs E1-E3 as described below. Illustratively, the processor 304 is operatively coupled to one or more peripheral devices 308 which may be identical to the one or more peripheral devices 20 described above with respect to FIG. 1.

The CDMS 300 is identical in some respects to the CDMS 200 in that the CDMS 300 includes an ion source 12 operatively coupled to an ion steering array 208, the structures and operation of which are as described above. The instructions store in the memory 306 further illustratively include instructions which, when executed by the processor 304, cause the processor 304 to control the ion steering array voltage source $V_{ST}$ as described below.

In the embodiment illustrated in FIG. 9, the CDMS 300 further illustratively includes three conventional ion traps IT1-IT3 each having a respective ion inlet $TI_1$-$TI_3$ and an opposite ion outlet $TO_1$-$TO_3$. The ion trap IT1 is illustratively positioned between the set of electrically conductive pads P1-P4 and the ion mirror M1 of the ELIT E1 such that the longitudinal axis $24_1$ extending centrally through the ELIT E1 bisects the ion inlet $TI_1$ and the ion outlet $TO_1$ of IT1 and also passes centrally between the pad pairs P1/P2 and P3/P4 as illustrated in FIG. 9. The ion trap IT2 is similarly positioned between the set of electrically conductive pads P5-P8 and the ion mirror M1 of the ELIT E2 such that the longitudinal axis $24_2$ extending centrally through the ELIT E2 bisects the ion inlet $TI_2$ and the ion outlet $TO_2$ of IT2 and also passes centrally between the pad pairs P5/P6 and P7/P8, and the ion trap IT3 is likewise positioned between the set of electrically conductive pads P9-P12 and the ion mirror M1 of the ELIT E3 such that the longitudinal axis $24_3$ extending centrally through the ELIT E3 bisects the ion inlet $TI_3$ and the ion outlet $TO_3$ of IT3 and also passes centrally between the pad pairs P9/P10 and P11/P12. The ion traps IT1-IT3 may each be any conventional ion trap, examples of which may include, but are not limited to, a conventional quadrupole ion trap, a conventional hexapole ion trap, or the like.

An ion trap voltage source $V_{IT}$ is operatively coupled between the processor 304 and each of the ion traps IT1-IT3. The voltage source $V_{IT}$ is illustratively configured to produce suitable DC and AC, e.g., RF, voltages for separately and individually controlling operation of each of the ion traps IT1-IT3 in a conventional manner.

The processor 304 is illustratively configured, e.g. programmed, to control the ion steering array voltage source $V_{ST}$ to sequentially steer one or more ions exiting the ion aperture IA of the ion source 12, as described with respect to FIGS. 8A-8F, into the ion inlets $TI_1$-$TI_3$ of the each of the respective ion traps IT1-IT3. In some embodiments, one or more conventional ion carpets and/or other ion focusing structures may be positioned between the ion steering array 208 and one or more of the ion traps IT1-IT3 to direct ions from the ion steering array 208 into the ion inlets $TI_1$-$TI_3$ of the respective ion traps IT1-IT3. The processor 304 is further configured, e.g., programmed, to control the ion trap voltage source $V_{IT}$ to produce corresponding control voltages for controlling the ion inlets $TI_1$-$TI_3$ of the ion traps IT1-IT3 to accept ions therein, and for controlling the ion traps IT1-IT3 in a conventional manner to trap and confine such ions therein.

As the ion traps IT1-IT3 are being filled with ions, the processor 304 is configured, i.e., programmed, to control V1 and V2 to produce suitable DC voltages which control the ion mirrors M1 and M2 of the ELIT E1-E2 to operate in their ion transmission operating modes so that any ions moving therein exit via the ion outlet apertures $AO_1$-$AO_3$ respectively. When, via control of the ion steering array 208 and the ion traps IT1-IT3 as just described, at least one ion is trapped within each of the ion traps IT1-IT3, the processor 304 is configured, i.e., programmed, to control V2 to produce suitable DC voltages which control the ion mirrors M2 of the ELITs E1-E3 to operate in their ion reflection operating modes. Thereafter, the processor 304 is configured to control the ion trap voltage source $V_{IT}$ to produce suitable voltages which cause the ion outlets $TO_1$-$TO_3$ of the respective ion traps IT1-IT3 to simultaneously open to direct an ion trapped therein into a respective one of the ELITs E1-E3 via a respective ion inlet aperture $AI_1$-$AI_3$ of a respective ion mirror M1. When the processor 304 determines that an ion has entered each ELIT E1-E3, e.g., after passage of some time period following simultaneous opening of the ion traps IT1-IT3 or following charge detection by each of the charge preamplifiers CP1-CP3, the processor 304 is operable to control the voltage source V1 to produce suitable DC voltages which control the ion mirrors M1 of the ELTs E1-E3 to operate in their ion reflection operating modes, thereby trapping an ion within each of the ELITs E1-E3.

With the ion mirrors M1 and M2 of each ELIT E1-E3 operating in the ion reflection operating mode, the ion in each ELIT E1-E3 simultaneously oscillates back and forth between M1 and M2, each time passing through a respective one of the charge detection cylinders CD1-CD3. Corresponding charges induced on the charge detection cylinders CD1-CD3 are detected by the respective charge preamplifiers CP1-CP3, and the charge detection signals produced by the charge preamplifiers CP1-CP3 are stored by the processor 304 in the memory 306 and subsequently processed by the processor 304, e.g., as described with respect step 140 of the process 100 illustrated in FIG. 3, to determine the charge, mass-to-charge ratio and mass value of each ion processed by a respective one of the ELITs E1-E3.

Although the embodiments of the CDMS 200 and 300 are illustrated in FIGS. 6-8F and 9 respectively as each including three ELITs, it will be understood that either or both such systems 200, 300 may alternatively include fewer, e.g., 2, or more, e.g., 4 or more, ELITs. Control and operation of the various components in any such alternate embodiments will generally follow the concepts described above, and those skilled in the art will recognize that any modifications to the system 200 and/or to the system 300 required to realize any such alternate embodiment(s) will involve only mechanical steps. Additionally, although the embodiments of the CDMS systems 200 and 300 are illustrated in FIGS. 6-8F and 9 respectively as each including an example ion steering array 208, it will be understood that one or more other ion guiding structures may be alternatively or additionally used to steer or guide ions as described above, and that any such alternate ion guiding structure(s) is/are intended to fall within the scope of this disclosure. As one non-limiting example, an array of DC quadrupole beam deflectors may be used with either or both of the systems 200, 300 to steer or guide ions as described. In such embodiments, one or more focusing lenses and/or ion carpets may also be used to focus ions into the various ion traps as described above.

It will be understood that the dimensions of the various components of any of the ELIT arrays 14, 205, 302 and the magnitudes of the electric fields established therein in any of the systems 10, 60, 80, 200, 300 illustrated in the attached figures and described above may illustratively be selected to establish a desired duty cycle of ion oscillation within one or more of the ELITs or ELIT regions E1-E3, corresponding to a ratio of time spent by an ion in the respective charge detection cylinder CD1-CD3 and a total time spent by the ion traversing the combination of the corresponding ion mirrors and the respective charge detection cylinder CD1-CD3 during one complete oscillation cycle. For example, a duty cycle of approximately 50% may be desirable in one or more of the ELITs or ELIT regions for the purpose of reducing noise in fundamental frequency magnitude determinations resulting from harmonic frequency components of the measure signals. Details relating to such dimensional and operational considerations for achieving a desired duty cycle, e.g., such as 50%, are illustrated and described in U.S. Patent Application Ser. No. 62/616,860, filed Jan. 12, 2018, U.S. Patent Application Ser. No. 62/680,343, filed Jun. 4, 2018 and co-pending International Patent Application No. PCT/US2019/013251, filed Jan. 11, 2019, all entitled ELECTROSTATIC LINEAR ION TRAP DESIGN FOR CHARGE DETECTION MASS SPECTROMETRY, the disclosures of which are all expressly incorporated herein by reference in their entireties.

It will be further understood that one or more charge calibration or resetting apparatuses may be used with the charge detection cylinder(s) of any one or more of the ELIT arrays 14, 205, 302 and/or in any one or more of the regions E1-E3 of the ELIT array 14 in any of the systems 10, 60, 80, 200, 300 illustrated in the attached figures and described herein. An example of one such charge calibration or resetting apparatus is illustrated and described in U.S. Patent Application Ser. No. 62/680,272, filed Jun. 4, 2018 and in International Patent Application No. PCT/US2019/013284, filed Jan. 11, 2019, both entitled APPARATUS AND METHOD FOR CALIBRATING OR RESETTING A CHARGE DETECTOR, the disclosures of which are both expressly incorporated herein by reference in their entireties.

It will be further understood that one or more charge detection optimization techniques may be used with any one or more of the ELIT arrays 14, 205, 302 and/or with one or more regions E1-E3 of the ELIT array 14 in any of the systems 10, 60, 80, 200, 300 illustrated in the attached figures and described herein, e.g., for trigger trapping or other charge detection events. Examples of some such charge detection optimization techniques are illustrated and described in U.S. Patent Application Ser. No. 62/680,296, filed Jun. 4, 2018 and in International Patent Application No. PCT/US2019/013280, filed Jan. 11, 2019, both entitled APPARATUS AND METHOD FOR CAPTURING IONS IN AN ELECTROSTATIC LINEAR ION TRAP, the disclosures of which are both expressly incorporated herein by reference in their entireties.

It will be further still understood that one or more ion source optimization apparatuses and/or techniques may be used with one or more embodiments of the ion source 12 in any of the systems 10, 60, 80, 200, 300 illustrated in the attached figures and described herein, some examples of which are illustrated and described in U.S. Patent Application Ser. No. 62/680,223, filed Jun. 4, 2018 and entitled HYBRID ION FUNNEL-ION CARPET (FUNPET) ATMOSPHERIC PRESSURE INTERFACE FOR CHARGE DETECTION MASS SPECTROMETRY, and in International Patent Application No. PCT/US2019/013274, filed Jan. 11, 2019 and entitled INTERFACE FOR TRANSPORTING IONS FROM AN ATMOSPHERIC PRESSURE ENVIRONMENT TO A LOW PRESSURE ENVIRONMENT, the disclosures of which are both expressly incorporated herein by reference in their entireties.

It will be still further understood that any of the systems 10, 60, 80, 200, 300 illustrated in the attached figures and described herein may be implemented in accordance with real-time analysis and/or real-time control techniques, some examples of which are illustrated and described in U.S. Patent Application Ser. No. 62/680,245, filed Jun. 4, 2018 and International Patent Application No. PCT/US2019/013277, filed Jan. 11, 2019, both entitled CHARGE DETECTION MASS SPECTROMETRY WITH REAL TIME ANALYSIS AND SIGNAL OPTIMIZATION, the disclosures of which are both expressly incorporated herein by reference in their entireties.

It will be yet further understood that in any of the systems 10, 60, 80, 200, 300 illustrated in the attached figures and described herein, one or more ion inlet trajectory control apparatuses and/or techniques may be implemented to provide for simultaneous measurements of multiple individual ions within one or more of the ELITs or ELIT regions of any of the ELIT arrays illustrated in the attached figures and described herein. Examples of some such ion inlet trajectory control apparatuses and/or techniques are illustrated and described in U.S. Patent Application Ser. No. 62/774,703, filed Dec. 3, 2018 and in International Patent Application No. PCT/US2019/013285, filed Jan. 11, 2019, both entitled APPARATUS AND METHOD FOR SIMULTANEOUSLY ANALYZING MULTIPLE IONS WITH AN ELECTROSTATIC LINEAR ION TRAP, the disclosures of which are both expressly incorporated herein by reference in their entireties.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected.

What is claimed is:

1. An electrostatic linear ion trap (ELIT) array, comprising:

a plurality of elongated charge detection cylinders each defining an axial passageway centrally therethrough, a plurality of ion mirrors each defining an axial passageway centrally therethrough, the plurality of ion mirrors and charge detection cylinders arranged to define a plurality of ELITs each including one of the plurality of charge detection cylinders positioned between a respective pair of the plurality of ion mirrors with the axial passageway of each of the plurality of charge detection cylinders coaxial with the axial passageways of the respective pair of the plurality of ion mirrors to define an axial passageway through the respective ELIT, wherein the axial passageway of at least one of the plurality of ELITs is not coaxial with the axial passageway of at least another of the plurality of ELITs, an ion steering array having an ion inlet configured to receive ions from a source of ions and a plurality of ion outlets each aligned with the axial passageway of one of the pair of the plurality of ion mirrors of a different one of the plurality of ELITs, the ion steering array configured to selectively guide ions entering the ion inlet into each of the plurality of ELITs via a respective one of the ion outlets, and means for controlling each of the plurality of ion mirrors to trap at least one ion in each of the plurality of ELITs and to cause the at least one ion trapped in each of the plurality of ELITs to oscillate back and forth between the respective pair of the plurality of ion mirrors each time passing through a respective one of the plurality of charge detection cylinders.

2. The ELIT array of claim 1, wherein the axial passageways of the plurality of ELITs are not coaxial with one another.

3. The ELIT array of claim 1, wherein the axial passageways of the plurality of ELITs are at least approximately parallel with one another.

4. The ELIT array of claim 1, wherein the means for controlling each of the plurality of ion mirrors comprises means for selectively establishing an ion transmission electric field or an ion reflection electric field in the axial passageways of each of the plurality of ion mirrors, the ion transmission electric field configured to focus an ion passing through the axial passageway of a respective one of the plurality of ion mirrors toward a longitudinal axis of the axial passageway of the respective ELIT and the ion reflection electric field configured to cause an ion entering the axial passageway of a respective one of the plurality of ion mirrors from a respective one of the plurality of charge detection cylinders to stop and accelerate in an opposite direction back through the respective one of the plurality of charge detection cylinders while also focusing the ion toward the longitudinal axis of the respective ELIT.

5. The ELIT array of claim 1, further comprising a plurality of charge preamplifiers each having an input operatively coupled to a different one of the plurality of charge detection cylinders and each having an output, each of the plurality of charge preamplifiers configured to produce at the output thereof charge detection signals upon detection of a charge induced on the respective one of the plurality of charge detection cylinders as a respective at least one ion passes therethrough, and further comprising means for recording the charge detection signals produced by each of the plurality of charge preamplifiers.

6. The ELIT array of claim 5, further comprising means for determining a respective ion charge and at least one of an ion mass-to-charge ratio and an ion mass based on the recorded charge detection signals produced by each of the plurality of charge preamplifiers.

7. A system for separating ions comprising:

the ion source, wherein the ion source is configured to generate ions from a sample, at least one ion separation instrument configured to separate the generated ions as a function of at least one molecular characteristic, and the ELIT array of claim 1, wherein ions exiting the at least one ion separation instrument pass into the ELIT array via the ion steering array.

8. The system of claim 7, wherein the at least one ion separation instrument comprises one or any combination of at least one instrument for separating ions as a function of mass-to-charge ratio, at least one instrument for separating ions in time as a function of ion mobility, at least one instrument for separating ions as a function of ion retention time and at least one instrument for separating ions as a function of molecule size.

9. A system for separating ions comprising:

the ion source, the ion source configured to generate ions from a sample, a first mass spectrometer configured to separate the generated ions as a function of mass-to-charge ratio, an ion dissociation stage positioned to receive ions exiting the first mass spectrometer and configured to dissociate ions exiting the first mass spectrometer, a second mass spectrometer configured to separate dissociated ions exiting the ion dissociation stage as a function of mass-to-charge ratio, and a charge detection mass spectrometer (CDMS), including the ELIT array of claim 1, coupled in parallel with and to the ion dissociation stage such that the CDMS can receive ions exiting either of the first mass spectrometer and the ion dissociation stage, wherein masses of precursor ions exiting the first mass spectrometer are measured using CDMS, mass-to-charge ratios of dissociated ions of precursor ions having mass values below a threshold mass are measured using the second mass spectrometer, and mass-to-charge ratios and charge values of dissociated ions of precursor ions having mass values at or above the threshold mass are measured using the CDMS.

10. A system for separating ions comprising:

an ion source configured to generate ions from a sample, at least one ion separation instrument configured to separate the generated ions as a function of at least one molecular characteristic, and an electrostatic linear ion trap (ELIT) array, comprising:

a plurality of ion mirrors each defining a respective axial passageway therethrough, a plurality of elongated charge detection cylinders each defining an axial passageway centrally therethrough, the plurality of ion mirrors and the plurality of charge detection cylinders arranged relative to one another such that each of the plurality of charge detection cylinders is positioned between a different respective pair of the plurality of ion mirrors with the respective axial passageways of each coaxial with one another to define an axial passageway through the respective ELIT, wherein the axial passageway of at least one of the plurality of ELITs is not coaxial with the axial passageway of at least another of the plurality of ELITs, an ion steering array for selectively directing at least one ion exiting the at least one ion separation instrument into the axial passageways of each of the plurality of ELITs, wherein ions exiting the at least one ion separation instrument pass into the ELIT array via the ion steering array, and means for controlling each of the plurality of ion mirrors in a manner which causes the at least one ion in at least two of the plurality of ELITs to become trapped therein and to simultaneously oscillate back and forth between the respective ion mirrors each time passing through the respective charge detection cylinder.

11. The system of claim 10, wherein the axial passageways of the plurality of ELITs are not coaxial with one another.

12. The system of claim 10, wherein the axial passageways of the plurality of ELITs are at least approximately parallel with one another.

13. The system of claim 10, wherein the means for controlling each of the plurality of ion mirrors comprises means for selectively establishing an ion transmission electric field or an ion reflection electric field in the axial passageways of each of the plurality of ion mirrors, the ion transmission electric field configured to focus an ion passing through the axial passageway of a respective one of the plurality of ion mirrors toward a longitudinal axis of the axial passageway of the respective ELIT and the ion reflection electric field configured to cause an ion entering the axial passageway of a respective one of the plurality of ion mirrors from a respective one of the plurality of charge detection cylinders to stop and accelerate in an opposite direction back through the respective one of the plurality of charge detection cylinders while also focusing the ion toward the longitudinal axis of the respective ELIT.

14. The system of claim 10, further comprising a plurality of charge preamplifiers each having an input operatively coupled to a different one of the plurality of charge detection cylinders and each having an output, each of the plurality of charge preamplifiers configured to produce at the output thereof charge detection signals upon detection of a charge induced on the respective one of the plurality of charge detection cylinders as a respective at least one ion passes therethrough, and further comprising means for recording the charge detection signals produced by each of the plurality of charge preamplifiers.

15. The system of claim 14, further comprising means for determining a respective ion charge and at least one of an ion mass-to-charge ratio and an ion mass based on the recorded charge detection signals produced by each of the plurality of charge preamplifiers.

16. The system of claim 10, wherein the at least one ion separation instrument comprises one or any combination of at least one instrument for separating ions as a function of mass-to-charge ratio, at least one instrument for separating ions in time as a function of ion mobility, at least one instrument for separating ions as a function of ion retention time and at least one instrument for separating ions as a function of molecule size.

17. A system for separating ions comprising:

an ion source configured to generate ions from a sample, a first mass spectrometer configured to separate the generated ions as a function of mass-to-charge ratio, an ion dissociation stage positioned to receive ions exiting the first mass spectrometer and configured to dissociate ions exiting the first mass spectrometer, a second mass spectrometer configured to separate dissociated ions exiting the ion dissociation stage as a function of mass-to-charge ratio, and a charge detection mass spectrometer (CDMS), including an electrostatic linear ion trap (ELIT) array, coupled in parallel with and to the ion dissociation stage such that the CDMS can receive ions exiting either of the first mass spectrometer and the ion dissociation stage, wherein masses of precursor ions exiting the first mass spectrometer are measured using CDMS, mass-to-charge ratios of dissociated ions of precursor ions having mass values below a threshold mass are measured using the second mass spectrometer, and mass-to-charge ratios and charge values of dissociated ions of precursor ions having mass values at or above the threshold mass are measured using the CDMS, and wherein the ELIT array comprises:

a plurality of ion mirrors each defining a respective axial passageway therethrough, a plurality of elongated charge detection cylinders each defining an axial passageway centrally therethrough, the plurality of ion mirrors and the plurality of charge detection cylinders arranged relative to one another such that each of the plurality of charge detection cylinders is positioned between a different respective pair of the plurality of ion mirrors with the respective axial passageways of each coaxial with one another to define an axial passageway through the respective ELIT, wherein the axial passageway of at least one of the plurality of ELITs is not coaxial with the axial passageway of at least another of the plurality of ELITs, means for selectively directing at least one ion exiting either of the first mass spectrometer and the ion dissociation stage into the axial passageways of each of the plurality of ELITs, and means for controlling each of the plurality of ion mirrors in a manner which causes the at least one ion in at least two of the plurality of ELITs to become trapped therein and to simultaneously oscillate back and forth between the respective ion mirrors each time passing through the respective charge detection cylinder.

18. A charge detection mass spectrometer (CDMS), comprising:

a source of ions configured to generate and supply ions, an electrostatic linear ion trap (ELIT) array including a plurality of ion mirrors each defining a respective axial passageway therethrough, and a plurality of charge detection cylinders each defining a respective axial passageway therethrough, the plurality of ion mirrors and charge detection cylinders arranged to define a plurality of ELITs each including a different one of the plurality of charge detection cylinders positioned between a respective pair of the plurality of ion mirrors with the axial passageway of each of the plurality of charge detection cylinders coaxial with the axial passageways of the respective pair of the plurality of ion mirrors to define a respective axial passageway through the respective ELIT, wherein the axial passageway of at least one of the plurality of ELITs is not coaxial with the axial passageway of at least another of the plurality of ELITs, an ion steering array having an ion inlet configured to receive ions from a source of ions and a plurality of ion outlets each aligned with the axial passageway of one of the pair of the plurality of ion mirrors of a different one of the plurality of ELITs, at least one processor, and at least one memory having instructions stored therein executable by the processor to cause the processor to control the ion steering array to selectively guide ions entering the ion inlet into each of the plurality of ELITs via a respective one of the ion outlets, and to control the plurality of ion mirrors to trap in each of the plurality of ELITs at least one of the ions supplied thereto by the ion steering array such that the at least one trapped ion oscillates back and forth between the respective pair of the plurality of ion mirrors each time passing through a respective one of the plurality of charge detection cylinders.

19. The CDMS of claim 18, further comprising a plurality of charge preamplifiers each having an input operatively coupled to a different one of the plurality of charge detection cylinders and each having an output operatively coupled to the processor, each of the plurality of charge preamplifiers configured to produce charge detection signals upon detection of a charge induced on the respective one of the plurality of charge detection cylinders as a respective ion passes therethrough, and wherein the instructions stored in the memory further include instructions which, when executed by the processor, cause the processor to record the charge detection signals produced by each of the plurality of charge preamplifiers, and wherein the instructions stored in the memory further include instructions which, when executed by the processor, cause the processor to determine a respective ion charge and at least one of an ion mass-to-charge ratio and an ion mass based on the recorded charge detection signals produced by each of the plurality of charge preamplifiers.

* * * * *